(12) United States Patent
Hayashi et al.

(10) Patent No.: US 6,661,563 B2
(45) Date of Patent: Dec. 9, 2003

(54) SHEET-SHAPED DISPLAY, SPHERE-LIKE RESIN BODY, AND MICRO-CAPSULE

(75) Inventors: Naoyuki Hayashi, Kawasaki (JP); Norio Sawatari, Kawasaki (JP); Fumio Takei, Kawasaki (JP); Satoshi Takezawa, Kawasaki (JP); Makoto Fukuda, Kawasaki (JP); Mitsuo Ozaki, Kawasaki (JP); Toru Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 09/771,688

(22) Filed: Jan. 30, 2001

(65) Prior Publication Data

US 2001/0046081 A1 Nov. 29, 2001

(30) Foreign Application Priority Data

| Jan. 31, 2000 | (JP) | ................................. 2000-22217 |
| Apr. 14, 2000 | (JP) | ................................. 2000-114024 |
| Jun. 13, 2000 | (JP) | ................................. 2000-177368 |
| Sep. 12, 2000 | (JP) | ................................. 2000-277100 |
| Jan. 26, 2001 | (JP) | ................................. 2001-018340 |

(51) Int. Cl.$^7$ ................ G02F 1/00; G09F 9/00
(52) U.S. Cl. ................ 359/296; 345/107
(58) Field of Search ................ 359/296, 298; 345/105, 107; 428/402

(56) References Cited

U.S. PATENT DOCUMENTS

| 5,808,783 A | * | 9/1998 | Crowley ................ 359/296 |
| 6,067,185 A | * | 5/2000 | Albert et al. ................ 359/296 |
| 6,130,773 A | * | 10/2000 | Jacobson et al. ................ 359/296 |
| 6,396,205 B1 | * | 5/2002 | Sprague ................ 313/477 R |

* cited by examiner

Primary Examiner—Scott J. Sugarman
Assistant Examiner—Richard Hanig
(74) Attorney, Agent, or Firm—Staas & Halsey LLP

(57) ABSTRACT

Provisions of a large screen, thin sheet-like display device capable of realizing usages just like paper, a sphere-like resin body made of two semispheres capable of being manufactured easily, and a microcapsule containing electrophoretic particles capable of being manufactured easily. The sheet-like display device 10 has a sheet-like display layer 12 and at least one layer 14 containing an element for activating the sheet-like display layer, the layers being integrally formed. The sphere-like resin body has first and second portions made of resins, the absolute value of a difference between both the solubility parameters $\delta 1$ and $\delta 2$ of the resins being $|\delta 1 - \delta 2| \geq 0.2$. The phoretic particle-containing microcapsule has a resin shell in which phoretic particles are contained in a core. The diameter of the core is in a range from 10 $\mu$m to 200 $\mu$m and the circumferential length L of the microcapsule is in a range of $(4.1 \times T) \leq L \leq (20.1 \times T)$ where T is a Martin diameter of the microcapsule.

25 Claims, 28 Drawing Sheets

491
491
493

492

SHEET-SHAPED DISPLAY, SPHERE-LIKE RESIN BODY, AND MICRO-CAPSULE

CROSS-REFERENCE TO RELATED APPLICATIONS

This application is based upon and claims priority of Japanese Patent Applications Nos. 2000-277100, 2000-177368, 2000-114024, 2000-22217, and 2001-18340, all the contents being incorporated herein by reference.

BACKGROUND OF THE INVENTION

1. Field of the Invention

The present invention relates to a sheet-like display, a sphere-like resin body, and a microcapsule, and more particularly to a flexible sheet-like display, a sphere-like resin body constituted of two parts, and a microcapsule containing a sphere-like body.

In this specification, the sphere-like body has a shape like a sphere and is a small object capable of rotating in a limited space, this small object including a small object made of two small sphere-like objects coupled together.

2. Description of the Related Art

With recent developments of information societies, so-called multimedia information such as characters, images and sounds is frequently used in various information processing apparatus. Technical advancement of printers for outputting print information to a paper sheet is remarkable. A large quantity of paper used for drafts for manuscripts, conference materials, memorandums for messages and circulares, or the like is dumped after it is used during a temporary short time. Paper used for tickets for vehicles, price tags attached to goods in shops, or the like is also dumped after it is used temporarily and this quantity is not negligible.

Environmental questions resulting from mass consumption of paper are ventilated in public, such as disruption of natural environments typically exhausted forest resources and poison containing chroline compounds formed at garbage furnaces. Under such social environments, reducing the consumption of paper resources is a matter requiring immediate attention. One method of reducing the consumption of paper resources is a reuse of them. The current reuse of paper resources is mainly to utilize used paper as a material of new paper. Another method of reducing the consumption of paper is to supply new reusable resources which can be substituted for paper.

Many display element sheets called electronic sheets, sheet-like displays or the like have been proposed. Such a display element sheet displays a desired image by disposing sheet-like display elements between electrodes and applying an electric field or magnetic field. Following display sheets are mainly known.

(1) A turn-round spherical body distribution type display element sheet in which small sphere-like bodies are distributed in elastomer and an electric field is applied to display a desired image, the sphere-like body having two color portions and being capable of turning round in accordance with the direction of an electric field.

(2) An electrophoretic particle dispersion type display element sheet in which a display layer is formed by dispersing electrophoretic particles in dielectric (electrically insulating) liquid, and the optical characteristics of the display layer are changed by changing the dispersion state of electrophoretic particles by an electric field to display a desired image.

(3) An intra-microcapsule rotor type display element sheet (JP-A-7-343133) in which microcapsules are used each containing a rotator formed by coupling semispheres having different colors and electric characteristics, and an electric field is applied through the microcapsule to rotate the rotor and display a desired image.

(4) An intra-microcapsule electrophoretic particles type display element sheet (JP-A-1-86116, U.S. Pat. No. 2,551,783) in which a microcapsule filled with electrophoretic particles and coloring solvent, and an electric field is applied to the electrophoretic particles via the microcapsule to change the distribution of electrophoretic particles and the optical characteristics of the microcapsule to display a desired image.

(5) A film liquid crystal type display element sheet in which liquid crystal is sandwiched between films.

(6) A display element sheet using a composite film of liquid and polymer, the liquid is smetic liquid with dichronic dyes.

These display element sheets have a memory performance, can store image information at least some period without any power source, and are of a reflection type. These display elements are therefore expected as a substitute for paper. The display element sheet can be formed by coating material on a film with electrodes such as polyethylene terephthalate PET. It is therefore suitable for a sheet-like display which is thin, light and portable.

A sphere-like body rotating type display element is disclosed in the specifications of U.S. Pat. Nos. 4,126,854 and 4,143,103. A sphere-like body made of semispheres having different colors can be formed by coloring half areas of a sphere-like body made of wax with pigment. This manufacture method is described in JP-A-6-226875. With this method, a sphere-like body is manufactured in the following processes. Two types of melted wax are prepared, one type being colored in black with inorganic black pigment and the other type being colored in white with inorganic white pigment. The same amount of white and black wax is supplied to nozzles disposed under and over a rotating disk. Wax on the rotating disk flies away from the rotating disk in the form of wax droplet by a centrifugal force. Wax droplet is cooled through contact with air and solidified. By using a microcapsule containing this sphere-like body and oil, a display element is formed. By holding the display element by a support, an external voltage is applied to display an image.

The sphere-like body manufacture method is complicated because it has many control parameters such as a disc rotation speed, a melted wax temperature and a cooling air temperature. With this manufacture method, it is not necessarily possible to form a spherical body made of perfect semispheres of two colors, and the shape of the sphere-like body is not ideal.

JP-B-50-15115 discloses an electrophoretic particle sealed type display element. This element is formed by sealing dye, dielectric liquid, electrophoretic titanium dioxide particles in a cell. This method is, however, associated with some problems that dye is faded on an electrode and titanium dioxide particles are coagulated. These problems have been solved by JP-A-64-86116 which proposes to seal dye, dielectric liquid and titanium dioxide in a microcapsule.

As a microcapsule preparation method, there are a phase separation method, an interfacial polymerization method, an insolubilization method and the like. For example, JP-A-5-317805 teaches a phase separation method, more particularly a complex coacervation method for gum arabic—gelatin series.

It is desired to prevent leakage of dielectric solution in order to use a sphere-like body which is rotated by electrophoretic particles sealed in a microcapsule-or an electric field. To this end, it is preferable to make the film of a microcapsule thick to increase a rupture strength. However, for example, with the interfacial polymerization method, polymerization occurs only at the interface between an oil phase and a liquid phase so that only a very thin film (near a monomolecular layer) is formed.

If the coacervation method of the phase separation method is adopted, the film of a microcapsule can be made thick. However, in order to harden a film, a temperature is required to be controlled in a minute unit, pH is required to be controlled by dispensing droplets of alkaline solution, and hormaldehyde which is acute toxic substance is required to be added. Further, polymerization reaction by this method is unstable so that there is a possibility that the formed film extinguishes unless pH adjustment and density adjustment are performed continuously.

If a film liquid crystal type display element is used, a thin display device can be obtained. However, as compared to other sheet-like display elements such as an electrophoretic particle dispersion type display element and a microcapsule type display element, a retention performance of displayed information is inferior, a flexibility is small, and folding is difficult.

A conventional display element sheet and a peripheral circuit are discrete components. The peripheral circuit includes a power source, a driver and a controller. The display sheet and peripheral circuits are connected by using cables or a flexible circuit board. This hinders compactness, light weight and low cost. A method of forming a driver (circuit) by flexible plastic transistors made of coated organic material by screen printing or the like, has been proposed and studied. This proposal aims to replace printed paper sheets and conventional displays.

If a combination of discrete display elements and peripheral circuits is used in manufacture lines, there is essentially a limit of size and shape, particularly a limit of broadening a display area and thinning the display device. Therefore, conventional display element sheets cannot realize the use state just like paper sheets.

A display element of a sheet-like display device is generally made of an image display layer sandwiched between two laminated layers each having a base film of plastic such as PET on which conductive material such as indium tin oxide (ITO) or resin is coated. Displayed image is viewed through one laminated layer. Since the plastic film on the surface (display surface) of the display element has high luster, a visual texture like paper and a proper contrast are difficult to be obtained. Further, since two laminated films are used, the display device becomes thick.

A display device without electrodes on the display surface side is known. Such display devices using rotating bodies are under developments as described in M. E. Howard et al., "Gyricon Electric Paper", in Digest of Technical Papers of SID Int. Symposium (1998). Display devices of an electrophoresis type are under developments as described in H. Kawai et al., "Microcapsule-type Electrophoretic Display", Japan Hardcopy '99. Display devices of a liquid crystal-polymer composite film type are under developments as described in K. Sekine et al., "Rewritable Medium Using Polymer Dispersed Liquid Crystal Films", Japan Hardcopy '99.

Such display devices have data write external electrodes which are formed on the display surface. It is therefore desired to planarize the display surface in order to increase tight adhesion to the external electrodes. Therefore, luster of the display surface becomes high so that a texture like paper and a sufficient contrast are difficult to be obtained.

A method of writing data by blowing ions without forming electrodes on the display surface side and without using external electrodes, has been proposed as disclosed in K. Ogawa et al., "Microcapsule Electrophoretic Display Method Using Ion Projection Head", in Digest of Technical Papers of SID Int. Symposium (1999). In this case, an apparatus for generating an ion flow is required. As compared to a method of writing data by using external electrodes connected to only a power source, simplicity and cost are inferior.

Conventional sheet-like display devices are not still sufficiently convenient to use. New technology has long been waited in order to realize a sheet-like display device convenient to use.

SUMMARY OF THE INVENTION

It is a first object of the invention to provide a large screen and thin type sheet-like display device capable or realizing a use state like paper.

It is a second object of the present invention to provide a sphere-like resin body which is easy to manufacture, constituted of two semisphere-like small bodies capable of being colored differently, and has a substantially sphere shape.

It is a third object of the present invention to provide a microcapsule which contains electrophoretic particles or a sphere-like body in a shell having a high breaking strength, is easy and safe to manufacture, and suitable for application to a sheet-like display device.

It is a fourth object of the present invention to provide a sheet-like display device capable of realizing a texture like paper and a sufficient contrast and having a thickness reduced to a practically usable level.

According to a first aspect of the present invention, there is provided a sheet-like display device comprising: a flexible sheet-like display layer; and at least one flexible electric layer formed integrally with the sheet-like display layer, the electric layer including electric function components for functioning the display layer.

According to a second aspect of the present invention, there is provided a sphere-like resin body comprising first and second portions, the first portion being made of first resin having a solubility parameter $\delta 1$, the second portion being made of second resin having a solubility parameter $\delta 2$, and an absolute value of a difference between both the solubility parameters being $|\delta 1 - \delta 2| \geq 0.2$.

According to a third aspect of the present invention, there is provided a microcapsule having a shell made of resin in which together with dielectric liquid, particles capable of moving under an electric field or a magnetic field, or a core including a sphere-like body capable of rotating under an electric field or a magnetic field, whose semispheres have different colors and different electromagnetic characteristics, wherein a diameter of the core is in a range from 10 $\mu$m to 200 $\mu$m and a circumferential length L of the microcapsule is in a range of $(4.1 \times T) \leq L \leq (20.1 \times T)$ where T is a Martin diameter of the microcapsule.

According to a fourth aspect of the present invention, there is provided a sheet-like display device comprising: a base; a pair of opposing electrodes formed on the base; and a display layer disposed between the opposing electrodes, the display layer being capable of changing optical characteristics under a potential difference between the opposing electrodes and having surface roughness, wherein of the opposing electrodes, the electrode on a display surface side is made of a conductive resin layer adjacent to the display layer and a surface shape is conformal to the surface roughness of the display layer.

Various electric function elements and circuits such as a display function element, a power source element, a driver circuit, a control circuit, a communication circuit and an acoustic signal conversion are formed in the same sheet. A sheet-like display device can therefore be provided which can provide the use states just like paper and has a large display area.

Such a sheet-like display device can be manufactured at a low cost by omitting wiring members necessary for connection of elements and circuits and molding or packaging members necessary for elements and circuits, and by standardizing and simplifying manufacture processes.

By using sheet-like display devices, a consumption amount of paper sheets can be reduced easily, and various merits such as the protection of environment of the Earth with less consumption of resources and cost reduction can be expected.

A sheet-like display device having the integrated structure of a display layer and electrodes can have the texture more like paper. If solvent soluble conductive resin material is used for this display device, the electrodes can be formed by coating resin solution and the manufacture efficiency can be improved.

The invention provides a sphere-like resin body substantially having a sphere shape and constituted of two semispheres having different colors, and a microcapsule containing the sphere-like resin body and being usable as a display element of a sheet-like display device. The sphere-like resin body and microcapsule can be manufactured by a simple manufacture method.

The invention also provides a microcapsule which contains electrophoretic particles, can be manufactured by simple processes without using toxic materials, has a thick shell and a high rupture strength, and is suitable particularly for use with a sheet-like display device.

BRIEF DESCRIPTION OF THE DRAWINGS

FIG. 20A is a perspective view and FIG. 20B is a cross sectional view.

DETAILED DESCRIPTION OF THE PREFERRED EMBODIMENTS

With reference to the accompanying drawings, embodiments of the invention will be described. A display device is formed by integrally assembling a display element and electronic function components for driving the display element, conventionally these element and components being discrete. The electronic function components include a power source, a driver circuit, a control circuit, a communication circuit, an acoustic conversion element and the like. Since these components are integrally assembled, the space factor can be improved, a large display area can be realized, and a thin display device can be realized.

In order to form a sheet-like display device, it is preferable to form each constituent element in a sheet-shape by utilizing printing techniques and lamination techniques.

Figure 1A:
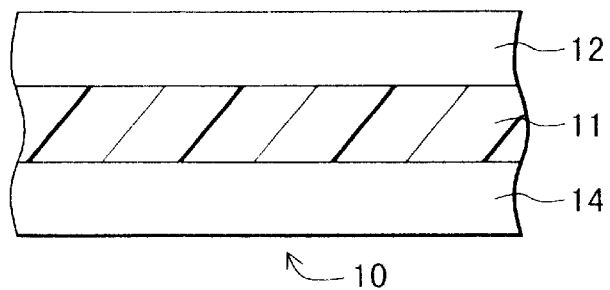
FIGS. 1A to 1F area schematic cross sectional views and plan views of display devices according to a fundamental embodiment of the invention.
Figure 1B:

FIGS. 1A and 1B show a sheet-like display device 10 according to a fundamental embodiment of the invention. In FIG. 1A, a display layer 12 is formed on one surface of a sheet-like flexible (capable of being folded) base 11, and on the other surface, an electric layer 14 is formed. In FIG. 1B, on one surface of a flexible base 11, an electric layer 14 and a display layer 12 are laminated. Both the display layer 12 and electric layer 14 are flexible (capable of being folded), and the sheet-like display device 10 is flexible as a whole.

The display layer contains electrophoretic particles capable of being moved by electric force or magnetic force, or small bodies capable of being oriented electromagnetically. The display layer has a function of performing a desired display.

The electric layer is a constituent component constituting the sheet-like display device together with the display layer. Typically, this electric layer can be considered as one independent functional body. Such an electric layer includes, although not limitative, a power source, a drive circuit, a control circuit, a communication circuit, and an acoustic conversion element.

The sheet-like display device includes, also not limitative, the following devices.

(1) A sheet-like display device having a pair of opposing electrode layers at least one of which is transparent, a sheet-like display layer and a sheet-like power source layer integrally formed with the sheet-like display layer for supplying power to drive the sheet-like display layer. The sheet-like display layer changes its optical characteristics (absorption, reflection or scattering) to perform a desired display operation.

(2) The sheet-like display device described in (1) wherein the sheet-like display layer has a pair of opposing electrode layers, at least one of the layers being transparent, and a display layer disposed between the opposing electrode layer. The display layer contains a sealed dispersion system containing electrophoretic particles, and performs a display operation by changing the optical characteristics (absorption or reflection) by changing a distribution state of the electrophoretic particles in the dispersion system under a control voltage applied across the opposing electrodes.

(3) The sheet-like display device described in (1) wherein the sheet-like display layer has a pair of opposing electrode layers, at least one of the layers being transparent, and a display layer disposed between the opposing electrode layer. The display layer contains sealed microcapsules each including a sphere-like body which changes its orientation in accordance with the direction of an electric field, and performs a display operation by changing the optical characteristics by changing the orientation of the sphere-like body under a control voltage applied across the opposing electrodes.

(4) The sheet-like display device described in (1) wherein the sheet-like display layer has a polymer dispersed type liquid crystal display layer having liquid crystal compound sealed in micro holes formed in polymer material.

(5) The sheet-like display device described in (1) wherein the sheet-like display layer includes a pair of opposing electrodes, at least one of the opposing electrodes being transparent, and a layer capable of presenting an electroluminescence phenomenon by a current flowing between the opposing electrodes.

(6) The sheet-like display device described in (1) wherein the sheet-like display layer includes a pair of opposing electrodes, at least one of the opposing electrodes being transparent, and a layer capable of presenting an electrochromism phenomenon by changing the optical characteristics with a current flowing between the opposing electrodes.

(7) A sheet-like display device comprising one electrode layer, a sheet-like display layer and a sheet-like power source layer integrally laminated. The sheet-like display layer performs a display operation by changing optical characteristics with an electric field applied across, or a current flowing between, the electrode layer and a predetermined write electrode. The sheet-like power source layer supplies a power necessary for driving the display layer.

(8) The sheet-like display device described in (7) wherein the sheet-like display layer includes a layer dispersed with electrophoretic particles capable of moving under an electric field applied across the electrode layer and predetermined write electrode, and performs a display operation by changing the optical characteristics by changing the distribution state of the electrophoretic particles with a control voltage applied with a control voltage applied across the electrode layer and predetermined write electrode.

(9) The sheet-like display device described in (7) wherein the sheet-like display layer includes a layer distributed microcapsules each containing a sphere-like body capable of reversely rotating in accordance with an electric field applied across the electrode layer and predetermined electrode, and performs a display operation by changing the optical characteristics by changing a rotary position of the sphere-like body with a control voltage applied across the electrode layer and predetermined write electrode.

(10) The sheet-like display device described in (7) wherein the sheet-like display layer presents an electrochromism phenomenon by changing the optical characteristics with a current flowing between the electrode layer and predetermined write electrode.

(11) The sheet-like display device described in (1) or (7) wherein the sheet-like display layer includes an element layer responsive to a magnetic field.

(12) The sheet-like display device described in (1) or (7) wherein the sheet-like power source layer is a sheet-like primary battery having a pair of electrode layers capable of performing an irreversible oxidation/reduction reaction and a sheet-like electrolytic layer formed between the electrode layers.

(13) The sheet-like display device described in (1) or (7) wherein the sheet-like power source layer is a sheet-like secondary battery having a pair of electrode layers capable of performing a reversible oxidation/reduction reaction and a sheet-like electrolytic layer formed between the electrode layers.

(14) The sheet-like display device described in (1) or (7) wherein the sheet-like power source layer is a sheet-like optical battery (solar battery) layer capable of generating an electric power upon application of light.

(15) The sheet-like display device described in (1) or (7) wherein the sheet-like power source layer is a sheet-like thermoelectromotive force battery layer capable of directly transforming a heat difference into an electric power.

(16) The sheet-like display device described in (1) or (7) wherein the sheet-like power source layer includes a sheet-like capacitor dielectric layer made of dielectric material or electrolyte and formed between electrodes.

(17) A sheet-like display device comprising (a) a sheet-like display layer, (b) a sheet-like power source layer, and (c) a layer for at least one of a driver circuit and a control circuit, respectively laminated integrally.

(18) A sheet-like display device comprising (a) a sheet-like display layer, (b) a sheet-like power source layer, and (c) a layer for at least one of a driver circuit and a control circuit and for a communication circuit, respectively laminated integrally.

(19) The sheet-like display device described in (18) wherein the communication circuit utilizes electromagnetic energy, optical energy, or acoustic energy as a transmission medium.

(20) A sheet-like display device comprising (a) a sheet-like display layer, (b) a sheet-like power source layer, and (c) an acoustic signal conversion layer capable of converting an acoustic signal into an electric signal or converting an electric signal into an acoustic signal, respectively laminated integrally.

(21) A sheet-like display device having a display function and an acoustic conversion function comprising (a) a sheet-like display layer, (b) a sheet-like power source layer, (c) an acoustic signal conversion layer capable of at least converting an acoustic signal into an electric signal or converting an electric signal into an acoustic signal, and (d) a layer for at least one of a driver circuit and a control circuit, respectively laminated integrally.

(22) A sheet-like display device having a display function, an acoustic conversion function and a communication function comprising (a) a sheet-like display layer, (b) a sheet-like power source layer, (c) an acoustic signal conversion layer capable of at least converting an acoustic signal into an electric signal or converting an electric signal into an acoustic signal, and (d) a layer for at least one of a driver circuit and a control circuit and for a communication circuit, respectively laminated integrally.

(23) A sheet-like display device comprising (a) a sheet-like display layer and (b) a layer for at least one of a driver circuit, a control circuit and a communication circuit.

(24) A sheet-like display device comprising (a) a sheet-like display element and (b) an input/output element for external connection.

This sheet-like display device can display information supplied from an external electronic or electrical apparatus, for example, by inserting electrode terminals mounted on the edge of the sheet-like display element (electrode terminals may be pulled out from the sheet-like display device when used) into a connection unit (slot or the like) of the external electronic or electrical apparatus. In this case, all or part of necessary elements such as a driver circuit and a control circuit may be mounted on the sheet-like display device or on the apparatus to be connected.

(25) A sheet-like display device having an input element for inputting data.

The data input element may be a keyboard of a so-called touch sensor type. The data input element may be built, for example, in the display element.

The sheet-like display device is manufactured by integrally forming a sheet-like display layer and at least one electric layer having electric components for driving the sheet-like display layer.

The display layer 12 can be made of various sheet-like elements which present a display function based on various principles.

Figure 1C:
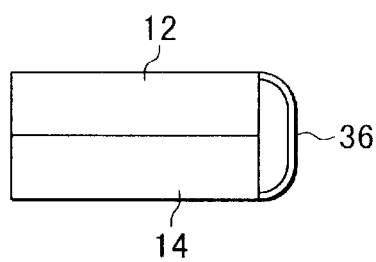
Figure 1D:
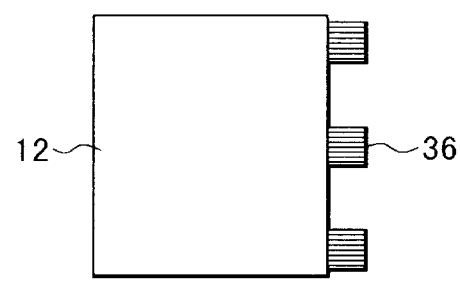

FIGS. 1C and 1D are a schematic cross sectional view and plan view showing an example of electric connection between a display layer and an electric layer. The display layer 12 and electric layer 14 are electrically connected by a flexible printed circuit board FPC 36.

Figure 1E:
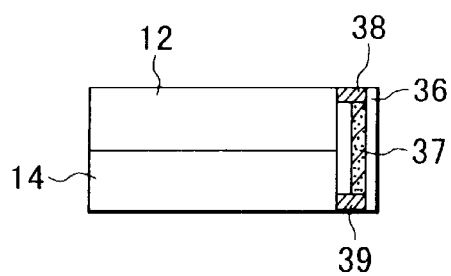
Figure 1F:
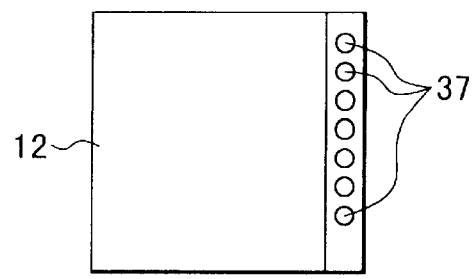

FIGS. 1E and 1F are a schematic cross sectional view and a plan view showing an example of electric connection between a display layer and an electric layer. The display layer 12 and electric layer 14 are electrically connected by a conductive via 37 formed in an insulating support 36 and wiring tubs 38 and 39 formed on opposite ends of the via 37.

Figure 2A:
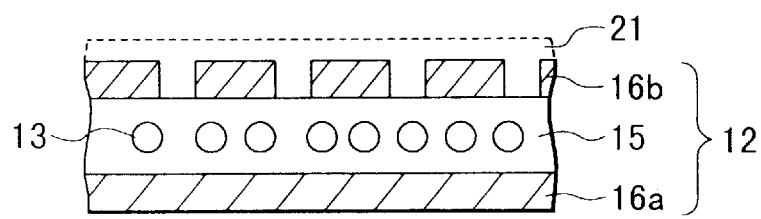
FIGS. 2A to 2E are schematic cross sectional views showing display units of display devices.

FIGS. 2A to 2E show examples of the display layer 12. In FIG. 2A, on the upper and lower surfaces of a display layer 15 containing microcapsules 13, opposing electrodes 16a and 16b are disposed. The microcapsule 13 contains electrophoretic particles, magnetophoretic particles, sphere-like bodies or the like to change a display image in accordance with an electric field applied across the opposing electrodes.

For example, microcapsules each containing electrophoretic particles or a sphere-like body made of two different color portions are deposited on the transparent electrode 16a vapor-deposited on a flexible base 14 made of polyester or the like, by using techniques such as coating by a doctor blade method, screen printing, roller printing, ink jet printing, and electrophotograpy, to thereby form the display layer. On this display layer, the opposing transparent electrodes 16b are formed. The display layer 15 including microcapsules will be later detailed.

Figure 3A:
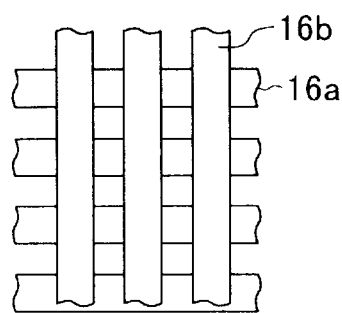
FIGS. 3A to 3D are plan views and perspective views schematically showing wiring of a display device.

FIG. 3A shows an example of the structure of the opposing electrodes 16a and 16b. For example, a group of electrodes 16a on one surface of the display layer extends in parallel in the horizontal direction as viewed in FIG. 3A, and a group of electrodes 16b on the other surface of the display layer extends in parallel in the vertical direction. The two groups of electrodes constitute a simple matrix structure and each cross area forms a display area.

Figure 3B:
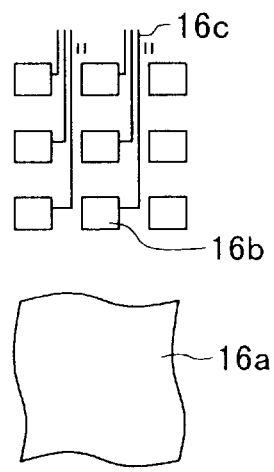

FIG. 3B shows another example of the structure of the opposing electrodes 16a and 16b. One electrode 16a is a common electrode formed on the whole surface of the base, and other electrodes 16b are independent electrodes formed on each display area of the display layer. A wiring 16c is connected to each independent electrode 16b. A cross area between the common electrode 16a and an independent electrode 16b is a display area. It is preferable to cover the wiring 16c so as not to adversely affect the display image.

Figure 2B:
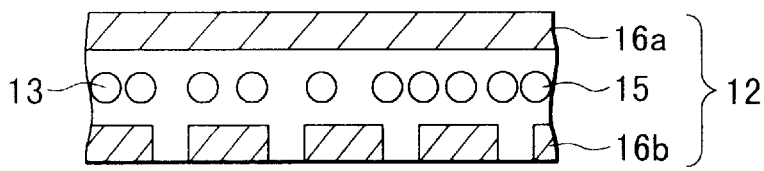

In FIG. 2B, the opposing electrodes 16a and 16b are made of a common electrode and independent electrodes, the positions of the upper and lower electrodes being exchanged. This position change can be applied also to the following examples of the structure.

Of the opposing electrodes, the electrode disposed on the display surface side is required to be a transparent electrode which can transmit visual light. As a transparent electrode, a tin oxide film, an indium oxide film doped with tin, a conductive polymer thin film such as polyaniline, or the like may be used. The electrode on the surface opposite to the display surface may be either transparent or opaque. Opaque electrode material may be any of various well-known materials.

In place of electrophoretic particles, magnetophoretic particles having magnetism may be used. In place of a display layer utilizing microcapsules, a so-called polymer dispersed type liquid crystal display layer is used, with liquid crystal being filled in micro holes formed in polymer material. In this case, in FIGS. 2A and 2B, liquid crystal 13 is filled in micro holes in a polymer material layer 15. Other display layers of the display apparatus may be adopted, such as a display layer which applies electrochromism or electroluminescence and a display layer which is based upon an arbitrary display principle suitable for a sheet-like display layer.

Figure 2C:
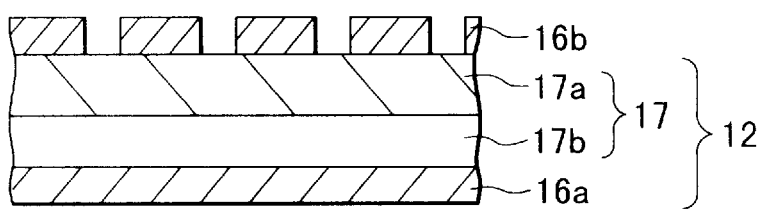

FIG. 2C shows an example of a display layer utilizing electrochromism. An electrochromic layer 17a and an electrolytic layer 17b are laminated which are sandwiched between opposing electrodes 16a and 16b. The opposing electrodes 16a and 16b are similar to those shown in FIG. 2A.

The electrochromic material layer 17a changes an extinction coefficient (factor) in a specific range of wavelength through an oxidation or reduction reaction. An electrochromic thin film is oxidized or reduced by a potential across the opposing electrodes to develop a color change. This absorbed color change in the electrochromic material layer is externally observed through the transparent electrode.

Electrochromic material may be transition metal oxide such as tungsten oxide, molybdenum oxide, vanadium oxide, indium oxide, π-electron-rich organic compound such as phthalocyanine derivative and phenylhydrazone derivative, or conductive polymer such as polyaniline, polythiophene, polypyrrole, polyfuran, and polyacetylene.

The electrolytic layer 17b helps the electrochromic material layer oxidize and reduce. Electrolytic material may be liquid electrolyte such as lithium salt dissolved in nonaqueous solvent or so-called solid electrolytic material. The lithium salt such as $LiClO_4$, $LiBF_4$, $LiPF_6$, $LiCF_3 SO_3$ is dissolved in the nonaqueous solvent such as prolylene carbonate, acetonitrile, and γ-butyrolactam. The semi-solid or solid electrolytic material is made by heating and melting resin such as acrylonitrile and polyethylene oxide in solvent such as lithium salt and propylene carbonate and thereafter by cooling or hardening with crosslinking agent.

Figure 2D:
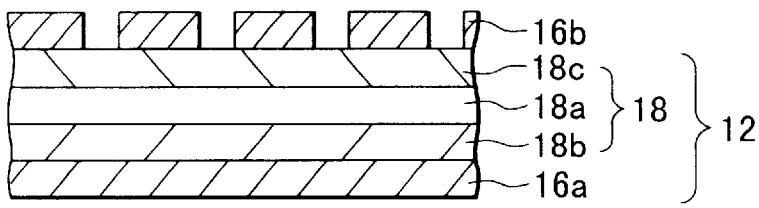

FIG. 2D shows an example of the structure of an electroluminescence (EL) display layer utilizing electroluminescence. Electroluminescence is a phenomenon of light emission by current flow or electric field excitation. An electron transport layer 18b is disposed on a negative electrode 16a, and on the electron transport layer 18b, a hole transport layer 18c is laminated, and on this layer 18c, a positive electrode 16b is disposed. The electron and hole transport layers are not essential constituent elements, but the light emission layer 18a may be used to provide the functions of the electron and hole transport layers. Although inorganic electroluminescence EL elements of ZnS/Mn series have been developed to date, they are associated with the problem of a high drive voltage of about 100 V and an insufficient luminance. Recently, developments on organic electroluminescence (organic EL) elements suitable for a thin display are progressing. An organic EL element emits light itself and is excellent in visual recognition. The organic EL element has a high response speed and can be made thin and light and driven at a low voltage lower than several volts. The organic EL element is therefore expected to be applied to an inexpensive and large area full-color flat panel display, and vigorous studies are now made (refer to Nikkei Electronics, 1996. 1.29, page 99).

The operation principle of the organic EL element is generally similar to that of a light emitting diode, and it has a light emission layer (an organic semiconductor thin film having a capability of photoluminescence), carrier (electron, hole) transport layers and a pair of opposing electrodes sandwiching these layers. This luminescence phenomenon is based on the principle that as an electric field is applied across the opposing electrodes, electrons emitted from the cathode and holes injected from the anode are recombined in the light emission layer and an energy level difference from the conduction band to the valence band is emitted as light energy.

The light emission layer and carrier transport layers are made of π-electron based organic semiconductor. Although such material will be later described in more detail, material of the light emission layer may be 8-oxyquinoline based complex, naphthostyryl based dye, coumarin derivative, pyran derivative or the like. Material of the hole transport layer of the carrier layer may be triphenylamine derivative (TAD) or the like, and material of the electron transport layer may be oxadiazole derivative (PBD) or the like.

In order to use a variety of light emission colors and ensure a long term stability, material of the light emission layer may be expanded to fluorescent dye molecules or the like dissolved in amorphous polymer solvent, or polymer itself such as poly-p-phenylene derivative (PPV).

The carrier (hole and electron) transport layers are inserted between the light emission layer and the cathode electrode for injecting electrons and between the light emission layer and the anode electrode for injecting holes, to form a laminated layer.

These layers constituting the laminated layer are disposed on a base. The base is a supporter of the EL element and is made of a transparent base such as plastic. Plastic is preferably polyethylene terephthalate, polycarbonate, polymethyl methacrylate, polysulfon, polybutene, polymethyl pentene or the like.

For example, a transparent electrode is used for the anode electrode. The transparent electrode may be an indium tin oxide (ITO) film or a tin oxide film. Other materials may be used, for example, metal having a large work function such as aluminum and gold, copper iodide, or conductive polymer such as polyaniline, poly-3-methyl-thiophene, and polypyrrole.

As a method of forming an anode electrode, vapor deposition, sputtering and the like may be used. If conductive polymer is used, soluble conductive polymer is used which is mixed with proper binder resin and coated on the base. Alternatively, an anode electrode can be formed directly on the base by electrolytic polymerization. A thickness of the anode electrode is determined so that a visible light transmissivity of visual light becomes 60% or higher, or preferably 80% or higher. This corresponds to a film thickness of 10 to 1000 nm, or preferably to a film thickness of 20 to 500 nm.

A thickness of the light emission layer is usually 10 to 200 nm, or preferably 20 to 80 nm. As organic light emission material of the light emission layer, compound is effective which has a high fluorescent quantum yield, a high injection efficiency of electrons from the anode electrode, and a high electron mobility. Material of the light emission layer may be oxyquinoline based complex such as 8-hydroxyquinoline-aluminum complex ($AlQ_3$) high contains diphenylanthracene based compound, naphthostyryl based dye (NSD), coumarin derivative, pyran derivative, rubrene based compound or the like.

The cathode electrode may be made of various metals, preferably metal having a small work function such as Mg, Li, Ca or alloy thereof. For example, magnesium-aluminum alloy, magnesium-silver alloy, magnesium-indium alloy, aluminum-lithium alloy or the like may be used. If the cathode electrode is opaque, the anode electrode is disposed on the display surface. If the electrode layers shown in FIG. 1B are used, it is desired that the electrode of the El display layer can be used as the electrode material of a battery.

Electron transport material between the light emission layer and cathode electrode layer is preferably material having a high electron affinity and a high electron mobility. Cyclopentadiene derivative, bisstyrylbenzene derivative, oxadiazole derivative, triazole derivative, p-phenylene compound or polymer, phenanthroline derivative or the like may be used.

Hole transport material between the light emission layer and anode electrode layer is material having a low injection barrier of holes from the anode electrode and a high hole mobility. For example, such material may be aromatic diamine based compound such as N,N'-diphenyl-N,N'-bis (3-methylphenyl)-1,1'-biphenyl-1,4"-diamine (TPD), 1,1'-bis(4-di-p-tolylaminophenyl), and cyclohexane, hydrazone compound, tetraphenylbutadiene based compound. Polymer such as poly-N-vinylcarbazole and polysilane may also be used.

Figure 2E:
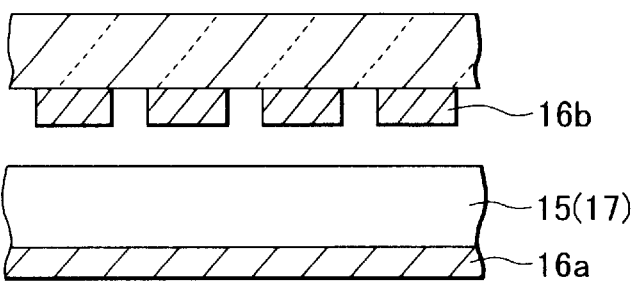

FIG. 2E shows another example of the structure of a display layer of a microcapsule type, an electrochromism type or the like. The display layer has only one electrode 16a. External write electrodes 16b are disposed above the display layer 15, 17 and a voltage is applied between the electrodes 16a and 16b to rewrite data displayed in the display layer through electric field application or current flow. Since write signals are supplied to the write electrodes 16, an external write mechanism such as a printer and a hand scanner can be used.

Although various types of display layers can be used, it is preferable to use a display layer of the type that a microcapsule contains rotatable sphere-like bodies (sphere-like rotors) or electrophoretic particles, when flexibility and folding performance of a display device made of the display layer are taken into consideration.

Figure 4A:
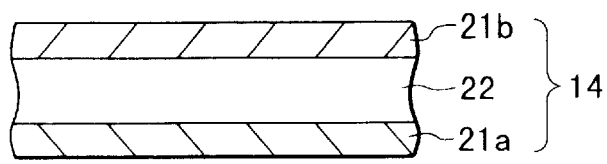
FIGS. 4A to 4F are schematic cross sectional views of electric layers of display devices.
Figure 4B:
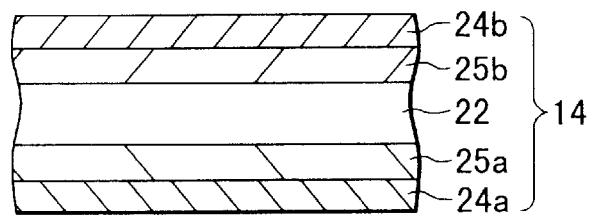

FIGS. 4A and 4B show examples of the structure of a power source layer as an electric layer. In the structure shown in FIG. 4A, an electrolytic layer (or semiconductor layer, thermoelectromotive force generator layer, dielectric layer) 22 is sandwiched between a positive electrode 21a and a negative electrode 21b. In the structure shown in FIG. 4B, on both the surfaces of an electrolytic layer 22, an anode active material layer 25a and a cathode active material layer 25b are disposed. On the anode active material layer 25a, an anode collector 24a is disposed, and on the cathode active material layer 25b, a cathode collector 24b is disposed.

As the power source element, a primary battery, a secondary battery, a solar battery, a thermoelectric conversion battery utilizing the Seebeck effect, a capacitor or the like may be used. Electrode material of the primary battery is zinc-graphite, manganese dioxide or lithium-manganese dioxide, zinc-air or the like. Electrode material of the secondary battery is nickel cadmium or lithium absorbable carbon-lithium absorbable carbon, lithium metal-conductive polymer, or the like. Material of the solar battery is single crystal silicon, amorphous silicon, polysilicon, organic dye, inorganic pigment or the like. The capacitor is an electrolytic capacitor, an electrical double layer capacitor or the like. Of these, the primary and secondary batteries and capacitor utilizing an electrochemical reaction preferably use solidified electrolytic material, or so-called solid electrolytic material.

If the power source layer and display layer are combined in the structure shown in FIG. 1B, material of one electrode is coated on the back surface of a base. On this electrode material, an electrolytic sheet is placed, and on this sheet, a sheet coated with material of the other electrode is attached to form a laminated structure. In this manner, a display device with the integrated sheet-like display element and sheet-like power source element can be formed.

In addition to the display layer and power source layer, the sheet-like display device may be integrated with a circuit layer necessary for driving and controlling the display element. In this case, it is preferable that the circuit layer does not degrade the flexibility of the device.

Figure 4C:
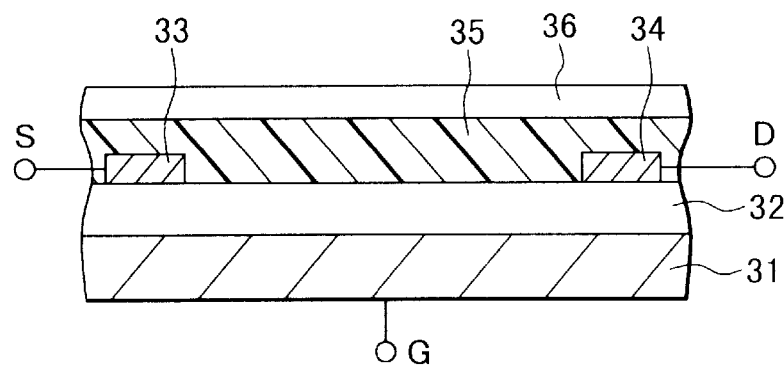

FIG. 4C shows an example of the structure of a transistor used for forming a circuit in an electric layer. The surface of an organic conductive layer 31 made of polypyrrole is covered with a cyanoethyl pullulan layer 32 on which electrodes 33 and 34 made of organic conductive material such as polypyrrole are formed. An organic semiconductor layer 35 made of polyalkylthiophene or the like is formed covering the electrodes 33 and 34. The organic conductive layer 31 forms a gate electrode, and the electrodes 33 and 34 form source and drain electrodes. This structure can be formed by photolithography generally used by semiconductor device manufacture processes. It is preferable to protect the surface of the organic semiconductor layer 35 with an insulating film 36.

Figure 4D:
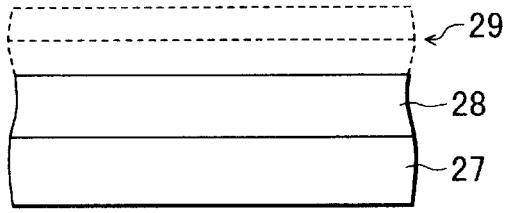
Figure 4E:
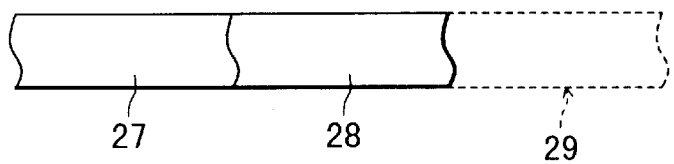

FIG. 4D shows an example of a lamination structure made of a plurality of electric layers 27, 28 and 29. For example, a drive circuit layer 27 and a control circuit layer 28 for the display layer 12 are stacked. In each circuit layer, organic semiconductor transistors such as shown in FIG. 4C are formed. A power source layer 29 may be stacked. FIG. 4E shows an example of the structure having a plurality of electric layers 27, 28 and 29 juxtaposed in the same layer. A drive circuit region 27 and a control circuit region 28 are formed in the same layer. A power source layer 29 may be formed in the same layer. In FIGS. 4D and 4E, only one of the drive circuit and control circuit may be disposed. The lamination structure shown in FIG. 4D and the parallel layout structure shown in FIG. 4E may be combined. A plurality of power source layers may be formed to connect them serially or in parallel.

Figure 3C:
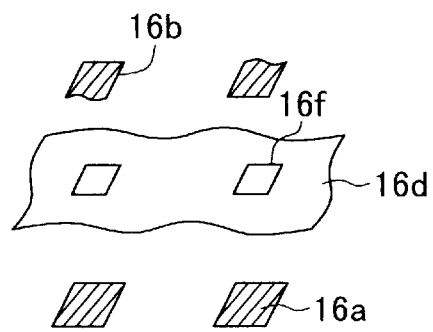

FIG. 3C shows an example of the electric connection structure of a plurality of laminated electric layers. A lower wiring 16a is connected via an insulating layer 16d to an upper wiring 16b. An electrical contact hole 16f is formed through the insulating layer 16d. The wiring is made of silver paste, organic conductive material or the like. A desired contact hole can be formed by screen printing or the like.

Figure 4F:
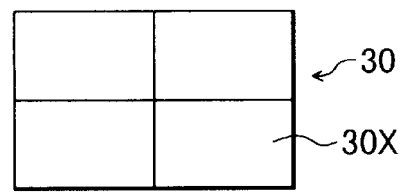

FIG. 4F shows an example of the structure of an electric layer 30 having the same structural unit repetitively disposed. Each unit 30x has, for example, a driver circuit. Each unit may have a laminated structure of a plurality of electric layers.

For example, organic semiconductor field effect transistors may be used for a display element driver circuit, and a display element control circuit may use a silicon integrated circuit chip mounted through bare chip bonding. The chip has a dedicated LSI, a general CPU, a ROM (Read-Only Memory) storing a control program, a RAM (Random Access Memory) necessary for temporary storage of display data, a NVRAM (Non-Volatile Random Access Memory) which is a rewritable non-volatile storage, and the like.

Figure 3D:
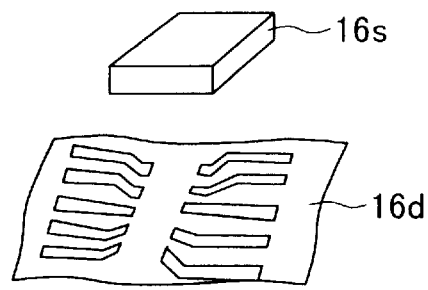

As shown in FIG. 3Da, a wiring pattern 16w is formed on an insulating layer 16d, and pads of a semiconductor chip 16s are connected to the connection terminals of the wiring pattern 16w through flip chip bonding. Since it is difficult to request the semiconductor chip to have flexibility, it is preferable that bare chip bonding is performed in a peripheral area of the display layer. Wiring can be formed by screen printing of conductive material such as silver paste, or by patterning a conductive material layer.

An input/output circuit and communication circuit may be integrally formed with the sheet-like display device in order to exchange information with an external device.

For example, in the structures shown in FIGS. 4D and 4E, a power source layer 27, a driver/control circuit 28 for the display layer and a communication circuit 29 are integrally formed. In the structure shown in FIG. 4E, the driver circuit region, control circuit region and communication circuit region are formed in the same layer. Only one of the driver circuit and control circuit may be formed in this layer. In this case, one of the driver circuit and control circuit is included in the communication circuit region.

As a mount method for a communication circuit of a sheet-like display device, a mount method similar to those used by the driver/control circuits may be used. Information carrier may be electromagnetic energy, optical energy, acoustic energy or the like.

Figure 5:
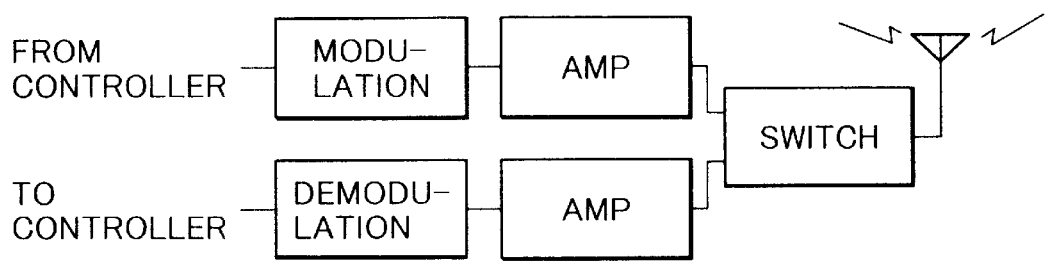
FIG. 5 is a block diagram showing an example of a communication circuit layer utilizing electromagnetic energy.

FIG. 5 is a block diagram showing an example of the structure of circuits utilizing electromagnetic energy. For the electromagnetic energy, radio waves in a microwave band, an ultra short wave band or a medium wave band may be used or electromagnetic induction superposed upon a carrier of about several tens to several hundreds kHz may be used directly. Modulation circuits, amplifier circuits and a switch circuit are made of a semiconductor chip which can use, for example, flip chip bonding. An antenna for transmission/reception of radio waves can be assembled with a sheet-like display device by a method suitable for forming a sheet-like element, such as screen printing.

Figure 6:
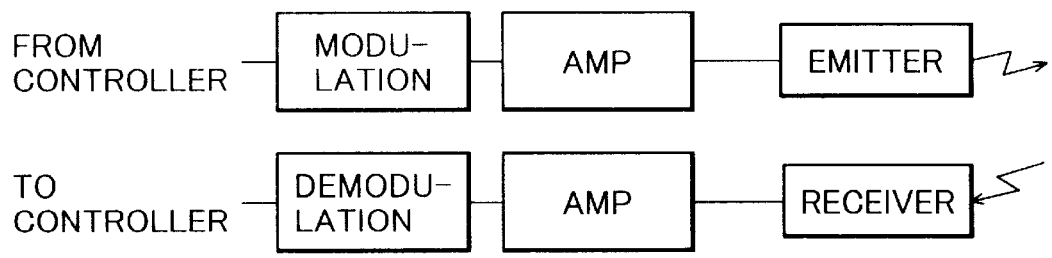
FIG. 6 is a block diagram showing an example of a communication circuit layer utilizing optical energy.

FIG. 6 is a block diagram showing an example of the structure of circuits utilizing optical energy. For the optical energy, modulated or non-modulated light having any wavelength from infrared light to ultraviolet light may be used. A transducer for light transmission/reception may use a light emitting diode, a laser diode, an electric field light emission element, a plasma light emission element, a fluorescent light emission element or the like as the transmission element, and may use a photodiode, a phototransistor, or a CdS element as the reception element. For example, the transmission/reception element is formed in an IC chip and connected to terminals of a wiring layer through flip chip bonding.

Figure 7:
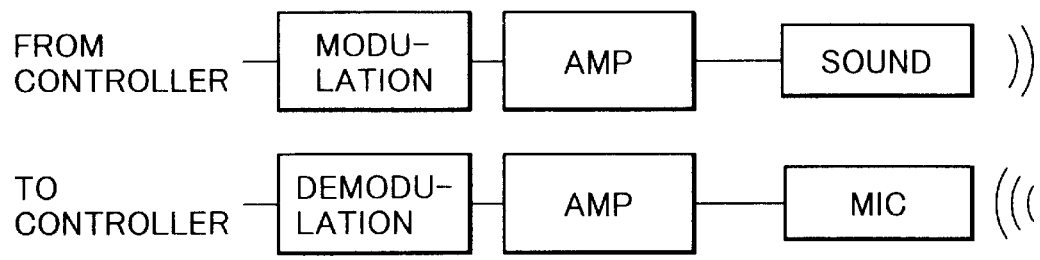
FIG. 7 is a block diagram showing an example of a communication circuit layer utilizing acoustic energy.

FIG. 7 is a block diagram showing an example of the structure of circuits utilizing acoustic energy. For the acoustic energy, acoustic signal of several tens Hz to several tens MHz may be used as a carrier for communications. In this case, a sheet-like acoustic signal conversion element can be used. Modulation circuits and amplifier circuits are made of, for example, an IC chip which is connected to connection terminals of a wiring layer through flip chip bonding. An acoustic signal conversion element can be formed by sandwiching a piezoelectric conversion layer of PZT, PVDF or the like made by printing or casting, between driver electrode layers to form a laminated structure. This structure is integrally formed with a display layer. An acoustic signal conversion element for an audible frequency band of several tens Hz to several tens kHz can be used as a microphone for converting human voices or the like into electric signal, or conversely as a speaker for generating audible sounds.

By providing such a communication function, a sheet-like display device can be used as a display device capable of dealing with so-called multimedia information in spite of its flexible, light and sheet-like structure.

The sheet-like display device can utilize various combinations of the layer structures described with reference to FIGS. 1A to 4F. Examples of these combinations will be described with reference to FIGS. 8 to 11.

Figure 8:
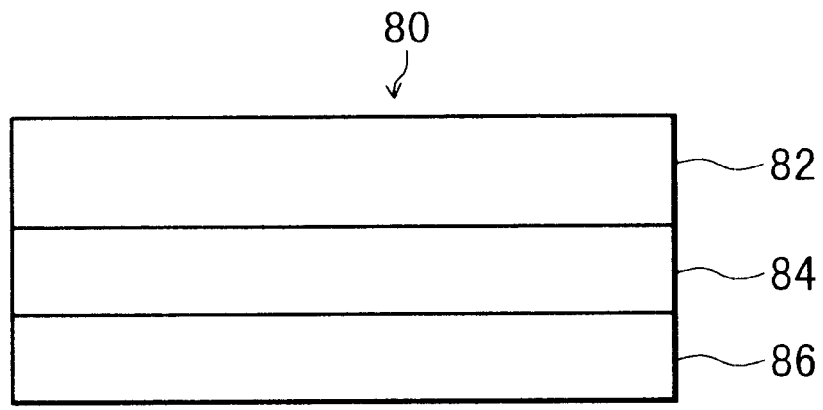
FIG. 8 is a schematic cross sectional view showing an example of a layer structure usable by a sheet-like display device.

A sheet-like display device 80 shown in FIG. 8 has a display layer 82, a power source layer 84 and an acoustic signal conversion element layer 86.

Figure 9:
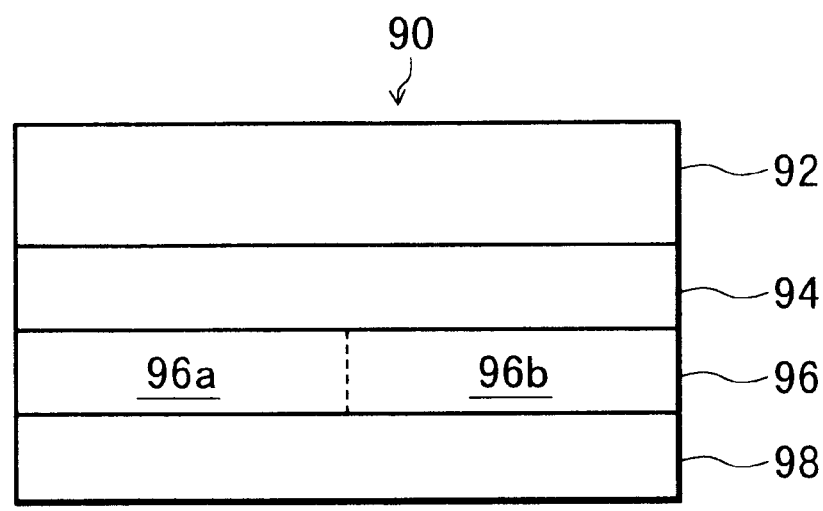
FIG. 9 is a schematic cross sectional view showing another example of a layer structure usable by a sheet-like display device.

A sheet-like display device 90 shown in FIG. 9 has a display layer 92, a power source layer 94, a driver/control circuit layer 96 including a driver circuit region 96a and a control circuit region 96b, and an acoustic signal conversion element layer 98.

Figure 10:
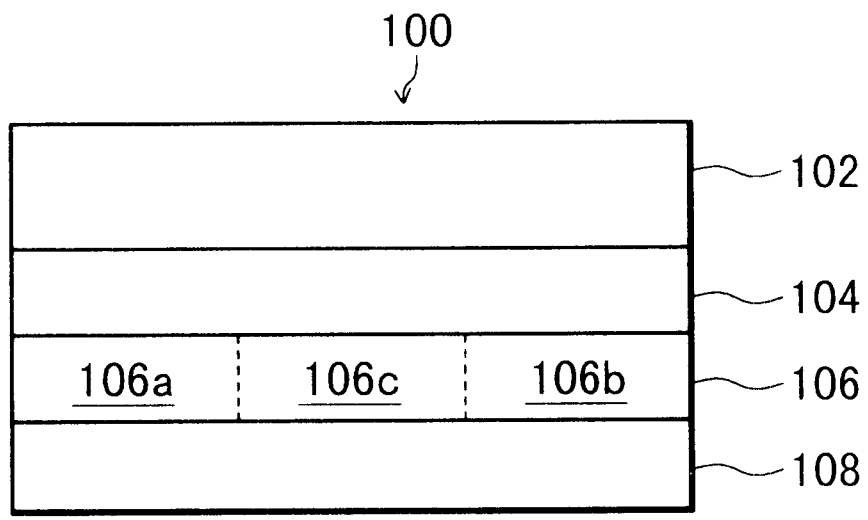
FIG. 10 is a schematic cross sectional view showing still another example of a layer structure usable by a sheet-like display device.

A sheet-like display device 100 shown in FIG. 10 has a display layer 102, a power source layer 104, a driver/control/communication circuit layer 106 including a driver circuit region 106a, a control circuit region 106b, and a communication circuit region 106c, and an acoustic signal conversion element layer 108.

In FIG. 9, the driver circuit and control circuit each may be formed in different layers. Similarly, in FIG. 10, the driver circuit, control circuit and communication circuit each may be formed in different layers, or the driver circuit and control circuit may be formed in the same layer and the communication circuit may be formed in another layer.

Figure 11:
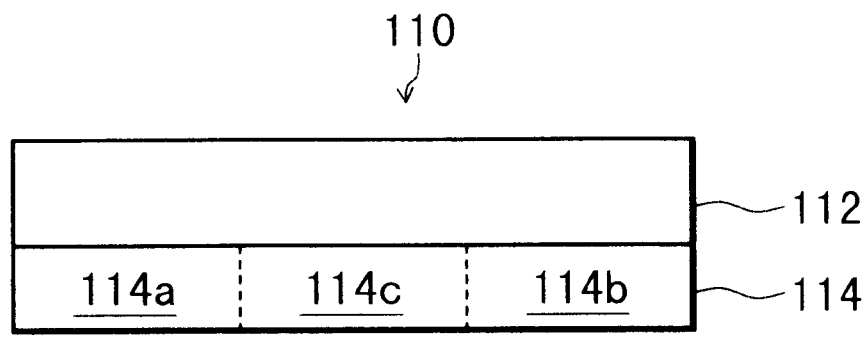
FIG. 11 is a schematic cross sectional view showing still another example of a layer structure usable by a sheet-like display device.

FIG. 11 shows an example of the structure of a sheet-like display device without a power source layer. A sheet-like display device 110 has a display layer 112 and a driver/control/communication circuit layer 114 including a driver circuit region 114a, a control circuit region 114b and a communication circuit region 114c. Alternatively, for example, the driver circuit region and control circuit region may be formed in one layer, and a communication circuit region may be formed in another layer. Specific embodiments will be described below.

[1st Embodiment]

FIGS. 12A to 12D show a sheet-like display device according to the first embodiment of the invention. This display device includes a display unit and a power source unit. In the display unit, on opposing surfaces of a pair of transparent bases 201 and 201' made of PET polyethylene terephthalate, ITO transparent electrodes 202 and 202' are formed. A display layer 207 is sandwiched between the ITO transparent electrodes 202 and 202' to form the display unit.

In the display layer 207, a number of microcapsules 203 are dispersed in elastomer. A dispersed system 205 is sealed in the microcapsule 203. The dispersed system 205 is made of electrophoretic particles 204 dispersed in dielectric liquid.

An aluminum layer 208 is vapor-deposited on the opposite surface of the transparent base 201'.

The electrophoretic particles 204 in the dispersed system sealed in the microcapsule 203 may be general colloid particles or metal fine particles, organic or inorganic dye particles, organic or inorganic pigment particles, ceramic or glass fine particles, proper resin or rubber particles or the like. A combination thereof may also be used.

The dielectric liquid of the dispersed system 205 may be water or inorganic or organic salt solution, alcohol, amine, saturated hydrocarbon, unsaturated hydrocarbon, hydrocarbon halide, natural fat and oil, mineral oil, synthetic oil or the like.

If necessary, the dispersed system 205 may be added with inorganic or organic electrolytic material, surfactant or its salt, metal soap, resin, rubber, oil, varnish, compound or the like, as charge control agent for controlling particle charges, dispersing agent for enhancing dispersion, smoothing agent, and stabilizing agent for stabilizing a dispersed state. Charges of electrophoretic particles may be set either positive or negative, the zeta potential may be raised, the dispersion may be stabilized uniformly, or the viscosity or the like of conductive liquid may be controlled, when necessary.

The dispersed system 205 is sufficiently mixed by a roll mill, a ball mill, a paint shaker or the like and filled in the microcapsule by an interfacial polymerization method, a coacervation method, an insolubilization method, a phase separation method, an interfacial precipitation method or the like. It is desired that the film which forms the outer wall of the microcapsule 203 and the dispersed system 205 has the same volume resistivity.

Microcapsules 203 are disposed on the surface of the transparent electrode 202' by coating, screen printing, roller printing, spraying, ink jetting or the like. The other transparent electrode 202 is disposed above the transparent electrode 202' and the structure of the display unit is hermetically sealed.

Figure 12A:
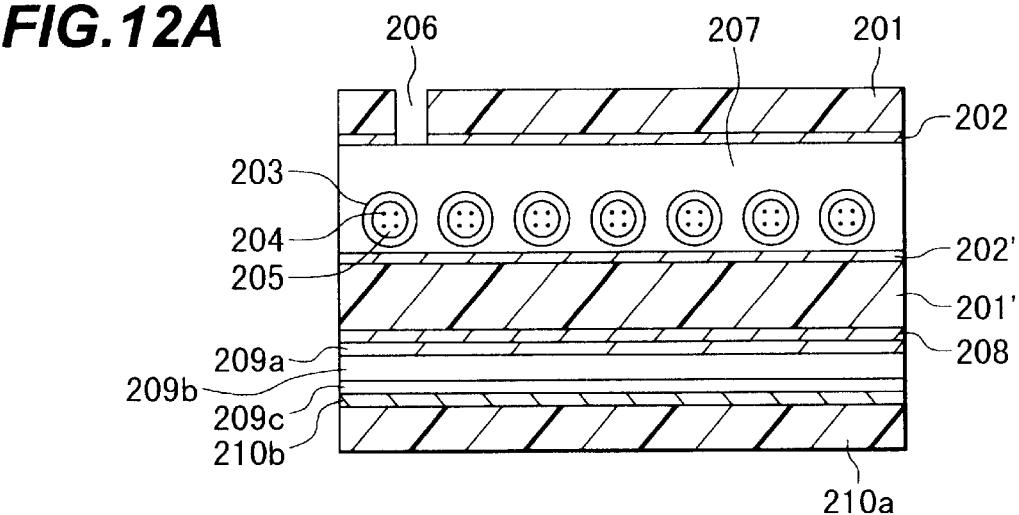
FIGS. 12A to 12D are schematic cross sectional views showing a sheet-like display device according to a first embodiment.
Figure 12B:
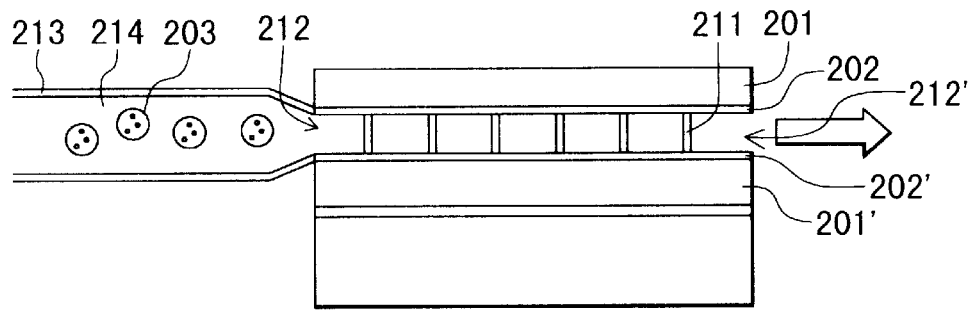

FIG. 12B illustrates another method of disposing microcapsules between ITO transparent electrodes 202 and 202'. PET resin films 201 and 201' with the ITO transparent electrodes 202 and 202' are disposed facing each other by using pillars 211. This display unit is hermetically sealed by defining an injection port 212 and a suction port 212'. An injector 213 is coupled to the injection port 212, and while the inner space of the display unit is sucked from the suction port 212' to a low pressure state, elastomer 214 with dispersed microcapsules 203 is injected into the space between the ITO transparent electrodes.

As shown in FIG. 12A, elastomer with microcapsules may be injected via an injection hole 206 formed through the PET film. Microcapsules may be dispersed first and then elastomer may be injected. It is preferable to fill the space between microcapsules 203 and the space between the electrodes 202 and 202' and microcapsules 203, with medium 207 which is chemically stable relative to the microcapsule 203 and has a refractive index and volume resistivity equal to those of the microcapsule.

Examples of a method of manufacturing microcapsules will be described. Isoper G (manufactured by Exxon Chemical Corporation) of 30 mass as electrically insulating material and dielectric solution, Oil Blue 5502 (manufactured by Arimoto Chemical Industry Co., Ltd) of 0.3 mass part as dye, and TTO-55C (C) (ISHIHARA SANGYO KAISHA, LTD) of 6 mass parts as electrophoretic particles were dissolved and dispersed to prepare dispersed liquid for a core portion.

Sodium dodecylbenzensulfonate of 0.6 mass part as surfactant and calcium tertiary phosphate of 2.2 mass parts as stabilizing agent were dissolved in pure water of 600 mass parts. These two liquids were stirred with a homogenizer to prepare emulsion of dielectric liquid.

Potassium persulfate of 4.3 mass parts as polymerization initiator was dissolved in pure water of 100 mass parts. After monomer of methyl methacrylate of 6 mass parts was added, the liquid was stirred with a homogenizer to prepare monomer dispersed liquid for a shell portion. Monomer dispersed liquid was dripped in the emulsion of dielectric liquid in 20 minutes and a polymerization reaction was performed for 7 hours at a temperature of 70° C.

Figure 12C:
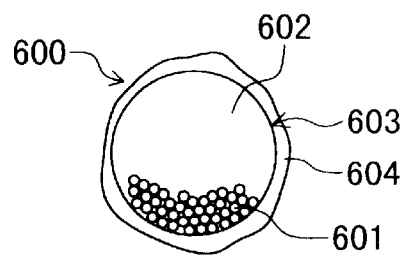

FIG. 12C is a sketch of a microcapsule after the polymerization reaction. This microcapsule 600 is constituted of a core 603 and a shell 604. The core 603 contains electrophoretic particles 601 dispersed in dielectric liquid 602, and the shell 604 is made of polymer of methyl methacrylate monomers. The electrophoretic particles 601 shown in FIG. 12C are positioned on the bottom of the microcapsule. Although the surface of the shell 603 is drawn relatively smooth, the real surface had many uneven portions. The particle diameter (Martin diameter) of the microcapsule 600 was about 25 $\mu$m and the film thickness of the shell was about 5 $\mu$m.

It is conceivable that monomers in the monomer dispersed liquid and polymerization initiator moving in the dielectric liquid are polymerized in the dispersed liquid or on the surfaces of dispersed liquid droplets to deposit polymer on the surfaces of dispersed liquid droplets. It is expected that although the shell covering the core surface is formed by deposition of polymer, this deposition occurs randomly and makes the polymer shell surface uneven.

In place of Isoper G, oleic acid of 30 mass parts was also used as dielectric liquid. The microcapsule after polymerization had a particle diameter (Martin diameter) of about 25 $\mu$m and the shell film thickness of about 3 $\mu$m. Although the shell film thickness was reduced, the strength of the microcapsule was sufficient for practical use.

Next, a method of forming a battery as a power source unit will be described. First, positive electrode active material was prepared as in the following. Pyrrole of 10 mass parts was added to acetonitrile of 90 parts, and lithium tetrafluoroborate of 5 mass parts was added. After these materials were mixed uniformly, lithium cobalt of 50 mass parts was added and gently stirred, and then left still for 10 minutes. Next, lithium cobalt was separated with a filter, washed with acetonitrile, and dried for 10 minutes at 80° C. The obtained dust of 100 mass parts was added with acetylene black of 3 mass parts and mixed with a mill. Thereafter, 10% N-methylpyrrolidone solution of polyvinylidene fluoride of 50 mass parts was mixed and knead. Then, this material was coated on the vapor-deposited aluminum layer 208 of the transparent member 201' of the display unit to a thickness of 150 $\mu$m, and dried for 30 minutes at 120° C. to obtain the positive electrode active material layer 209a.

As the solid electrolytic material, acrylic denatured polyethylene oxide was used. A mixture of 100 mass parts of one-end acrylic denatured polyethylene oxide (manufactured by Kyouei Chemical Corporation, 90G) and both-end acrylic denatured polyethylene oxide (manufactured by Kyouei Chemical Corporation, 9EG) of 10:1 and propylene carbonate of 100 mass parts containing 1M lithium tetrafluoroborate were mixed, and then benzoyl peroxide of 1 mass part was added to prepare reaction polymerization solution.

An unwoven cloth having a thickness of 40 μm was placed on the positive electrode active material layer 109a, and the reaction polymerization solution of the solid electrolyte was flowed to a thickness of 100 μm. Next, ultraviolet rays (1 mW/cm$^2$) from an ultra high voltage mercury lamp were exposed for one minute for polymerization to form a solid electrolytic film 209b in a gel state.

The negative electrode active material was prepared by mixing and kneading graphite based carbon of 1 mass part and 10% N-methylpyrrolidone solution of polyvinylidene fluoride of 1 mass part. The negative electrode active material was coated to a thickness of 100 μm on the negative electrode collector 210b made of a copper foil of about 10 μm in thickness and formed on the PET film 210a, and dried for 30 minutes at 120° C. to prepare a negative electrode active material layer 209c. This negative electrode active material layer 209c was placed on the electrolytic layer 209b and pressured at 2 kg/cm$^2$ (196 kPa) to form a battery. Positive and negative voltages can be obtained from the collectors 208 and 210b supporting the corresponding electrode active material layers.

In this embodiment, a sheet-like display device having a display layer element and a secondary battery layer integrated together can be obtained. If the electromotive force of the secondary battery layer is insufficient for the display layer, a plurality of secondary battery layers may be connected in series.

[Modification]

After microcapsules of the first embodiment were classified and dried, microcapsules of 10 mass parts, glyoxal of 2.5 mass parts as anti-hydration agent, polyvinyl alcohol (Gohsefimer X-200 manufactured by Nippon Synthetic Chemical Industry Co., Ltd) of 50 mass parts were mixed in pure water of 500 mass parts. This mixture liquid was coated with a coater on the surface of the vapor-deposited ITO thin film 202 for a transparent electrode formed on the PET film 201, dried for two days at an ordinary temperature, and then subjected to a heat treatment for 15 minutes at 100° C.

Figure 12D:
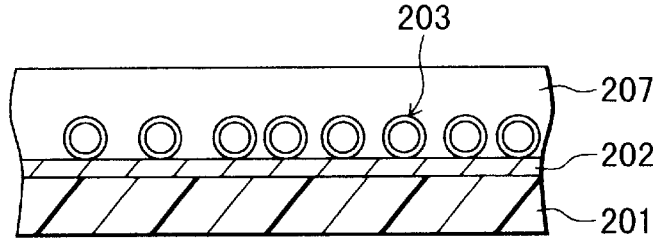

As shown in FIG. 12D, a sheet-like display device was formed which had a common electrode 202 and an upper microcapsule layer 207 containing electrophoretic particles. It was possible to form an image on the sheet-like display device by using a laser printer without a developer and a fixer. At that time, the microcapsules were not destroyed.

Figure 13A:
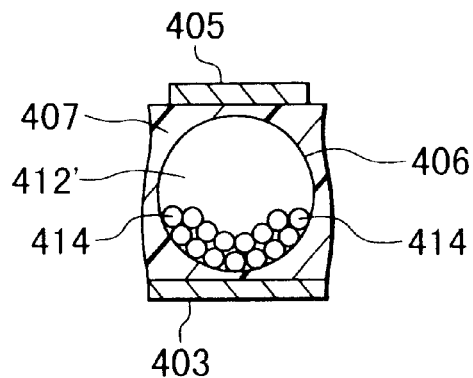
FIGS. 13A to 13D are schematic cross sectional views illustrating a display principle of a display element using electrophoretic particles.

Referring to FIGS. 13A to 13D, a display principle of a display element using electrophoretic particles will be described. As shown in FIG. 13A, white electrophoretic particles 414 (charged to a negative potential) as well as dark color dielectric liquid 412' are sealed in a microcapsule 406. In the state of no electric field application shown in FIG. 13A, the electrophoretic particles 414 are positioned on the bottom of the microcapsule 406. In this state, as viewed downward, a black image can be observed.

Figure 13B:
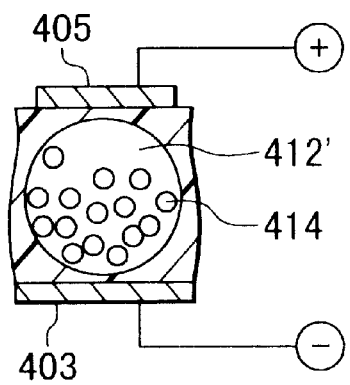
Figure 13C:
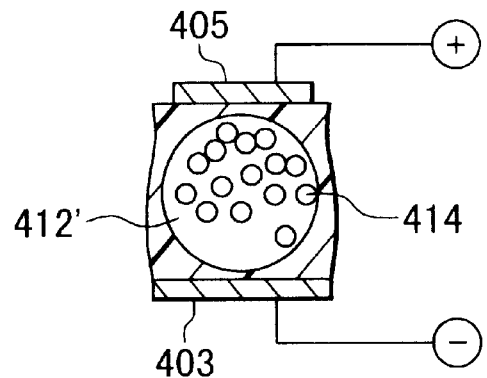

As shown in FIGS. 13B and 13C, when an electric field is applied between an independent electrode 405 and the common electrode 403, the negatively charged electrophoretic particles 414 start moving towards the upper area of the microcapsule on the positive electrode side.

Figure 13D:
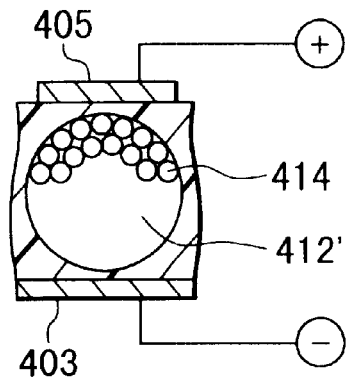

As shown in FIG. 13D, the electrophoretic particles 414 are fixed in the upper area and a white image can be observed. Even if the electric field is turned off in this state, the microcapsules 406 maintain being fixed in the upper area and the white image continues to be displayed, because of a cohesive force of the electrophoretic particles 414, an attachment force to the inner wall of the microcapsule, a viscosity of the dielectric liquid 412' and the like.

In the first embodiment, monomer dispersed liquid to be dripped in emulsion was mixed with polymerization initiator and monomers. For comparison, monomers were mixed to the core, and the polymerization initiator was mixed with dripping liquid phase.

Oil Blue 5502 (manufactured by Arimoto Chemical Industry Co., Ltd) of 0.6 mass part as dye, TTO-55C (C) (ISHIHARA SANGYO KAISHA, LTD) of 6 mass parts as electrophoretic particles and 4,4-diphenylmethane isocianate of 5.8 mass parts were dissolved and dispersed in toluene of 58 mass parts as dielectric liquid, to form dispersed liquid for the core portion.

Sodium dodecylbenzensulfonate of 0.054 mass part as surfactant and calcium tertiary phosphate of 5.4 mass parts as stabilizing agent were dissolved in pure water of 540 mass parts. These two liquids were stirred with a homogenizer to prepare emulsion of dielectric liquid.

Diethylenetriamine of 1.6 mass parts as polymerization initiator was dissolved in pure water of 32 mass parts to prepare solution containing the polymerization initiator.

Solution which contained polymerization initiator was dripped in emulsion of dielectric liquid in 20 minutes, and a polymerization reaction was performed for 7 hours at a temperature of 70° C. After the polymerization reaction, a microcapsule having a size of about 20 μm was able to be obtained. The shell film thickness was about 0.2 μm and some microcapsules were broken during a classification process. It can be judged that such microcapsules are suitable only for particular use.

This polymerization is interfacial polymerization which progresses at the interface between a liquid droplet made of dispersed liquid for the core portion with dissolved monomers and the continuous liquid phase surrounding the liquid droplet and containing the polymerization initiator. It can be conceivable that at the polymerization progresses, a shell is formed at the interface and the monomer and polymerization initiator are separated. Therefore, it may be difficult to increase a shell film thickness.

[2nd Embodiment]

With reference to FIGS. 14A to 14E, a sheet-like display device according to the second embodiment of the invention will be described. A description will be given for a sheet-like display device having an integral structure of a display layer containing microcapsules and electrodes, and a manufacture of a preparatory structure used for manufacturing the sheet-like display device.

Similar to the first embodiment, microcapsules were formed by using Isoper G (manufactured by Exxon Chemical Corporation) as dielectric liquid.

Next, glyoxal of 2.5 mass parts as anti-hydration and Gohsefimer Z-200 (Nippon Synthetic Chemical Industry Co., Ltd) of 50 mass parts as polyvinyl alcohol were mixed in pure water of 500 mass parts to prepare mixed solution.

Figure 14A:
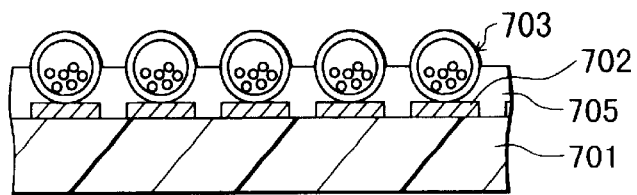
FIGS. 14A to 14F are schematic cross sectional views showing a sheet-like display device according to a second embodiment and a graph.

As shown in FIG. 14A, the mixed solution was coated on a PET film 701 with preformed independent electrodes 702 of vapor-deposited ITO to form an adhesion layer 705, and then microcapsules 703 were attached with a bar coater. After drying for two days at an ordinary temperature, a heat treatment was performed for 15 minutes at 100° C. to form a display layer. A sheet-like display device preparatory structure was formed in the above manner whose microcapsules 703 in the display layer protrude from the adhesion layer 705 mainly made of polyvinyl alcohol.

As will be described in the following, various sheet-like display devices were formed from the sheet-like display device preparatory structures. For each sheet-like display device, a contrast, a 60 degrees specular glossiness, and an average surface roughness were measured. The contrast was measured as a ratio of reflectivity between the state that electrophoretic particles in the microcapsule are attracted toward the display surface (common electrode) and the state that they are positioned on the independent electrode side. The 60 degrees specular glossiness and average surface roughness were measured in accordance with JIS Z 8741 and JIS B 0601. If the contrast was 3 or higher, it was evaluated as ◯, whereas if it was lower than 3, it was evaluated as x. If the 60° degree mirror luster was smaller than 5, it was evaluated as ◯, if it was 5 to 10, it was judged as Δ, and if it was larger than 10, it was judged as x.

Solution of polypyrrole derivative having a molecular weight of about 6000 of 1 mass part dissolved in tetrahydrofuran of 50 mass parts was prepared.

Figure 14B:
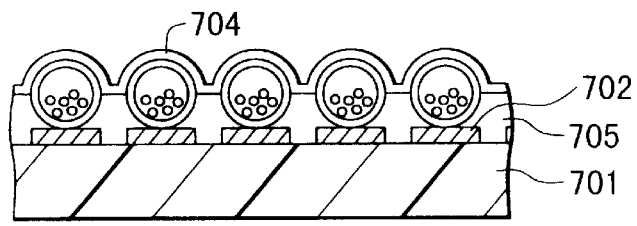

As shown in FIG. 14B, this solution was coated on the sheet-like display device preparatory structure with a bar coater and dried for 20 minutes at 100° C. to form a film having a thickness of 0.2 μm. The preparatory structure with the polypyrrole derivative film was placed for 10 minutes in a chamber filled with bromine vapor to dope bromine in the vapor phase to from an electrode layer made of a conductive resin film 704.

A write test was performed at an application voltage of 100 V and an application time of 10 seconds for the sheet-like display device having the electrode layer whose surface roughness was conformal to that of the display layer. The test results were a contrast of 4.0 (evaluation ◯), a 60 degrees specular glossiness of 2 or smaller (evaluation ◯), and a surface roughness of 5 μm.

[Modification]

Glyoxal of 2.5 mass parts as anti-hydration and Gohsefimer Z-200 (Nippon Synthetic Chemical Industry Co., Ltd) of 50 mass parts as polyvinyl alcohol were mixed in pure water of 500 mass parts to prepare mixed solution.

Figure 14C:
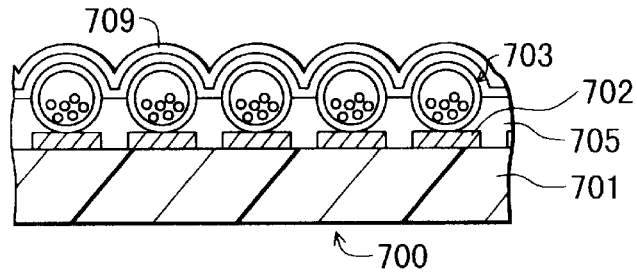

As shown in FIG. 14C, this solution was coated on the sheet-like display device manufactured by the above-described method and dried to from a protective film 709 having a thickness of 5 μm. A write test was performed at an application voltage of 100 V and an application time of 10 seconds for this sheet-like display device. The test results were a contrast of 3.5 (evaluation ◯), a 60 degrees specular glossiness of 4.7 (evaluation ◯), and a surface roughness of 1.7 μm.

[Modification]

ITO fine dust (shape: scale, 10 μm or shorter) of 1 mass part and polycarbonate of 1 mass part together with dichloromethane of 17 mass parts were dispersion-mixed for 24 hours by using hard glass balls and hard glass spots to obtain a mixture.

As shown in FIG. 14B, this mixture was coated on the sheet-like display device preparatory structure to form a electrode layer 704 having a thickness of 7 μm, and then as shown in FIG. 14C, the protective film 709 similar to that described above was formed. A write test was performed at an application voltage of 100 V and an application time of 10 seconds for this sheet-like display device. The test results were a contrast of 4.7 (evaluation ◯), a 60 degrees specular glossiness luster of 3.5 (evaluation ◯), and a surface roughness of 2.9 μm.

Figure 14D:
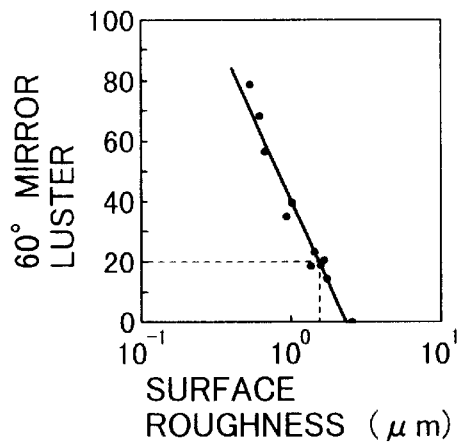

FIG. 14D is a graph showing the relation between a luster and an average roughness of a resin layer. It can be known from this data that the average surface roughness of the display surface is particularly preferable if it is 1.3 μm or larger. By forming an electrode layer by directly coating conductive resin material on the display layer with microcapsules, it is easy to obtain a sheet-like display device with a proper luster of the display surface. If the electrode on the side of the display surface is a common electrode, irregular luster to be formed by a patterned layer such as an independent electrode layer can be reduced.

[Modification]

In order to verify the effects of the embodiment with the transparent electrode film being formed on the surfaces of microcapsules, a sample was prepared by attaching a transparent electrode formed on a plastic film to a display layer. Glyoxal of 2.5 mass part and Gohsefimer Z-200 (Nippon Synthetic Chemical Industry Co., Ltd) of 50 mass parts were mixed in pure water of 500 mass parts to prepare mixed solution.

Figure 14E:
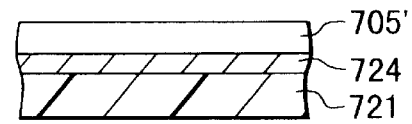

As shown in FIG. 14E, this mixed solution was coated on a PET film 721 preformed with an ITO common electrode 724 to form an adhesion layer 705'.

Figure 14F:
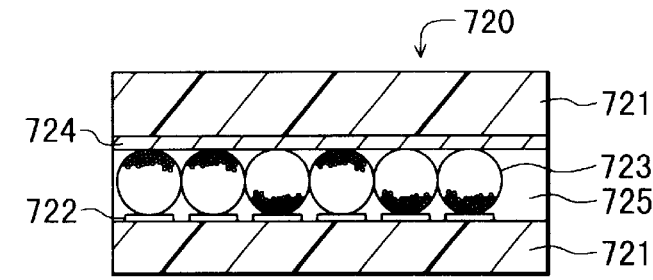

As shown in FIG. 14F, the film 721 with the adhesion layer 705' being directed to the sheet-like display device preparatory structure shown in FIG. 14A was bonded to the preparatory structure, dried for two days at an ordinary temperature, and subjected to a heat treatment for 15 minutes at 100° C. to form a sheet-like display device 720. This sheet-like display device 720 had PET film bases 721 and 721', independent electrodes 702, microcapsules 703, and a common electrode 724, the microcapsules 703 in the sheet-like display device preparatory structure being partially buried in the adhesion layer 725 (705, 705') as shown in FIG. 14F.

A write test was performed at an application voltage of 100 V and an application time of 10 seconds for this sheet-like display device. The test results were a contrast of 4.5 (evaluation ◯), 60 degrees specular glossiness of 105.2 (evaluation x), and a surface roughness of 0.32 μm. As compared to using a sheet with an electrode, the structure that an electrode layer is formed on the surfaces of microcapsules has a more excellent 60 degrees specular glossiness.

An embodiment which uses synthetic paper as a support and ITO dispersed resin as an electrode will be described.

[3rd Embodiment]

Microcapsules similar to that shown in FIG. 12C were formed. After the microcapsules were classified and dried, microcapsules (diameter range of 10 to 40 μm after classification) of 10 mass parts, glyoxal of 2.5 mass part as anti-hydration and Gohsefimer Z-200 (Nippon Synthetic Chemical Industry Co., Ltd) of 50 mass parts were mixed in pure water of 500 mass parts to prepare mixed solution.

Figure 15A:
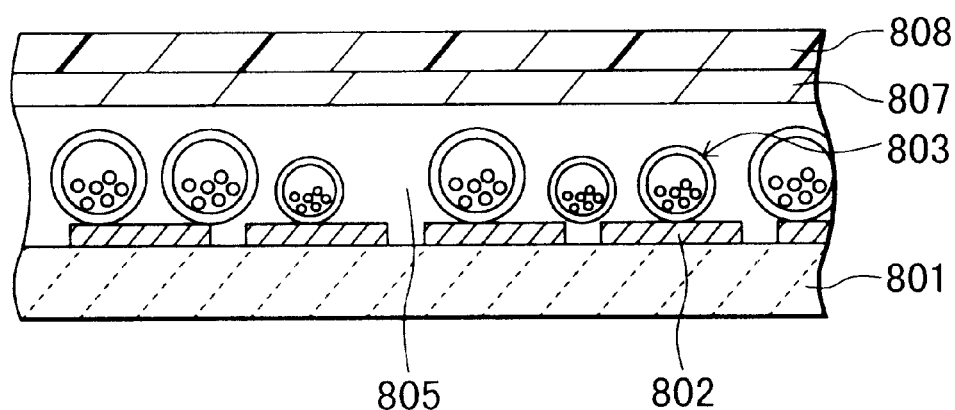
FIGS. 15A and 15B are schematic cross sectional views showing a sheet-like display device according to a third embodiment.

As shown in FIG. 15A, this mixed solution was coated on a synthetic paper sheet (FGS200 manufactured by Oji-Yuka Synthetic Paper Co., Ltd.) 801 having independent electrode layers 802 of 3 μm in thickness made of ITO dispersed resin to form a display layer (260 μm in thickness) made of microcapsule containing resin. This display layer was dried for two days at an ordinary temperature, and subjected to a heat treatment for 15 minutes at 100° C. A Clark rigidity S value of the used synthetic paper sheet FGS200 was 256, a Bekk smoothness was 450 seconds and an opacity was 98%.

Then, ITO dispersed resin was coated on the display layer to a thickness of 7 μm to form a common electrode layer 807, and mixed solution of glyoxal of 2.5 mass parts and Gohsefimer Z-200 (Nippon Synthetic Chemical Industry Co., Ltd) of 50 mass parts mixed in pure water of 500 mass parts was coated to form a protective layer 808 having a thickness of 5 μm. A sheet-like display device was thus formed.

The sheet-like display device formed had the texture like paper and was excellent in anti-folding. The sheet-like display device showed a stable contrast without influence of an underlying layer or illumination from the bottom.

Figure 15B:
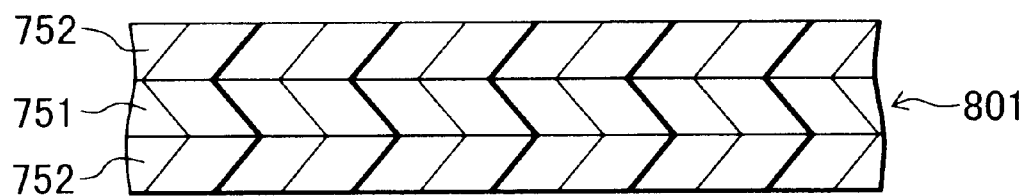

FIG. 15B shows an example of a synthetic paper sheet having a lamination structure. A synthetic paper sheet 801 has the structure that a resin layer 751 having first mechanical characteristics is sandwiched between resin layers 752 having second mechanical characteristics. One of the resin layers 751 and 752 is made of a biaxial rolled film layer (in other words, at least one type of the resin layers is made of a biaxial rolled film layer) so that the mechanical strength and rigidity of the synthetic paper sheet 801 as a base can be increased, the fold edge can be suppressed, and the synthetic paper sheet 801 can have the flexibility like paper. If any fold edge is formed in the display device utilizing microcapsules, the display quality is degraded. Such a fold edge is therefore unfavorable.

If the externally exposed layer of the synthetic paper sheet (layer touched with hands in use) is made of a uniaxial rolled film, a texture like paper can be obtained. It is therefore advantageous if the synthetic paper sheet 801 is made of a biaxial rolled film as the middle layer 751 and uniaxial rolled films as the upper and lower layers 752. In this case, the base is provided which has excellent mechanical characteristics, is hard to form fold edge, and had good texture. The outer resin layer 752 not exposed externally may be omitted.

An example of a synthetic paper sheet suitable for a lamination structure is "Yupo" made of biaxial rolled film and manufactured by Oji-Yuka Synthetic Paper Co., Ltd. "Yupo" is a synthetic paper sheet having a lamination structure including a resin layer made of polypropylene as main source material added with inorganic filler and additive and manufactured by a biaxial rolling method. Usable grades of this synthetic paper are, for example, FPG60, FPG80, FPG110, FPG130, FPG200, FPG300, FGS80, FGS130, FGS200, FGS300, GFG95,GFG110,GFG130, SGS60,SGS80, and SGS110.

The Clark rigidity S value of a synthetic paper sheet having a lamination structure can be controlled by a sheet thickness, a thickness of a biaxial rolled film layer and the like. In order to provide a function of a base (supporter), it is desired that a thickness D of the synthetic paper sheet is in a range from 30 to 500 $\mu$m and a thickness d of a biaxial rolled film layer is $0.2D \leq d \leq 0.9D$. In order to obtain a flexibility like paper, it is necessary that the Clark rigidity S value (JIS P 8143) is 400 or smaller. The texture like paper can be obtained by using a uniaxial rolled film as the externally exposed base resin film and setting the Bekk smoothness (JIS P 8119) to 1000 seconds or shorter to make the base surface irregular. The roughness of the base surface can be controlled by adjusting a tensile force during a resin film rolling process.

If each layer constituting the base contains fine particles of inorganic pigment, light scattering on each layer can be increased, an opacity can be increased, light reflected from a surface different from the display surface can be reduced so that the image quality such as contrast of the display device can be improved. The opacity (JIS Z 8722) of the base is preferably 80% or higher. Inorganic pigment may be calcium carbonate, clay, titanium dioxide, silica, barium sulfate, aluminum sulfate and the like. The particle diameter of pigment is preferably 0.05 to 15 $\mu$m, or more preferable 0.5 to 3 $\mu$m. An amount of pigment to be added is 0 to 70 mass %, or preferably 3 to 65 mass %.

[4th Embodiment]

Figure 16A:
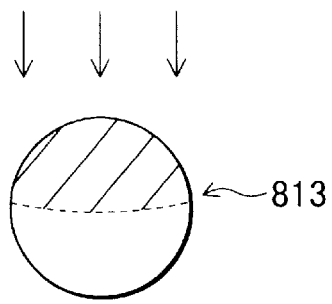
FIGS. 16A, 16B and 16C are schematic cross sectional views showing a sheet-like display device using sphere-like bodies according to a fourth embodiment.

As shown in FIG. 16A, on a semisphere surface of a crosslinking type acryl resin particle (MR-60G manufactured by SOKEN CHEMICAL CO., LTD.), a phthalocyanine pigment (TPL-1 manufactured by Orient Chemical Industries Co., Ltd.) film (2 $\mu$m in thickness) was formed by vacuum vapor deposition to obtain sphere-like bodies 813 each having semispheres of different colors and electric characteristics. The sphere-like bodies 813 were dispersed in double fluid type silicone rubber (KE109 manufactured by Shin-Etsu Chemical Co., Ltd.) to prepare display layer preparatory liquid.

Figure 16B:
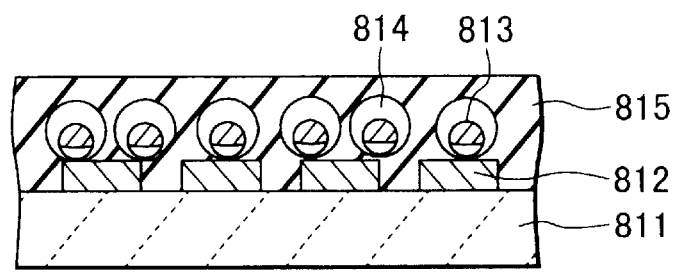

As shown in FIG. 16B, this preparatory liquid was coated on a synthetic paper sheet (FGS200 manufactured by Oji-Yuka Synthetic Paper Co., Ltd.) 811 having independent electrode layers 812 of 3 $\mu$m in thickness made of ITO dispersed resin to a thickness of 300 $\mu$m, and left for 48 hours at a room temperature to cure the liquid. The synthetic paper sheet with the cured silicone rubber layer was immersed in silicone oil (SH200, 20cS manufactured by TORAY DOW CORNING COMPANY) in 60 hours to swell the silicone rubber layer. A space was therefore formed between the swelled silicone rubber layer 815 and each sphere-like body 813 not swelled. Silicon oil 814 was filled in this space. With this method, a microcapsule having the sphere-like body in silicone oil was formed and the display layer was formed.

Figure 16C:
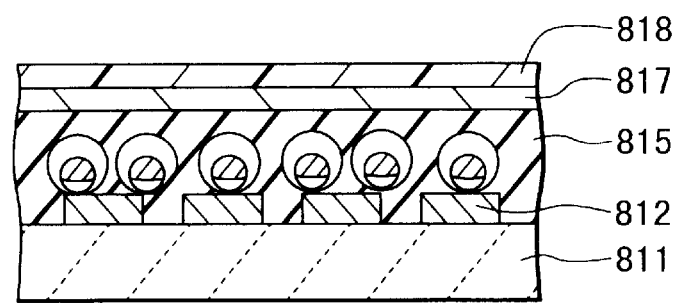

As shown in FIG. 16C, ITO dispersed resin was coated on the display layer to a thickness of 7 $\mu$m to form a common electrode layer 817, and mixed solution of glyoxal of 2.5 mass parts and Gohsefimer Z-200 (Nippon Synthetic Chemical Industry Co., Ltd) of 50 mass parts mixed in pure water of 500 mass parts was coated to form a protective layer 818 having a thickness of 5 $\mu$m. A sheet-like display device was thus formed.

The sheet-like display device formed the texture like paper and was excellent in anti-folding. The sheet-like display device showed a stable contrast without influence of an underlying layer or illumination from the bottom.

The display device shown in FIG. 12A has a display unit and a power source unit. The display device may include, as the electric layer, driver and control circuits for the display unit. The microcapsule may have the structures different from those described above.

[5th Embodiment]

Figure 17A:
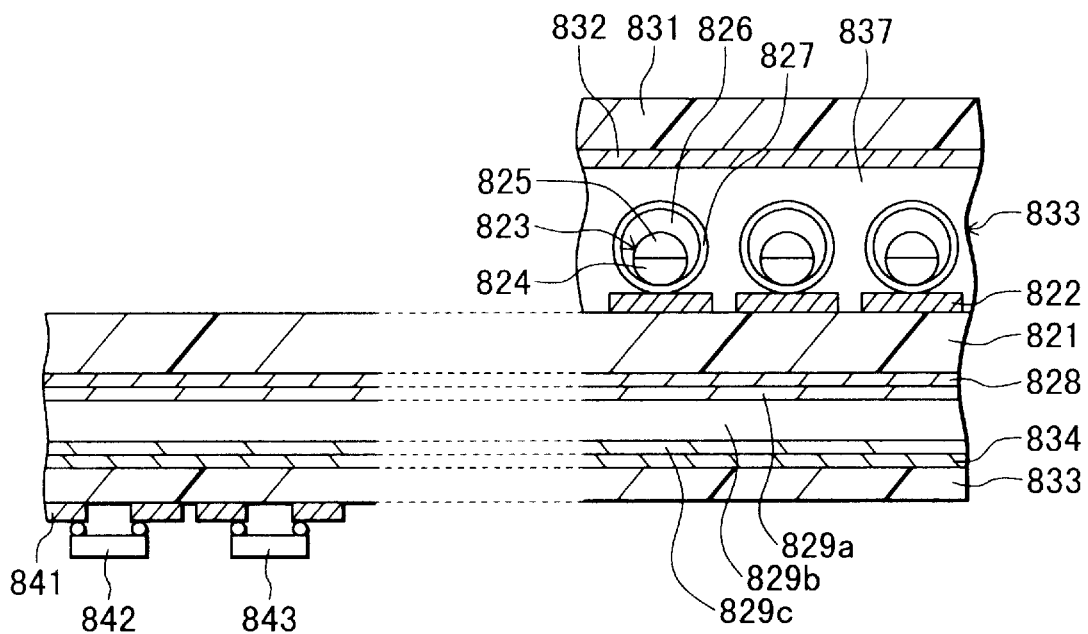
FIGS. 17A and 17B are schematic cross sectional views showing a sheet-like display device according to a fifth embodiment.
Figure 17B:
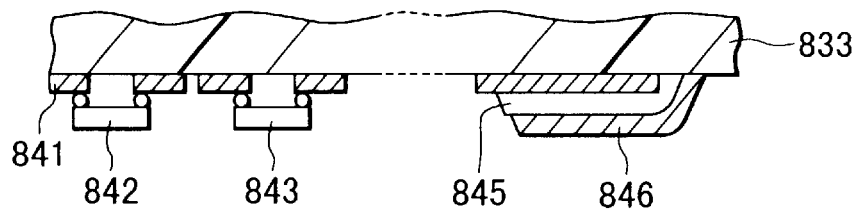

FIGS. 17A and 17B shown a display unit according to the fifth embodiment of the invention. As shown in FIG. 17A, the display unit 820 is formed on a PET film 821 with vapor-deposited ITO electrodes 822 by dispersing microcapsules 833 each containing dielectric liquid 826 and a sphere-like body 823 whose direction can be changed with an electric field, in elastomer 837. The sphere-like body 823 is constituted of two semispheres 824 and 825. The upper surface of the elastomer layer 837 is covered with a PET film 831 having vapor-deposited ITO electrode 832. The other structure of the display unit is similar to that shown in FIG. 12A.

The microcapsule 833 is constituted of a core unit and a resin shell unit 827, the core unit being constituted of a colored sphere-like resin body 823 and dielectric liquid 826 around the sphere-like body. The sphere-like resin body 823 may be formed by heating and melting two types or more of resins having different optical absorption spectra, or by polymerizing a combination of resin monomers added with some coloring group or chromophore. Similar to that described with FIG. 12A, medium surrounding the sphere-like resin body 823 may be water, inorganic or organic aqueous solution, alcohol group, amine group, saturated hydrocarbon, unsaturated hydrocarbon, hydrocarbon halide, natural fat and oil, mineral oil, or synthetic oil. Medium containing sphere-like resin bodies is dipped to form microcapsules by a polymer precipitation method, an interfacial polymerization method, a coacervation method, or the like.

Microcapsules are disposed on the surfaces of the transparent electrodes 822 by screen printing or the like. The other transparent electrode 832 is disposed above the transparent electrode 822 and the structure of the display unit is hermetically sealed. This hermetical sealing of the microcapsules 833 between the electrodes 822 and 832 can be performed by the embodiment method described earlier.

Next, a method of manufacturing a battery as the power source unit will be described. The structure of the power source unit is similar to that shown in FIG. 12A. First, positive electrode active material was prepared as in the following. Acetylene black of 3 mass parts was added to lithium cobalt oxide of 100 mass parts and mixed with a mill. Thereafter, 10% N-methylpyrrolidone solution of polyvinylidene fluoride of 50 mass parts was mixed and knead. Then, this material was coated on the vapor-deposited aluminum layer 828 of the transparent member 821 of the display unit to a thickness of 150 μm, and dried for 30 minutes at 120° C. to obtain the positive electrode active material layer 829*a*.

As the solid electrolytic material, PVDF-HFP (polyvinylidene fuoride-6-propylene fluoride) was used. PVDF-HFP (molecular weight of five hundred thousands) was dissolved in N-methylpyrrolidone and flowed on a flat plate to gradually vaporize solvent to form a PVDF-HFP porous film.

The PVDF-HFP porous film was immersed for one hour in propylene carbonate which contains lithium tetrafluoroborate of 1M, to form a gel solid electrolytic film 829*b*.

The negative electrode active material was prepared by mixing and kneading graphite based carbon of 1 mass part and 10% N-methylpyrrolidone solution of polyvinylidene fluoride of 1 mass part. The negative electrode active material was coated to a thickness of 100 μm on the negative electrode collector made of a copper foil 834 of about 10 μm in thickness and formed on the PET sheet 833, and dried for 30 minutes at 120° C. to prepare a negative electrode active material layer 829*c*. This negative electrode active material layer 829*c* was placed on the electrolytic film 829*b* and pressured at 2 kg/cm² (196 kPa) to form a battery. Positive and negative voltages can be obtained from the collectors 828 and 834 supporting the corresponding electrode active material layers 829*a* and 829*c*.

On one surface (exposed surface) of the negative electrode side PET sheet 833 assembled in the battery, wiring patterns 841 for drive and control circuits were formed by screen printing of silver paste. A driver IC 842 and a control IC 843 were mounted by bare chip bonding and connected to the display unit via the wiring patterns formed on the PET sheet and a wiring connection structure formed on the peripheral area of the PET sheet.

With this embodiment, it was able to manufacture a sheet-like display device integrating a display layer, a secondary battery, and a circuitry for driving and controlling the display layer.

[Modification]

A microphone and a speaker may be added to the structure shown in FIG. 17A.

The display unit of the display device shown in FIG. 17B is similar to that shown in FIG. 17A.

An electret film (with vapor-deposited electrode) 845 was fixed to the layer including the driver circuit and control circuit formed in the manner similar to the embodiment shown in FIG. 17A, the electret film being formed by polling a PVD film (50 μm in thickness) at 10 kV. A wiring pattern 846 was formed by coating silver paste to form a microphone or speaker. It was possible to form a sheet-like display device integrating a display unit, a power source unit, circuits for driving and controlling the display unit, and microphone or speaker.

[6th Embodiment]

By using a method described in JP-A-6-226875, sphere-like bodies were manufactured. Heated and melted wax was divided into two parts. One part was added with titanium dioxide as white inorganic pigment and dispersing agent, and the other part was added with black inorganic pigment (Ferro V-302 manufactured by Ferro Corporation and dispersing agent. The pigment was sufficiently dispersed in melted wax. The white pigment was charged negative, and the black pigment was charged positive, the charge amount was controlled by the addition amount of pigment. In a melted wax state, one dispersing series was supplied to the upper surface of a rotating disk, and the other was supplied to the lower surface. Wax with dispersed pigment was guided to the circumferential area by centrifugal force, upper and lower wax parts fly in unison from the edge of the disk, and each wax droplet made of layers of two color was changed to a sphere-like shape having generally semispheres colored differently because of surface tension. Sphere-like bodies (rotary bodies) having a diameter of about 50 μm were obtained.

Figure 18A:
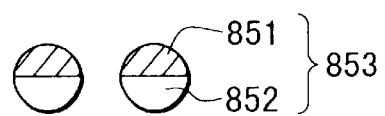
FIGS. 18A to 18E are schematic cross sectional views illustrating a method of forming a microcapsule according to a sixth embodiment.

FIG. 18A is a schematic diagram showing the shape of a sphere-like body. A black semisphere 851 and a white semisphere 852 were combined to form a sphere-like body 853 having semisphere areas colored differently.

Next, a sheet with sphere-like bodies was formed in the following manner by using the method described in JP-A-8-234686. Sphere-like bodies formed in the above manner were dispersed in elastomer (silicone rubber), and the elastomer was cut into a sheet having a thickness of about 100 μm with a doctor blade. Then, the elastomer was solidified.

Figure 18B:
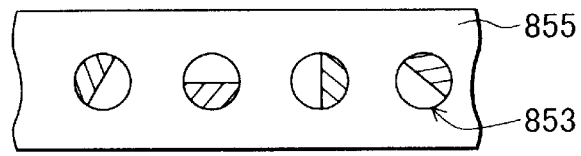

FIG. 18B is a schematic diagram showing an obtained sheet. Sphere-like bodies 853 were dispersed in elastomer 855.

Figure 18C:
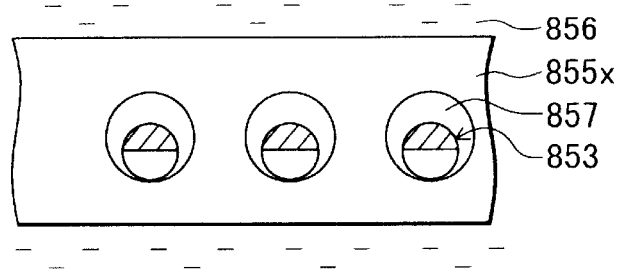

As shown in FIG. 18C, in order to swell the elastomer sheet, it was immersed in liquid (silicone oil) 856 which did not change the shape of the sphere-like body although elastomer was swelled. A space 858 filled with liquid 857 around the sphere-like body was therefore formed in the swelled elastomer sheet 855*x* to allow the sphere-like body 853 rotate freely.

Figure 18D:
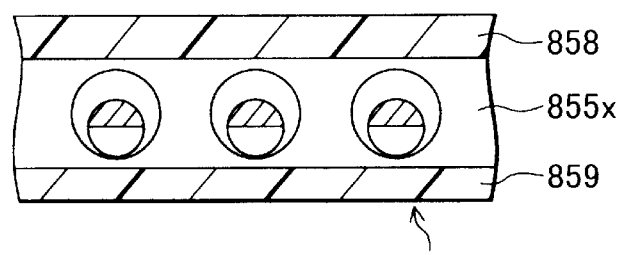

As shown in FIG. 18D, on both surfaces of this sheet, PET films 858 and 859 were attached by using elastomer to obtain a sheet 860 with sphere-like bodies. This sheet was as thin as about 200 μm like paper and had a flexibility of being curved and folded.

Information can be written in this sheet by externally and selectively applying an electric field. For example, this sheet can be used as the display unit such as an electronic wallpaper.

Figure 18E:
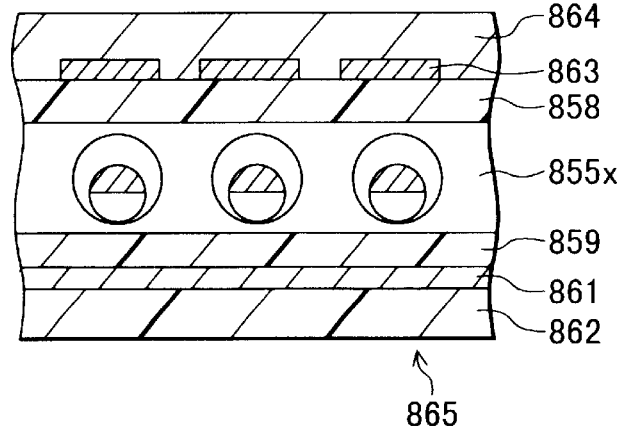

As shown in FIG. 18E, electrodes were formed on both surfaces of the sheet 860. Namely, two PET films 862 and 864 having transparent electrodes 861 and 863 formed by vapor-depositing ITO linearly were attached to the both surfaces of the sheet 860 to dispose electrodes in a lattice pattern and form a sheet-like display device 865. As a voltage was applied to a display element via terminals connected to the electrodes on the both surfaces of the sheet-like display device, an electric field corresponding to the matrix-driven voltage was generated between the electrodes and the sphere-like body rotated reversely in accordance with the direction of the electric field and the white and black display images were able to be reversed.

If two sheet-like display devices are attached, one sheet-like display device capable of displaying images on both display surfaces can be formed. Electronic circuits necessary for driving and controlling the display device and a power source may be formed on a substrate which is connected to the electrodes of the display device.

For example, driver elements are formed in the sheet-like display device 865 in the following manner. As disclosed in JP-A-5-55568, thin film transistors are formed as shown in FIGS. 4C to 4F by laminating organic semiconductor material (such as condensed polycyclic aromatic compound) on a film base. Independent electrodes are formed in correspondence with display pixels, and organic thin film transistors for driving the display elements are formed by a method similar to that described above. The sheet with driver elements is attached to one surface of the sheet with sphere-like bodies, and a film formed with an ITO common electrode is attached to the other surface. White and black images can be displayed by applying an electric field to the sphere-like body corresponding to each pixel through switching of a transistor.

A polymer battery in a film shape as a power source unit may be integrally formed. Such a battery can be formed on a PET film with vapor-deposited aluminum layer. This film is attached to the sheet-like display device to form an integrated display device. The battery was formed, for example, by the method described with reference to FIG. 17A.

As shown in FIG. 17B, on one surface (exposed surface) of the negative electrode side PET sheet assembled in the battery, wiring patterns for drive and control circuits were formed by screen printing of silver paste. A driver IC and a control IC were mounted by bare chip bonding and connected to the display unit via the wiring patterns formed on the PET sheet. As the driver circuit, organic semiconductor transistors can be used as described earlier. It was therefore possible to obtain a display device integrating display elements, a secondary battery and a drive and control circuit.

Another function may be added, if necessary, to the display element or device described above in order to obtain various display devices capable of being used in various fields. For example, a communication circuit may be integrally formed with the sheet-like display element in order to exchange information with an external device. In this case, the mount method for the driver and control circuit described above may be used.

Information carrier may be electromagnetic energy, optical energy, acoustic energy or the like. For the electromagnetic energy, radio waves in a microwave band, an ultra short wave band or a medium wave band may be used or electromagnetic induction superposed upon a carrier of about several tens to several hundreds kHz may be used directly. An antenna for transmission/reception of radio waves can be assembled with a sheet-like display device by a method suitable for forming a sheet-like element, such as screen printing.

For the optical energy, modulated or non-modulated light having any wavelength from infrared light to ultraviolet light may be used. A transducer for light transmission/reception may use a light emitting diode, a laser diode, an electric field light emission element, a plasma light emission element, a fluorescent light emission element or the like as the transmission element, and may use a photodiode, a phototransistor, a CdS element for the reception element.

For the acoustic energy, acoustic signal of several tens Hz to several tens MHz may be used as a carrier for communications. In this case, a sheet-like acoustic signal conversion element can be used. An acoustic signal conversion element may be a sheet-like conversion element made of piezoelectric conversion material such as PZT and PVDF. A conversion element integrated with a sheet-like display device can be formed by depositing the piezoelectric conversion material on one surface of the display device and under the driver electrodes, through printing, casting or the like.

An acoustic signal conversion element for an audible frequency band of several tens Hz to several tens kHz can be used as a microphone for converting human voices or the like into electric signal, or conversely as a speaker for generating audible sounds. With such a communication function, a sheet-like display device can be used as a display device capable of dealing with so-called multimedia information in spite of its flexible, light and sheet-like structure.

A so-called digitizer function may be provided on the display surface or a handwriting function with an electronic pen may also be added. Handwritten information can be picked up by reading surface charges of the sphere-like body.

[7th Embodiment]

With reference to FIGS. 19A to 19D, a method of preparing sphere-like resin bodies according to the seventh embodiment of the invention will be described. Sodium dodecyl sulfate of 0.1 mass part as surfactant was dissolved in pure water of 750 mass parts. Mixed with this solution was a monomer phase of mixture of styrene monomer of 75 mass parts and azo based polymerization initiator (V-65 manufactured by Wako Pure Medicine Co., Ltd.) of 4 mass parts. By using a high pressure homogenizer, monomer emulsion was prepared. Next, mixed with this monomer emulsion was suspension of 94 mass parts (polyethylene wax density of 40 wt %) suspended with polyethylene wax as resin particles. The obtained mixture was cooled to a temperature of 5° C. and gently stirred to form composite resin particles and monomer particles. Mixed with suspension of composite particles was sodium dodecyl sulfate of 0.5 mass part as surfactant to thereafter perform polymerization for 8 hours at 70° C. After polymerization, composite particles ware observed with an electron microscope.

Figure 19A:
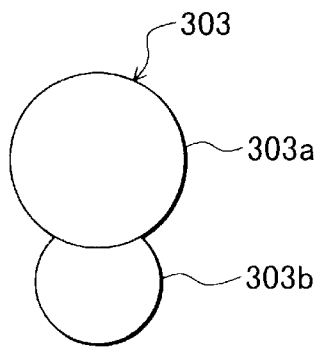
FIGS. 19A to 19D are schematic cross sectional views illustrating a method of forming a microcapsule according to a seventh embodiment.

As shown in FIG. 19A, it was confirmed that an obtained composite particle 303 was a sphere-like resin body (5 to 10 μm in a long axis direction) having two spheres 303a and 303b.

In the above example, carbon black (manufactured by Cabot Corporation) was dispersed in polyethylene wax, and titanium dioxide (manufactured by Titanium Industries Co., Ltd) was dispersed in styrene monomer. The other materials and processes were the same as those described above. After polymerization, obtained composite particles were observed with an optical microscope.

Figure 19B:
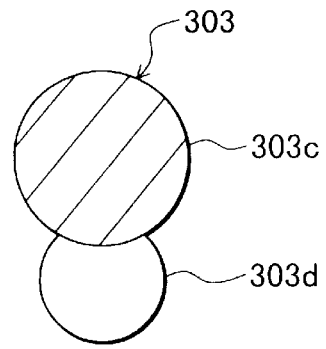

As shown in FIG. 19B, it was confirmed that an obtained composite particle 303 was a sphere-like resin body having two spheres 303c and 303d and that the each sphere had black and white semispheres.

Prepared sphere-like resin bodies of 0.56 mass part were added to fluid paraffin of 56 mass parts. Sodium dodecyl sulfate of 1.2 mass parts as surfactant and calcium tertiary phosphate of 4.4 mass parts as suspension stabilizer were dissolved in pure water of 800 mass parts to form dispersion preparatory liquid. The fluid paraffin containing sphere-like resin bodies and dispersion preparatory liquid were processed by a homogenizer to form fluid paraffin suspension liquid.

Next, potassium peroxodisulfate of 8.6 mass parts as polymerization initiator and methyl methacrylate (monomer) of 12 mass parts were introduced into pure water of 200 mass parts to prepare monomer emulsion by using a high pressure homogenizer. The monomer emulsion was dipped into the fluid paraffin suspension to polymerize the monomers for 8 hours at a temperature of 70° C. After polymerization, this reaction solution was observed with an electron microscope.

Figure 19C:
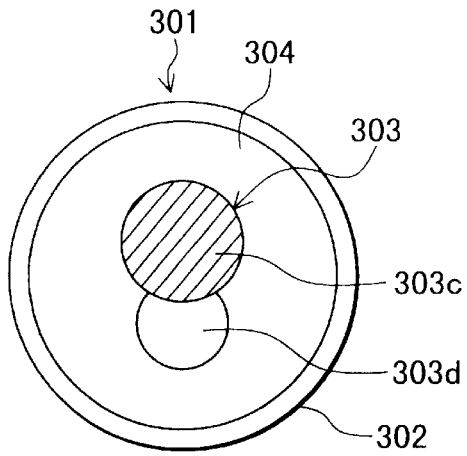

FIG. 19C is a schematic sketch of an obtained particle. It was confirmed that a sphere-like resin body 303 having two spheres (white and black spheres) existed in liquid paraffine 304 in a shell 302 made of resin of a microcapsule 301. This sphere-like body can rotate in the shell and can be used with a display device. However, a rotation has some resistance perhaps because of its anisotropic shape. It is desired to have an isotropic shape in order to rotate the body smoothly. The obtained microcapsule was gently stirred in an oil bath at 140° C. to heat it for 1 hour, then it was observed with a microscope.

Figure 19D:
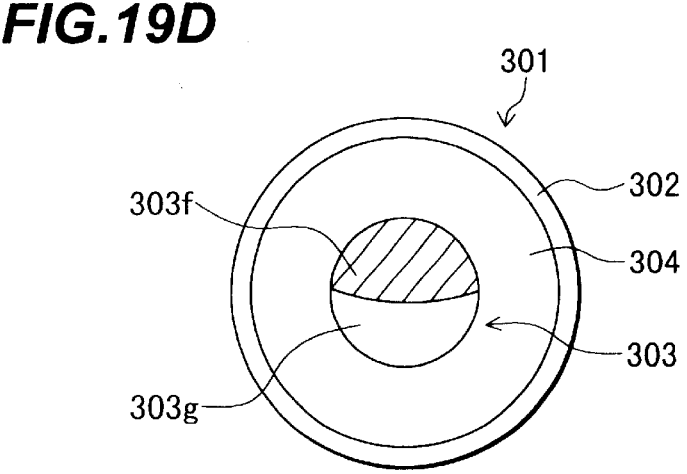

As shown in FIG. 19D, two spheres in the microcapsule changed to two semispheres 303f and 303g and combined in one sphere. This microcapsule can be used with display devices shown in FIG. 17A and other drawings.

Figure 20A:
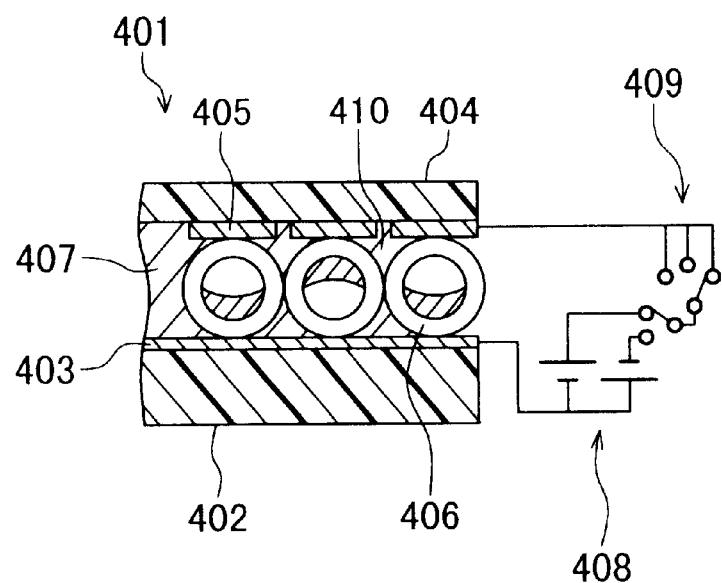
FIGS. 20A and 20B illustrate a sheet-like display device using sphere-like bodies.
Figure 20B:
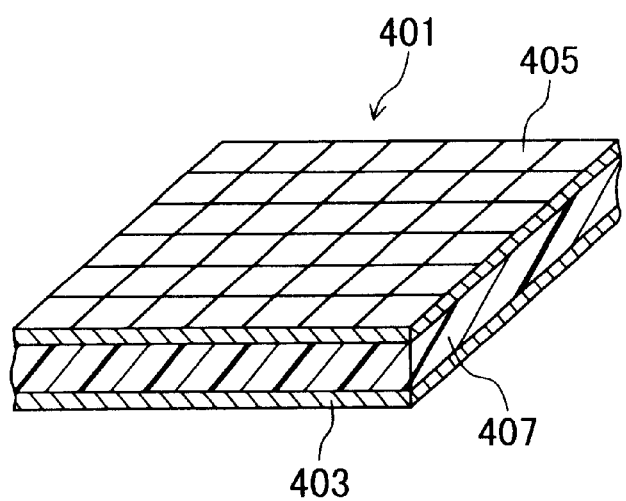

With reference to FIGS. 20A and 20B, a sheet-like display device using microcapsules containing sphere-like resin bodies will be described.

As shown in the perspective view of FIG. 20A and in the structural diagram of FIG. 20B, a sheet-like display device 401 has a base 402 and a transparent member 404 disposed with a common electrode forming surface and an independent electrode forming surface facing each other. The base 402 is made of PET (polyethylene terephthalate), paper or the like and has on its one surface an ITO vapor-deposited common electrode 403. The transparent member 404 is made of a PET film or the like, used as a protective layer, and has ITO vapor-deposited independent electrodes 405. Microcapsules 406 are disposed between the common and independent electrodes to form a display layer 407. The microcapsule contains a sphere-like body, e.g., having two regions of different colors charged reversely and floating in dielectric liquid (alternatively the microcapsule is formed by filling a dispersion series having a number of electrophoretic particles dispersed in dielectric liquid). The common and independent electrodes 403 and 405 are connected to a power source unit 408 and a driver circuit 409 as illustratively shown in FIG. 20B. These unit and circuit may be integrally formed with the sheet-like display device 401 or discretely formed.

Figure 21A:
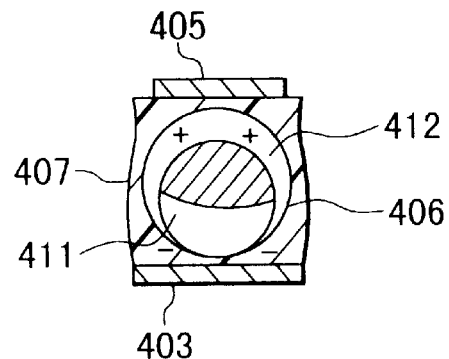
FIGS. 21A to 21D are cross sectional views illustrating a display principle of a display element using sphere-like bodies.
Figure 21B:
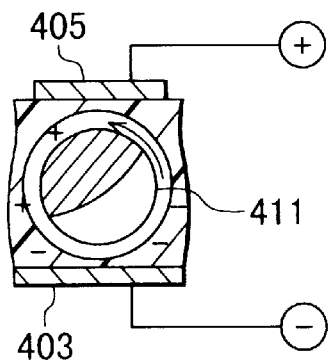
Figure 21C:
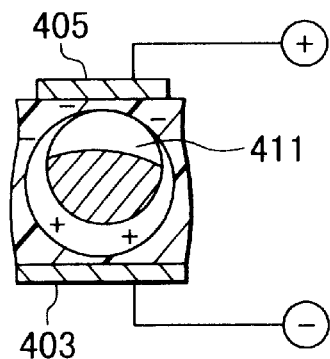
Figure 21D:
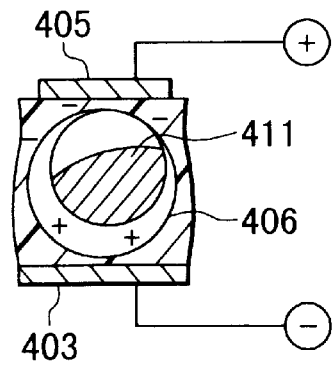

With reference to FIGS. 21A to 21D, the display principle of a display element having a sphere-like body will be described. A sphere-like body 411 contained in a microcapsule 406 together with dielectric liquid 412 is colored, e.g., black and white. The black region is charged positive, and the white region is charged negative somewhat strongly (FIG. 21A). In this state, the black region of the sphere-like body 411 is directed upward and a black color is observed from the external. As an electric field is applied between the independent electrode 405 and common electrode 403 (FIG. 21B), the sphere-like body 411 fixed by adhesion to the inner wall of the microcapsule 406 rotates and moves to the upper area of the microcapsule 406 and is fixed to the inner wall of the microcapsule (FIG. 21C). Therefore, the display color changes from black to white and even after the electric field is turned off, the white color is retained (FIG. 21D). Oil or the like which has electric insulation and does not dissolve the sphere-like body 411 is used as the dielectric liquid 412 to be filled in the microcapsule 406.

Next, the sphere-like resin body will be described. The sphere-like resin body is a sphere-like particle constituted of different types of resin materials which are combined together and do not dissolve each other. A combination of resin materials which do not dissolve each other is preferably a combination which has an absolute difference between resin solubility parameters (δ) of at least 0.2 or higher. The resin solubility parameter (δ) is given by the Small method as:

$$\delta = \rho / M \times \Sigma Fi$$

where ρ is a resin density, M is a molecular weight of a repetition unit of polymer constituting resin, and Fi is a contribution factor to the solubility parameter of the functional group contained in polymer. The value of Fi is described, for example, in J. Appl. Chem., 3, 71 (1953).

If resin is made of compound, it is preferable that the absolute difference of solubility parameters of resin materials constituting compound is 0.2 or smaller and that the absolute difference of solubility parameters of resins constituting the sphere-like body is 0.2 or higher. This is also applied to the case that both the resin materials of a sphere-like body are made of compound.

Examples of a combination of resin materials of the sphere-like resin body which do not dissolve each other are polyethylene-polypropylene, polyethylene-polyvinyl chloride, polyethylene-polyisobutylene, polymethyl methacrylate-polyvinyl chloride, polymethyl methacrylate-polystyrene, polypropylene-polystyrene, and the like. The invention is not limited only to those combinations. If one resin and the other resin do not dissolve each other, one or both of the two resin materials may be copolymer or a compound of a plurality of resin materials.

The sphere-like resin body which is a sphere-like particle constituted of different types of resin materials which are combined together and do not dissolve each other, can be manufactured, e.g., (1) by melting and combining two different resin particles, (2) by polymerizing monomers of one resin on the surface of the other resin particle to precipitate and grow the other resin, or by other methods. The manufacture method for a sphere-like resin body is not limited only to these methods.

The diameter of a sphere-like resin body used for a display element is in a range from several μm to several hundreds μm, or preferably about several tens μm. It is preferable that both resin materials constituting a sphere-like resin body have a sufficient separation at its contact surface (i.e., interface). In a sphere-like resin body having a diameter of several tens μm and a perfect phase separation between both resin materials, it is therefore preferable that a thickness of a mutual diffusion phase at the interface is about several μm at a maximum.

If one resin is precipitated on the surface of the other resin (source resin) particle by polymerization, it is necessary that the source resin is not dissolved by the resin monomer to be precipitated. In melting and attaching both resin materials of a sphere-like resin body, it is necessary for both the resin materials to have different specific gravities in order to make both the resin materials have a perfect phase separation.

The sphere-like resin body is prepared so that both the resin materials have different colors and electric characteristics. Sphere-like resin bodies are formed into microcapsules to form a display device. Binary images can be formed upon application of voltage because the sphere-like resin bodies rotate and colors as viewed along a specific direction change.

Resin is colored by (1) dispersing dye or pigment in resin, (2) coloring the surface of resin with dye or pigment, or other methods. The coloring methods are not limited to only these methods. Dye and pigment to be used are not specifically limited so long as they do not adversely affect the characteristics and performance of microcapsules.

If white pigment is contained in one resin material of a sphere-like resin body, the sphere-like resin body has a high whiteness degree. Examples of white pigment are titanium dioxide, silica, zinc white, alumina and the like. If black pigment is contained in the other resin material, the sphere-like resin body has an excellent contrast. Examples of black pigment are magnetite, ferrite, carbon black and the like.

The electrical characteristics of one resin region of a sphere-like resin body can be made different from the electrical characteristics of the other resin region by adding pigment. For example, by adding titanium dioxide providing an electric charging nature, the electrical characteristics of both the resin materials can be made different. It is also effective that charge control agent is added in order to provide the charging nature to one resin material of a sphere-like resin body. The charge control agent usable for a sphere-like resin body may be nigrosine dye, triphenylmethane based dye, quaternary ammonium salt or the like as positive charge control agent, salicylic acid based compound, boron based compound or the like as negative charge control agent.

Sphere-like resin bodies are dispersed in insoluble liquid. A droplet containing only one sphere-like resin body is covered with transparent or light transmitting resin to obtain a microcapsule. Such microcapsules are coated on a predetermined sheet. In this manner, a sheet-like display device excellent in portability and capable of freely deforming can be formed. As a method of forming a microcapsule, usual methods can be used such as a soap free emulsion polymerization method and a complex coacervation method.

If the sphere-like resin body in a microcapsule is heated, this sphere-like resin body can be changed to a perfect sphere or a shape like a perfect sphere. By forming a display element having a sphere-like resin body having a perfect sphere shape or a shape like a perfect sphere, an image display medium with small noises and excellent contrast can be provided. In heating the sphere-like resin body in a microcapsule, it is desired that the melting temperature of the sphere-like resin body is lower than that of resin of the film of the microcapsule in order not to melt the film. The sphere-like resin body may be changed to a perfect sphere or a shape like a perfect sphere, prior to entering the sphere-like resin body into a microcapsule.

If microcapsules each containing a sphere-like resin body are coated on a support with electrodes, it is possible to form an image display device whose sphere-like resin bodies rotate upon application of voltage. A coating method may be a blade method, a screen printing method, a roller printing method, a spray printing method, an ink jet printing method or the like. For example, a microcapsule is fixed to the support by dispersing microcapsules in thermosetting resin or ultraviolet setting resin, coating the solution on the support, and thereafter performing a setting process suitable for dielectric liquid resin.

An image display device may be formed by another method. Namely, one resin region of a microcapsule is colored with black pigment, and the other resin regions are colored in red, green and blue. Three types of microcapsules are formed by using these resin regions, and microcapsules of each type are coated on the support in a predetermined linear pattern. An effective method of forming a linear pattern is to coat solution of dielectric liquid resin dispersed with microcapsules of each type on the support by screen printing. An electric field of a predetermined pattern is applied to each of three types of microcapsules of the image display device and each microcapsule is controlled independently to rotate the sphere-like resin body as the core unit. In this manner, a color image of eight values can be displayed.

The sphere-like resin body can be used as a display sphere-like particle in the microcapsule used by the display element of a sheet-like display device. The sphere-like resin body may be used for other applications. For example, by utilizing a rotation and color change of the particle in an electric field, a simple voltage meter is realized, or a charge distribution of a photosensitive body as in electronic photography can be measured.

A microcapsule containing a sphere-like resin body can be effectively used with a display element of a flexible and thin sheet-like display device. It can also be used with a display element of other display devices.

For example, a microcapsule as a display element has a shell (capsule film) made of resin and a core (core material) contained in the shell. The core contains electrophoretic particles and liquid having a different color from the particles.

The resin of the shell (capsule film) of a microcapsule containing electrophoretic particles is formed by polymerizing monomers having ethylenic unsaturated bonds. The shell contains electrophoretic particles and dielectric liquid generally colored with coloring agent (e.g., dye) and dispersed with the particles. Polymerization used for forming a shell is emulsion polymerization for polymerizing fine particles of monomers having ethylenic unsaturated bonds in water, under the presence of the electrophoretic particles, liquid dispersed in the water and colored in different color from that of the electrophoretic particles with coloring agent, and polymerization initiator.

Since polymerization is performed in water, it is important that the liquid contained in the microcapsule is insoluble in water or hard to be dissolved. Generally oil-like material is used as this liquid. The dielectric liquid is required to have a chemical characteristics that the liquid does not dissolve monomer having ethylenic unsaturated bonds or its polymer, and dissolves coloring agent such as dye. Examples of such dielectric liquid are hydrocarbon, hydrocarbon halide, alcohol, carboxylic anhydride, silicone oil, animal and plant oil and the like. It is preferable to use isoparaffin, oleic acid, silicone oil, animal and plant oil or the like which are less volatile and stable liquid. A compound of a plurality of liquids may also be used.

Electrophoretic particles may be titanium dioxide, carbon black, pigment particles, particle resin containing pigment particles, and the like, although any fine particles may be used which can be contained in a microcapsule and are capable of electrophoresis. The electrophoretic particles are not limited to only those described above. Examples of pigment particles are (1) azo pigments such as soluble azo group, monoazo group and bisazo group, and (2) polycyclic pigment such as phthalocyanine group, quinacridone group, perylene group, perynone group and isoindoline group. The pigment particles are not limited to only those described above. Although titanium dioxide is typical for the electrophoretic particles, other particles may also be used such as know colloidal particles, various organic and inorganic pigment and dye, metal powders, fine particles of resin or the like.

In order to form a display device capable of being driven at a low consumption power, it is necessary to prevent condensation of titanium dioxide used as electrophoretic particles and to raise the zeta potential. To this end, it is effective to process the surface of an electrophoretic particle by using resin, alumina or the like. In order to form a display device having an excellent contrast, it is desired that the electrophoretic particles are contained in the microcapsule at a volume ratio of 15% or more to the dielectric liquid.

Image display by electrophoretic particles is realized because the particles in the microcapsule move in the liquid upon application of an external electric field. Therefore, the particles in the microcapsule and liquid are colored in different colors. This coloring is performed generally by using dye as coloring agent. Any dye may be used so long as it is soluble to dielectric liquid. In order to form a display device having an excellent contrast, it is desired to use dye having an opposite hue to that of electrophoretic particles. It is also desired that the density A (mol/l) of dye is $0.2 \leq A \cdot 2R \cdot B$ where R (cm) is the diameter of a microcapsule and B (1/(mol·cm)) is a mol light absorption coefficient of dye in dielectric liquid.

Monomer for forming a shell (capsule film) may be any monomer if it has ethylenic unsaturated bonds. Examples of such monomer are (1) styrene derivatives such as o-methylstyrene, p-phenylstyrene, and p-n-dodecylstyrene, or styrene, (2) olefin group such as ethylene, propylene, and buthylene, (3) vinyl halide such as vinyl chloride, vinyl bromide, and vinyl fluoride, (4) vinyl ester group such as vinyl acetate, vinyl benzoyl acid, and vinyl propionic acid, (5) α-methylene fatty acid monocarboxylic ester group such as methyl methacrylate, ethyl methacrylate, propyl methacrylate, dodecyl methacrylate, dimethylamino ethyl methacrylate, and phenyl methacrylate, (6) acrylate ester group such as methyl acrylate, ethyl acrylate, and n-butyl acrylate, (7) vinyl ether group such as vinyl methyl ether and vinyl ethyl ether, (8) vinyl ketone group such as vinyl methyl ketone, vinyl hexyl ketone, and methylisopropenyl ketone, (9) vinyl compound such as N-vinyl pyrrole, N-vinyl carbazole, N-vinyl pyrrolidone, (10) acrylate or methacrylate derivatives such as acrylonitrile, methacrylonitrile, and acrylamide, and the like.

Polymerization of monomers starts by the reaction of polymerization initiator. Typical examples usable as polymerization initiator are persalfate such as sodium persulfate, azo group compounds such as 2,2'-azobis (2,4-dimethylvaleronitrile) and 2,2'-azobis (isobutyronitrile), and the like. The polymerization initiator is used at a density of 0.01 to 10 wt % relative to the weight of monomer.

In manufacturing a microcapsule containing electrophoretic particles, droplets containing electrophoretic particles are formed, the droplet forming the core unit of the microcapsule and being made by dispersing electrophoretic particles and dielectric liquid colored with dye in water with a homogenizer or the like. The diameter of a droplet can be set as desired by controlling stirring shear force and time and by adjusting a mixture ratio of dielectric liquid to water. Similarly, monomer fine particles are dispersed in water by using a homogenizer or the like. In order to react monomers on the surface of a droplet at a later polymerization process, the diameter of a monomer fine particle is required to be smaller than that of a droplet.

In order to change dielectric liquid into droplets in water, it is effective to add surfactant or dispersing agent in order to prevent condensation of droplets. In order to disperse monomer fine particles in water, it is also effective to add surfactant or dispersing agent. The surfactant may be any of negative ion surfactant, positive ion surfactant, and non-ion surfactant. The dispersing agent may be inorganic fine particles such as calcium tertiary phosphate.

Next, droplet dispersed liquid and monomer dispersed liquid are mixed to prepare polymerization preparatory liquid. While this polymerization preparatory liquid is heated, liquid dissolved with polymerization initiator is dipped into or mixed with the polymerization preparatory liquid to form the shell unit of a microcapsule. The polymerization reaction together with a crosslinking reaction can form a stable microcapsule whose shell unit is not soluble and cannot be melted.

Microcapsules manufactured in the above manner are separated from the polymerization liquid and dispersed in hardenable resin or water soluble resin to form coating liquid. This coating liquid is coated on the electrode layer formed on one surface of a sheet base, heated and dried to from a sheet-like display element (this element itself may be used as a sheet-like display device) having a microcapsule layer on the electrode layer. If microcapsules are coated on the base by using hardenable resin which does not dissolved in water, generally solvent having a high solubility of hardenable resin is used. In order to prevent the shell unit of a microcapsule from being invaded by such solvent, it is necessary to crosslink the shell unit of the microcapsule and provide insolubility relative to the solvent.

The manufactured display device can display an image corresponding to an externally applied voltage pattern because the electrophoretic particles in each microcapsule move. In applying voltage, an electrode or charged material is made in contact with the surface of the microcapsule layer, or an electron beam or ion beam is applied to charge the surface of the microcapsule layer.

Next, the processes of manufacturing a microcapsule containing electrophoretic particles to be used with a display device will be detailed by taking as an example, forming the shell of a microcapsule by using methyl methacrylate.

A first process is to form dielectric liquid dissolved with dye and dispersed with electrophoretic particles. First, dye is added to dielectric liquid, and stirred by a proper method to color the dielectric liquid. Next, electrophoretic particles are added to this liquid and vibrated and stirred by using an ultrasound generator or the like to prepare dispersion oil liquid with dispersed electrophoretic particles. It is important that dye is dissolved in the dielectric liquid and electrophoretic particles are dispersed sufficiently. Therefore, the orders of adding dye and electrophoretic particles to dielectric liquid may be reversed or both dye and electrophoretic particles may be added at the same time.

A second process is to prepare emulsion of water as the dielectric liquid and dispersion material as the electrophoretic particles dispersed oil liquid, from the electrophoretic particles dispersed oil liquid. Emulsion can be prepared by mixing water dissolved with surfactant or dispersing agent with the dispersion oil liquid while the water is stirred with a homogenizer or the like. A mixture ratio of water to dispersion oil liquid is in a range of 99:1 to 50:50, and preferably in a range of 70:30 to 95:5. By controlling the stirring time and speed, a shear force and the density of surfactant or dispersing agent, the diameter of a droplet of the dispersion material can be changed from about 0.1 $\mu$m to about 100 $\mu$m.

A third process is to prepare dispersion liquid of methyl methacrylate monomers. By mixing monomers with water and stirring them with a homogenizer or the like, dispersion liquid can be prepared. The density of monomers is desired to be 2 to 50 wt %. The diameter of a dispersed monomer is required to be smaller than that of an oil droplet in the emulsion prepared in the second process, e.g., 0.1 to 50 $\mu$m. It is desired that an average diameter ($\mu$m) of a dispersed monomer satisfies a relation of $p/10 \leq m \leq 2p$ where p ($\mu$m) is an average diameter of oil droplets formed in the second process, in order to reduce by-product particles (not containing oil droplet) made of only polymer which is formed if methyl methacrylate is not effectively polymerized on the droplet surface and but polymerized in water.

A fourth process is to perform a polymerization reaction while the emulsion prepared in the second process and the dispersion liquid of methyl methacrylate prepared in the third process are mixed and stirred. A polymerization initiator (such as potassium persulfate) necessary for starting the polymerization reaction may be dissolved in the emulsion prepared in the second process or in the dispersion liquid of methyl methacrylate prepared in the third process before the emulsion and dispersion liquid are mixed, or aqueous solution dissolved with the polymerization initiator may be added to the reaction system when the emulsion and dispersion liquid are mixed. Crosslinking agent may also be dissolved. The polymerization temperature is about 50 to 95° C. and the reaction time is about 5 to 10 hours. In order to prevent condensation of polymers of methyl methacrylate to be caused by a rapid polymerization reaction, it is preferable to adjust the supply speed and stirring speed of polymerization initiator aqueous solution. For example, the polymerization initiator aqueous solution is supplied at the flow rate of about 2.5 to 30 ml/min and the stirring speed is set to about 10 to 400 rpm.

A fifth process is to classify and dry microcapsules. Microcapsules dispersed in water after polymerization are subjected centrifugation to remove fine byproduct particles unusable with a display device. These microcapsules are filtered to pick up them from water, and dried to completely remove water contents.

A sixth process is to form a sheet-like display element (in some case, this element itself may be used as a sheet-like display device) by forming coating liquid by dispersing the microcapsules obtained in the fifth process in water which contains water soluble resin or hardenable resin, coating the coating liquid on the electrode layer formed on one surface of a sheet-like base, and by drying the coating liquid (in the case of water soluble resin) or hardening the hardenable resin. In order to dry the coating liquid, it is heated to vaporize water. As the water is vaporized, dissolved resin is precipitated so that microcapsules are fixed to the base. In order to harden the hardenable resin, heating, radiation or the like is performed depending upon the type of resin. Also in this case, as the resin is hardened, microcapsules are fixed to the base.

The manufacture of microcapsules which contain electrophoretic particles and a sheet-like display element using the microcapsules has been detailed. It is obvious that the invention is not limited only to this manufacture method, but various other methods may be applied. For example, the polymerization initiator and polymerization temperature and the like may be determined depending upon the type of monomer.

The shell (capsule film) of a microcapsule formed by the complex coacervation method (one type of phase separation methods) is very thin, whereas the shell of a microcapsule formed through precipitation from a continuous phase is robust having a desired strength, because as understood from the above description, precipitation of polymer is repeated by polymerization reactions of monomers around droplets constituting the core unit. The thickness of a shell can be changed with the type and density of monomer, the polymerization reaction conditions (e.g., polymerization reaction temperature and time, stirring speed and the like), and the like. A desired strength of the shell can therefore be obtained.

Generally, the shell of a microcapsule formed by a complex coacervation method or the like has approximately a sphere-like shape without rough surface, because this shape reflects approximately a sphere having a smooth surface of a droplet constituting the core before polymerization reaction. In contrast, the outer surface of the shell of a microcapsule formed through precipitation from a continuous phase is rather rough because the shell is formed through repetitive precipitations of polymer around the core. Therefore, the outer periphery length of a microcapsule formed by the coacervation method or the like is equal to the circumferential length of the microcapsule cross section regarded as a circle. In contrast, the outer periphery length of a microcapsule formed through precipitation from a continuous phase is much longer than that of a microcapsule having an apparently same size and formed through the coacervation method of the like.

Assuming that the core particle diameter is 200 $\mu$m and the dispersed monomer particle diameter is 0.1 to 20 $\mu$m, the circumferential length L of a microcapsule formed through precipitation from a continuous phase is $L=4.1\times T$ where T ia a Martin diameter of the microcapsule, if the shell is formed through polymerization reactions of dispersed monomer particles having the minimum diameter of 0.1 $\mu$m, whereas the length $L=20.1\times T$ if the shell is formed only by the dispersed monomer particles having the maximum diameter of 20 $\mu$m. The circumferential length L of a microcapsule is therefore in a range of $(4.1\times T)\leq L\leq (20.1\times T)$.

The "Martin diameter" was defined by Martin and represents the diameter of a single particle having an irregular shape. The Martin diameter is defined as the length of a bisector which halves along a predetermined direction the area of a particle projected upon a horizontal surface, the particle being dropped on the horizontal surface and taking a stable still state.

The core particle diameter can be measured, for example, with an optical microscope. The capsule circumferential length and Martin diameter can be obtained, for example, from an outline photograph of the capsule taken with an optical or electron microscope and the evaluation (image processing) of the outline. Such measurement and evaluation are generally used and the detailed description is not necessary.

In order for a microcapsule to have a practically usable strength, it is preferable that the shell has a thickness of 3 $\mu$m or more. As already described, since the shape of a microcapsule is not strictly a sphere, the shell thickness is assumed to be a value obtained by subtracting the Martin diameter from the core particle diameter.

The microcapsule may contain magnetophoretic particles or sphere-like body together with transparent dielectric liquid, in place of electrophoretic particles. If the magnetophoretic particles are to be contained, the microcapsule can be manufactured by the method similar to that for electrophoretic particles. If the sphere-like body together with transparent liquid is to be contained, the microcapsule can be manufactured by forming a droplet which contains one sphere-like body together with transparent dielectric liquid and by forming the cell covering this droplet. Of manufactured microcapsules, there are microcapsules not containing the sphere-like body. In order to separate these microcapsules, (1) they are precipitated by utilizing a specific gravity difference, (2) they are removed by electrophoresis upon application of an electric field, or they are removed by using other methods.

Particles capable of moving under a magnetic field are those particles of iron, nickel, iron-nickel alloy, iron-nickelchrome alloy, cobalt, cobalt-aluminum alloy, samarium-cobalt alloy, and magnetite, and resin particles dispersed with these particles.

A droplet containing a sphere-like body may be formed by (1) dripping dielectric liquid dispersed with sphere-like bodies from a nozzle into water, (2) stirring dielectric liquid dispersed with sphere-like bodies in water, or by other methods. In order to stably disperse droplets in water, it is effective to add surfactant, dispersing agent or the like. Surfactant, dispersing agent or the like is also effective for dispersing monomer dispersed fine particles in water. The surfactant may be any of negative ion surfactant, positive ion surfactant, and non-ion surfactant. The dispersing agent may be inorganic fine particles such as calcium tertiary phosphate.

[8th Embodiment]

Figure 22:
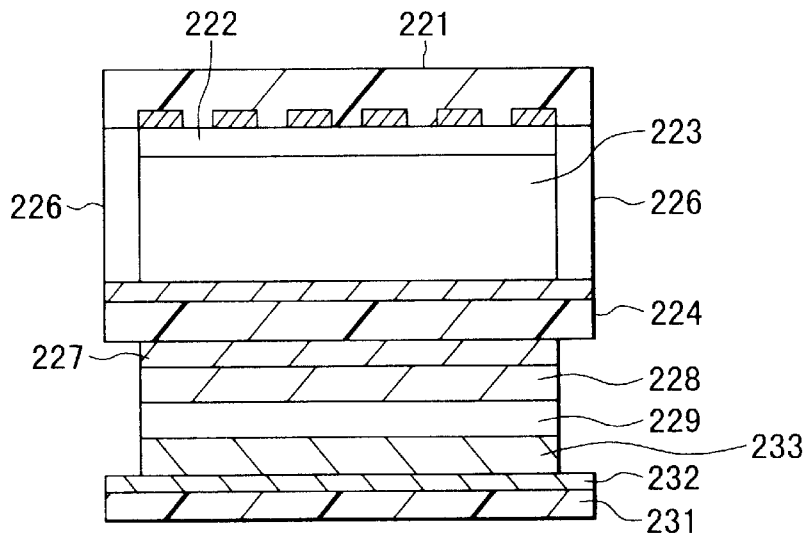
FIG. 22 is a schematic cross sectional view showing a sheet-like display device according to an eighth embodiment.

With reference to FIG. 22, the eighth embodiment will be described. Two transparent PET films 221 and 224 were prepared which had electrodes (stripe patterned at 5 lines/mm) having a surface resistance of 10Ω☐ and made of vapor-deposited ITO thin film. Paste was coated to a thickness of 5 μm on one electrode layer (display electrode) of the PET film 221, and dried for 1 hour at 100° C. The paste was formed by mixing tungsten oxide dust (particle diameter of 0.5 μm) of 10 mass parts and polyvinyl alcohol of 3 mass partes and adding this mixture to water of 5 mass parts. In this manner, an electrochromic thin film 222 was formed. Polyacrylonitrile of 5 mass parts, propylene carbonate of 2 mass parts, and $LiBF_4$ of 1 mass part were mixed, and this mixture was flowed on the electrochromic thin film 222 to a thickness of 10 μm with a doctor blade. Thereafter, the propylene carbonate was gradually evaporated at 80° C. to form an electrolytic layer 223. The PET film 224 having the other electrodes (opposite electrodes) was attached to the PET film 221 in such a manner that the electrode patterns crossed each other. The sides of this structure were hermetically sealed with sealer 226 of epoxy resin based adhesive to form the display unit.

The manufactured display unit has, as shown in FIG. 22, the display electrodes 221 with the electrochromic thin film 222, the electrolytic layer 223, and the opposing electrodes 224.

An aluminum layer (300 nm) 227 was vapor-deposited on the surface of the PET film 224 opposite to the ITO vapor-deposited opposing electrodes. This aluminum layer can be used as a positive electrode collector of a battery. Similar to the structure shown in FIG. 12A, on this Al layer 227, a positive electrode active material layer 228 and an electrolytic layer 229 were formed. On a copper layer 232 of a PET film 231, a negative electrode active material layer 233 was formed which was then attached to the electrolytic layer 229.

In the above manner, it was possible to form a sheet-like display device having an integrated electrochromic element as a display element and a secondary battery.

[9th Embodiment]

Figure 23:
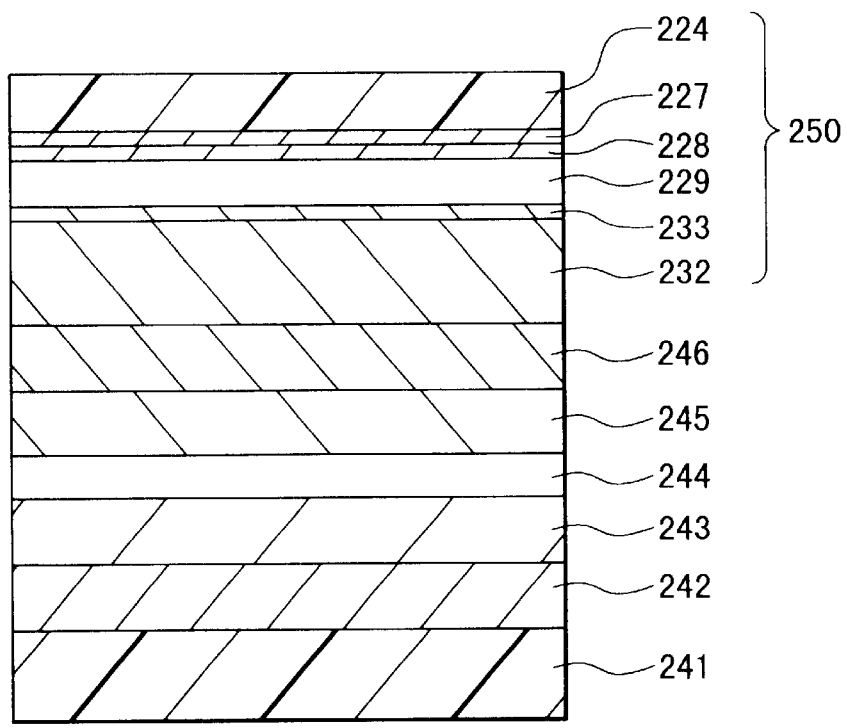
FIG. 23 is a schematic cross sectional view showing a sheet-like display device according to a ninth embodiment.

With reference to FIG. 23, the ninth embodiment will be described. A polyethylene terephthalate base 241 was prepared which had a patterned anode ITO electrode layer (200 nm) 242. The base 241 was washed with water, acetone, and isopropyl alcohol. By using a vacuum vapor deposition system ($1\times10^{-6}$ Torr (0.13 mPa), at a room temperature of the base), a hole transport layer 243 of 50 nm in thickness was vapor-deposited on the ITO electrode layer 242. The hole transport layer 243 was made of N,N'-diphenyl-N,N'-bis (3-methyl phenyl)-1,1'-diphenyl4,4'-diamine (TPD). On this hole transport layer 243, a light emission layer 244 of 10 nm in thickness was formed by vapor-depositing at the same time 9-cyanoanthracene and 9,9'-bianthryl (vapor deposition ratio: 9 molecules of 9,9'-bianthryl per one molecule of 9-cyanoanthracene). On this light emission layer 244, an electron transport layer 245 of 50 nm in thickness was formed by depositing t-Bu-PBD which is oxadiazole derivative (PBD). On this electron transport layer 245, a cathode electrode layer 246 of 100 nm was formed by vapor-depositing Al—Li alloy ((Li: 0.5 wt %). A copper foil 232 of 10 μm in thickness was pressure-bonded to the cathode electrode layer 246 to use the copper foil 232 as the cathode of a battery.

In this manner, a display unit was formed which had, as shown in FIG. 23, the anode electrode layer 242, hole transport layer 243, light emission layer 244, electron transport layer 245, and cathode electrode layer 246 sequentially formed on the base 241, and the copper foil 232 formed on the cathode electrode layer 246.

Next, similar to the eighth embodiment excepting that a negative electrode was formed on the copper foil 232, a power source unit 250 was formed. In this manner, a sheet-like display device was obtained which integrated an electroluminescence element as a display element and a secondary battery.

This display device has a plurality of integrated sheet layers providing respective functions. The fundamental constituent elements of a display device include a display layer, a driver and control circuit layer, a power source layer, a base layer, a protective layer and the like. By using these layers as a basis, a new layer may be added, the already formed layer may be replaced or deleted to form an optimum structure depending upon application fields and necessary functions. Information displayed on the display device upon application of an electric field is retained on the display surface like information written on a paper sheet, even if the electric field is turned off (even if the power source is turned off). If two display layers are formed integrally, information can be displayed on both sides of the display device. Addition of data input means is effective for all application fields.

Specific examples of a sheet-like display device will be described not in the limitative sense.

(1) Electronic newspaper which receives information from the Internet, satellite broadcasting or the like and displays only desired information and can read information by folding the electronic newspaper in any desired shape; foldable electronic books and magazines; electronic catalogs with input means for ordering goods; and the like.

(1-1) Electronic Newspaper

Shape example: from tabloid shape to newspaper shape, thin like paper and foldable.

Function example: data reception, data storage, screen switching, display magnification/reduction and the like.

Element example: display unit, driver circuit, power source, communication (reception) circuit, control circuit, memory, touch key and the like.

Figure 24:
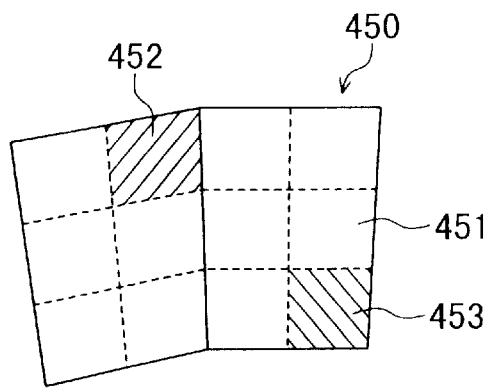
FIG. 24 is a perspective view of an electronic newspaper as an example of a sheet-like display device.

Application example: FIG. 24 is a perspective view of an electronic newspaper 450. Latest articles are received at a predetermined time from an antennal (not shown) mounted near a display unit 451 having a newspaper size, the received latest articles being stored in a memory. An article having a higher priority order is displayed in a predetermined display area. A layer of poor flexibility and foldability other than the display layer is formed in a predetermined area (hatched area 452 in FIG. 24), having a minimum foldable size of the electronic newspaper 450. The other areas can be freely folded. As the electronic newspaper is folded along broken lines shown in FIG. 24, it can be folded compact in the minimum foldable size. Since the displayed information is retained even if the electronic newspaper is folded, it can be read like newspaper. Touch keys of a transparent thin film are formed in another display area (another hatched area 453 in FIG. 24), the touch key being used for switch operation by utilizing a change in capacitance, resistance or the like. Through manipulation of these touch keys, information stored in the memory can be sequentially read and displayed.

(1-2) Electronic Book and Magazine

Shape example: from paper back size to large magazine size, thin like paper, a plurality of sheets can be bundled at one end, and can be rolled.

Function example: data reception, data storage, screen switching, display magnification/reduction, automatic screen update in response to paper turning, page selection, memo input and the like.

Element example: display unit, driver circuit, power source, communication (reception) circuit, control circuit, memory, input means, cover sheets and the like.

Figure 25:
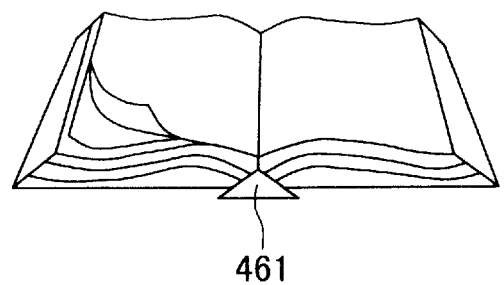
FIG. 25 is a perspective view of an electronic book as an example of a sheet-like display device.

Application example: FIG. 25 is a perspective view of an electronic book. A plurality of sheets are bundled by using a backbone 461. Electronic circuits and components are accommodated in the backbone to use components having poor deformation. Both sides of a display layer can display information and turning pages like a book is possible. After the last page is turned over, a user turns over pages to the first page. This user operation is detected with a sensor formed in the backbone so that the following pages can be automatically updated and displayed. Touch keys may be formed on the front and back covers to control data reception and display as well as switching of display images. Further, a touch position sensor may be formed over the whole area of the display surface. By using an electronic pen or the like capable of applying a pen pressure or electric field, handwritten characters, illustrations can be entered. This digital data may be displayed or stored in the memory. Such information may be related to each page of the book as a memo, so that when the page is displayed, the information is automatically displayed.

(1-3) Electronic Catalog with Input Means

Shape example: Large magazine size, thin like paper, a plurality of sheets can be bundled at one end, and can be rolled.

Function example: data reception/transmission, data storage, screen switching, display magnification/reduction, data input and the like.

Element example: display unit, driver circuit, power source, communication (reception/transmission) circuit, control circuit, memory, input means, cover sheets and the like.

Figure 26:
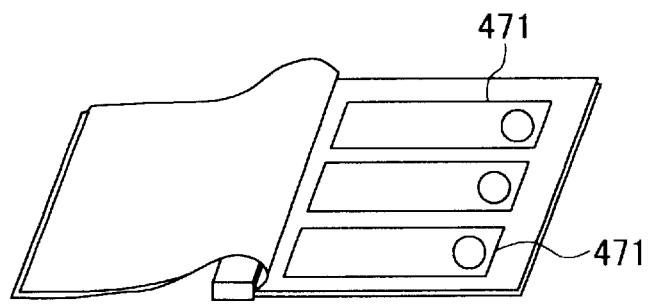
FIG. 26 is a perspective view of an electronic catalog as an example of a sheet-like display device.

Application example: FIG. 26 is a perspective view of an electronic catalog. This catalog has input means such as touch keys and an electronic pen and displays good information 471. Good information of necessary fields is registered beforehand, and is automatically updated upon reception of updated information through communications. Display images can be switched from a good list to its detailed information. In accordance with default personal data entered by using a communication function, a good order is possible even by a single operation upon a switch. An electronic settlement is also possible at a registered account. Various goods in the field not registered may also be searched and displayed to order them.

(2) A display board (electronic bulletin board) system which can be mounted on or dismounted from a wall and automatically receive and update local district information.

Shape example: A4 to A3 (foldable to A4), plate capable of being slightly curved, capable of being mounted on or dismounted from a wall or the like.

Function example: data reception/transmission, data storage, screen switching, display magnification/reduction, data input, specified components (constituent elements), signaling and the like.

Element example: display unit, driver circuit, power source, communication (reception/transmission) circuit, control circuit, memory, input means, signaling means and the like.

Figure 27A:
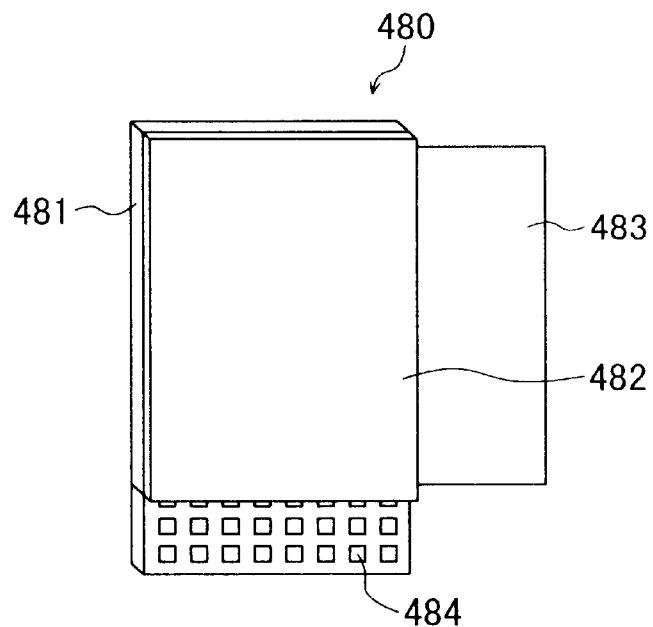
FIGS. 27A and 27B are perspective views of a display board system as an example of a sheet-like display device.
Figure 27B:
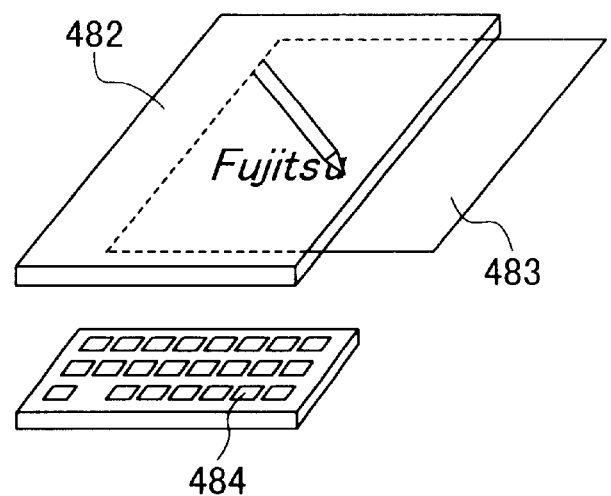

Application example: FIGS. 27A and 27B are perspective views of a display board system 480 which is mounted on a wall and has connection terminals and functions of data reception/transmission, data storage, screen switching, display magnification/reduction, and data input. A unit 481 fixed to a wall is provided with a communication circuit and a signaling unit (not shown), and a display/input unit 482 provided with a driver circuit, a control circuit, a power source and the like can be detachably mounted on the fixed unit 481. A display element 483 like paper is set to the display/input unit 482. Information is automatically updated and information update is notified by using a signaling unit (for generating a signal such as light and voice) of the system. The system also has an input unit 484 such as a key pad and an electronic pen. Input data can be confirmed on the display unit or can be transmitted in both states that the input unit 484 is mounted on the wall and that it is dismounted from the wall. It is possible to dismount only the display element 483 and move to another place with it. In this case, the information can be retained and displayed without any power source. Even if the display/input unit 482 is dismounted from the wall and placed on a desk or the like, key inputs and handwritten character inputs are possible. Data transfer between each unit can be performed via electrodes, communication circuit and the like of each unit.

(3) Communication tools which can call a partner, have a conversation while looking at the partner on the display screen, and transmit information entered from the screen to the partner, only by a button (input function) operation displayed on the screen.

Shape example: A4 to A3 (foldable to A4), thin like paper at least a display unit, being foldable and able to be rolled.

Function example: data reception/transmission, data storage, screen switching, display magnification/reduction, data input, voice input, image input and the like.

Element example: display unit, driver circuit, power source, communication (reception/transmission) circuit, control circuit, memory, input means, voice input, image input and the like.

Figure 28A:
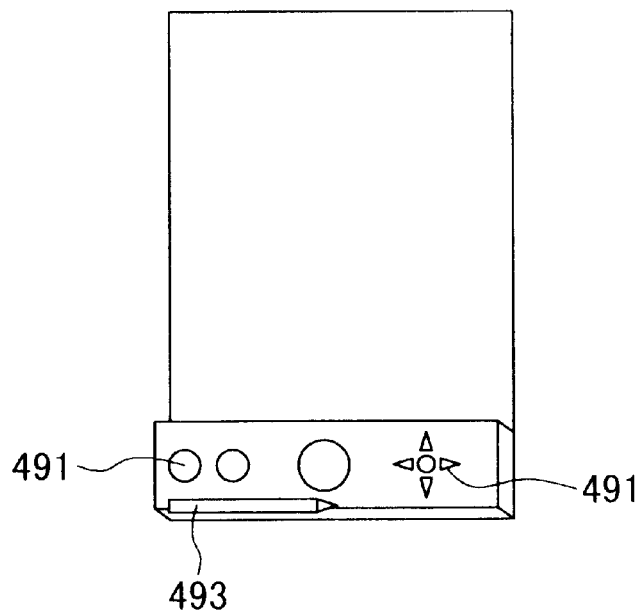
FIGS. 28A and 28B are perspective views of a communication tool as an example of a sheet-like display device.
Figure 28B:
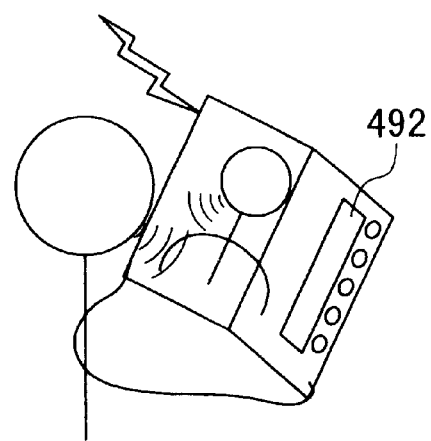

Application example: FIGS. 28A and 28B are perspective views of communication tools. Only by an input from a key 491, it is possible to establish communications and have a conversation while looking at the partner. Image information 492 can be input and transmitted, the image information being captured with an image input unit (not shown) such as a camera and a scanner. A display sheet can be rolled around a key input unit. Touch keys (not shown) may be formed in a partial area of the display surface, and if an input operation is not necessary, they may be deleted from the display surface. Handwritten characters can be entered by using an electronic pen 493.

(4) An electronic wallpaper system capable of freely changing color and design by using electric signals.

Shape example: elongated size (e.g., width of 60 cm or wider, length of several tens m or longer), thickness like wallpaper.

Function example: screen update and the like.

Element example: data reception circuit, data memory, screen switching, input and the like.

Figure 29:
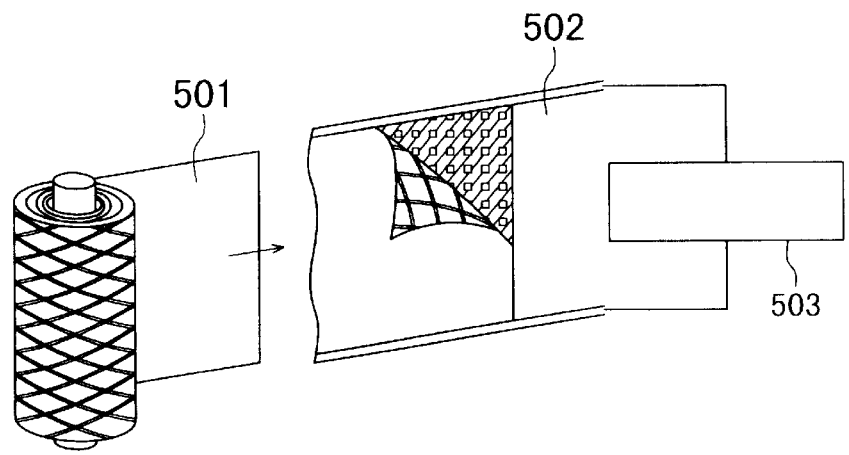
FIG. 29 is a perspective view of an electronic wall paper system as an example of a sheet-like display device.

Application example: FIG. 29 is a perspective view of an electronic wallpaper system. A wallpaper unit 501 is made of a display element having microcapsules containing display particles (such as electrophoretic particles) and a common electrode. Individual electrodes, a drive and control circuit, a power source and the like are installed on a wall 502. Since the control circuit and the like are not integrated with the wallpaper unit 501, the wallpaper unit can be cut along a desired line and mounted on the wall. Signals of a desired display pattern can be input and displayed by using another control unit 503 (which may be mounted on the wall 502). The power source becomes necessary only when the display color and design are changed, and no power source is required in order to retain he display color and design. By grounding the surface of the electronic wallpaper, it is possible to prevent charged dust from being attached and avoid stains on the display surface. In order to protect the common electrode (not shown) on the wallpaper unit 501, conductive resin or the like is thinly coated on the display surface. Display color and design suitable for the environments such as seasons, room use purposes and the like can be selected. Not only the color and design of a wallpaper, but also pictures and photographs may be displayed, or a window frame with an outside scene may be displayed as desired. Obviously, a wallpaper may be attached to a ceiling. If the protective layer is further reinforced and made durable, the wallpaper may be used as a surface layer of a house outer wall. In this case, the color may be changed with seasons, or an image for Christmas decoration may be displayed. The common electrode of the display element may be formed on the wall side and connected to a control unit. In this case, display color and design can be changed from the front surface of the wallpaper by using a write stick with a driver circuit.

(5) A large screen television to be mounted on a wall or the like.

Shape example: about several tens inches or larger, capable of being rolled and dismounted.

Function example: reception (tuning, control), display, audio output and the like.

Element example: display unit, audio output (speaker), power source, communication (reception) circuit, tuning switches and the like.

Application example: The television can be set at a desired position, or mounted on a wall. Since it is light, it can be mounted on a ceiling to display images.

(6) Electronic conference material capable of being rolled.

Shape example: A4 to A3 (foldable to A4), thin like paper, able to be rolled even if a plurality of sheets are stacked.

Function example: data reception/transmission, data storage, screen switching, display magnification/reduction, data input and the like.

Element example: display unit, driver circuit, power source, communication (reception/transmission) circuit, control circuit, memory, input means and the like.

Figure 30:
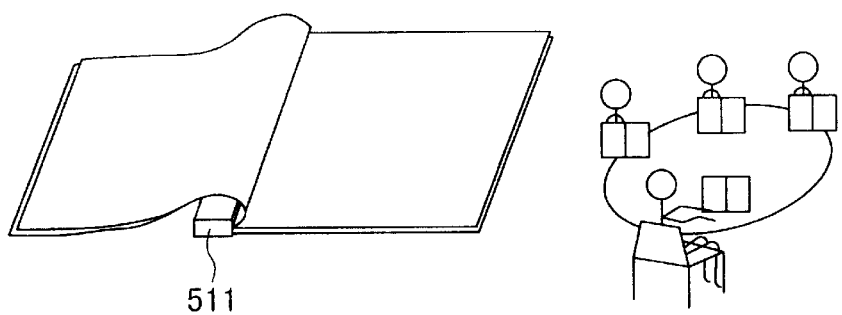
FIG. 30 is a perspective view of an electronic conference material as an example of a sheet-like display device.

Application example: FIG. 30 is a perspective view of an electronic conference material. In this electronic conference material, several sheets constituting a power source unit, a driver circuit, a control circuit, a memory, a communication circuit and the like are formed in a binding member 511. A plurality of display sheets are inserted into the binding member 511. Feeling of turning pages over can be realized, information can be received via communications and stored in a memory. When necessary, the information can be read and displayed on the display screen. The display sheets can be rolled around the binding member 511. The functions and structures similar to those of the electronic book and catalog described earlier can be realized. In addition, if the display sheets are detached from the binding member (backbone member) 511, display sheets held with hands can be compared each other, or they can be placed on a desk or the like like paper.

(7) A display device for an electronic conference system allowing a conference with vivid real images.

Shape example: about several meters or longer, rigidity capable of being curved gently.

Function example: reception/transmission, data storage, screen switching, data input, audio input, image input and the like.

Element example: display unit, driver circuit, power source, communication (reception/transmission) circuit, control circuit, memory, data input unit, audio input unit, image input unit and the like.

Figure 31:
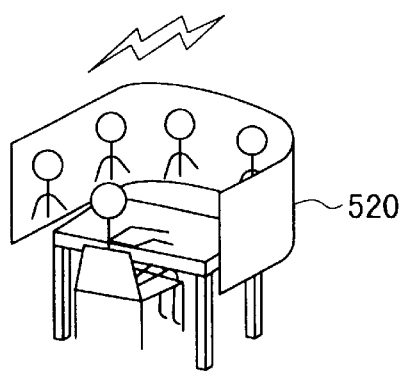
FIG. 31 is a perspective view of an electronic conference system display device as an example of a sheet-like display device.

Application example: FIG. 31 is a perspective view of an electronic conference system display device 520. Since conference participants can be displayed the vivid situation can be realized. By using an image input unit, a plurality of members are displayed on the large screen which is placed upright on a desk and can cover almost the whole view of field. The partner members may be displayed by taking the positions of the members into consideration. Related conference materials may be distributed over communications for discussion.

(8) A sheet-like display device capable of being accommodated in a writing material such as a pen or being folded into a compact size.

(8-1) A Display Device Capable of Being Accommodated in a Pen or the Like.

Shape example: about A6 size, capable of being rolled.

Function example: reception, data storage, screen switching and the like.

Element example: display unit, driver circuit, power source, communication (reception) circuit, control circuit, memory, data input unit and the like.

Figure 32:
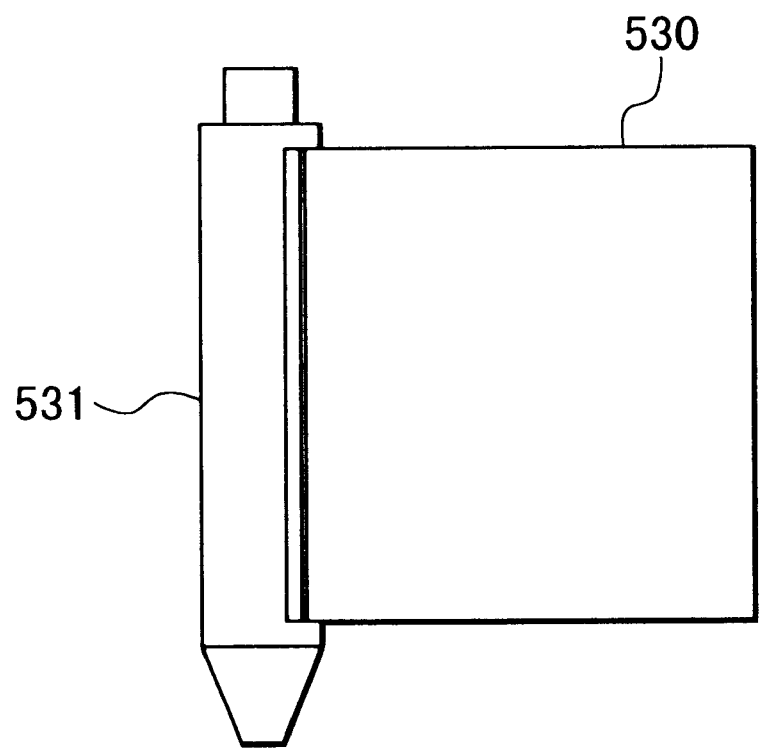
FIG. 32 is a perspective view of a display device capable of being accommodated in a pen, as an example of a sheet-like display device.

Application example: FIG. 32 shows an example of a display device 530 capable of being rolled in a pen 531. The display device 530 can be rolled in the pen 531 and pulled out of the pen 531 when it is used. One end of the display device 531 is connected to a driver circuit, a communication circuit, a control circuit, a power source and the like (not shown) formed in the pen 531. Information is received at an antenna (not shown) mounted on the pen 531, displayed and updated. Controlling the display device is performed by using switches (not shown) mounted on the main body of the pen 531 or touch keys (not shown) formed on the display area of the display device 530. Since the display device 530 can be used after it is pulled out of the pen, it is desired that the display device has a rigidity like a film sheet so as to make it easy to use.

(8-2) A Display Device Capable of Being Folded into a Compact Size.

Shape example: A4 to A3 size as spread, capable of being folded in about A6 size.

Function example: reception, data storage, screen switching and the like.

Element example: display unit, driver circuit, power source, communication (reception) circuit, control circuit, memory, data input unit and the like.

Application example: The display device has the outer appearance similar to the electronic newspaper described with (1-1). A driver circuit, a communication circuit, a control circuit, a power source and the like are all formed in an A6 size which is the minimum foldable size. The display device can be folded like paper, or rolled and accommodated in a pocket. When necessary, it is taken out and spread to confirm the contents on the display screen.

(9) Sheet-like display devices. A plurality of display devices can be placed on a desk to view all the contents, information can be retained without power source, deleted when necessary, and rewritten.

Shape example: A4 to A3 size, thickness and flexibility generally sufficient for curving and folding.

Function example: reception/transmission, data storage, screen switching, display magnification/reduction, data input and the like.

Element example: display unit, driver circuit, power source, communication (reception/transmission) circuit, control circuit, memory, data input unit and the like.

Figure 33A:
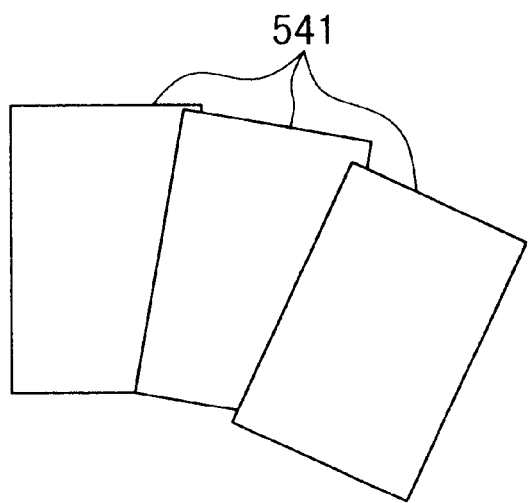
FIGS. 33A and 33B are perspective views of a paper-like display device as an example of a sheet-like display device.
Figure 33B:
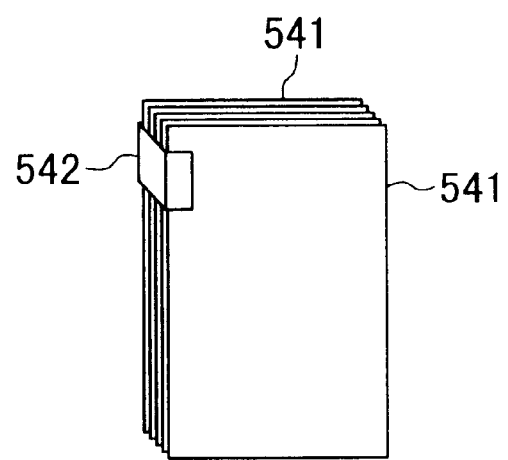

Application example: FIG. 33A is a perspective view of display devices. Since display information can be retained, only a display unit 541 can be used like paper by disconnecting it from a driver circuit and the like. The display devices may be bound with a clip 542 or the like as shown in FIG. 33B while the display information is retained. In updating display information, the control circuit and the like are used which are mounted on the binding member (backbone member) (not shown) as described with the electronic conference material (6).

(10) Suspended advertisements in bus, train or the like, electronic posters, hung screen advertisements and POP advertisements, capable of updating display contents through communications.

Shape example: A4 size or larger, flexibility capable of being rolled, thin like paper.

Function example: reception/transmission, data storage, screen switching, data input and the like.

Element example: display unit, driver circuit, power source, communication (reception/transmission) circuit, control circuit, memory, data input unit and the like.

Application example: In a system such as suspended advertisements, information can be automatically updated through communications, personal information can be acquired or an advertised good can be ordered and its account settlement can be made by connecting a personal portable information terminal to the system over communications. For electronic posters, POP advertisements, and hung screen advertisements, bargaining information and time service information can be updated in real time in accordance with a customer change and preference such as seasons, day of the week, and a time zone. An input unit for displaying and deleting information may be provided to allow a user to order a good directly while viewing the poster. In the field of hung screen advertisements, if a hung screen advertisement is set once, information can be updated through communications so that replacement works and dangers can be avoided.

(11) An electronic price tag for foods for displaying a price, a place of production, a recipe and the like.

Shape example: about name card size, sheet capable of being curved slightly.

Function example: display, data storage, power source, reception, data output.

Element example: display unit, driver circuit, power source, communication (reception) circuit, control circuit, memory, touch keys and the like.

Figure 34A:
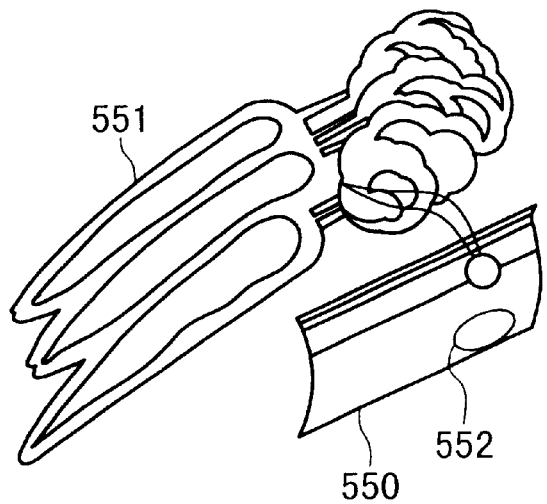
FIGS. 34A and 34B are perspective views of an electronic price tag as an example of a sheet-like display device.
Figure 34B:
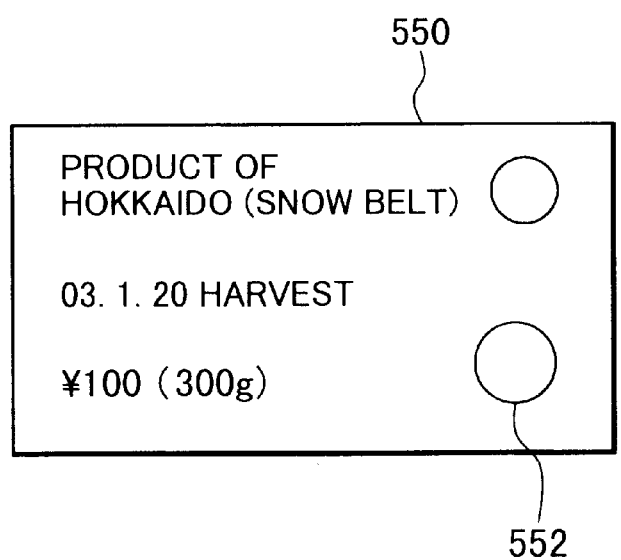

Application example: FIGS. 34A and 34B show the outer appearance of an electronic price tag 550. Display contents can be changed over communications while the price tag 550 is attached to a good 551 as shown in FIG. 34A. As shown in FIG. 34B, by operating upon a button 552 on a display surface, good information, a recipe of the good, information on other foods necessary for the recipe can be displayed, the good information including the name, weight, production place, harvest date, use limit time, grade and the like. Such information may be input to a portable information terminal to use the information for management of house account and inventory. A consumer may use the price tag to input information in household electric appliances to use it for inventory management. The used price tag may be returned to the shop to reuse it by updating data.

(12) An automatic account settlement system by using electronic price tags. A customer can settle an account while passing through a gate.

Shape example: about name card size, sheet capable of being curved slightly.

Function example: price display, calculation, communication (reception/transmission).

Element example: display unit, driver circuit, power source, communication (reception/transmission) circuit, control circuit, memory, touch keys and the like.

Application example: A transmission function is added to the electronic price tag (11) to transmit good information in response to an access signal transmitted from a registration gate. The transmission contents are recorded and the debit is automatically settled on a credit card account registered beforehand. In order for a customer to confirm the settlement, the transaction contents may be displayed on another sheet-like display device.

(13) An account display and settlement system for displaying the prices of goods and a total and settling the account when the goods attached with electronic price tags are put in a wagon (or picked up from the wagon).

Shape example: about name card size, sheet capable of being curved slightly.

Function example: price display, calculation, communication (reception/transmission).

Element example: display unit, driver circuit, power source, communication (reception/transmission) circuit, control circuit, memory, touch keys and the like.

Application example: A transmission function is added to the electronic price tag (11) and a display device capable of transmitting, receiving and calculating data is mounted on each wagon. When a good is put in a wagon (or picked up from the wagon), data is transmitted from the tag attached to the good, and the price of the good is automatically displayed on the display device, and a total sum is also displayed. When a consumer finally decides to purchase the goods, the consumer confirms the total sum.

(14) A seal-like alarm display medium for alarming only when a door of a train or the like is opened (when passengers get on or off a train or the like).

Shape example: about A4 to A3 size, thin like paper, detachable to a wall or the like.

Function example: communication (reception).

Application example: This medium is attached to a door or a nearby place of a vehicle. During running of the vehicle, a general guide or advertisement is displayed, or no data is displayed so as not to draw attention of passengers, whereas an alarm is displayed to draw attention of passengers when the door is opened or closed and passengers get on or off the vehicle.

(15) Electronic newspaper and magazines with posters and advertisements. Detailed information is displayed and communicated when a predetermined area of a poster or advertisement is touched.

Shape example: A4 to A3 size (foldable to A4 size), sheet capable of being curved slightly, detachable (in the case of poster).

Function example: reception/transmission, data storage, screen switching, data input.

Element example: display unit, driver circuit, power source, communication (reception/transmission) circuit, control circuit, memory, and the like.

Application example: A transparent touch sensor is formed in the display area. While an advertisement is displayed, the touch key is made unrecognizable by a user, whereas when data is to be input, the position of the touch key is displayed to allow a user to enter data. As information stored as default in a portable information terminal is entered via communications, detailed information or the like on the advertisement can be requested.

(16) An intelligent road/traffic board Shape example: plate of 1 meter square or larger.

Function example: reception/transmission, screen switching.

Element example: display unit, driver circuit, power source, communication (reception/transmission) circuit, control circuit, memory, and the like.

Figure 35:
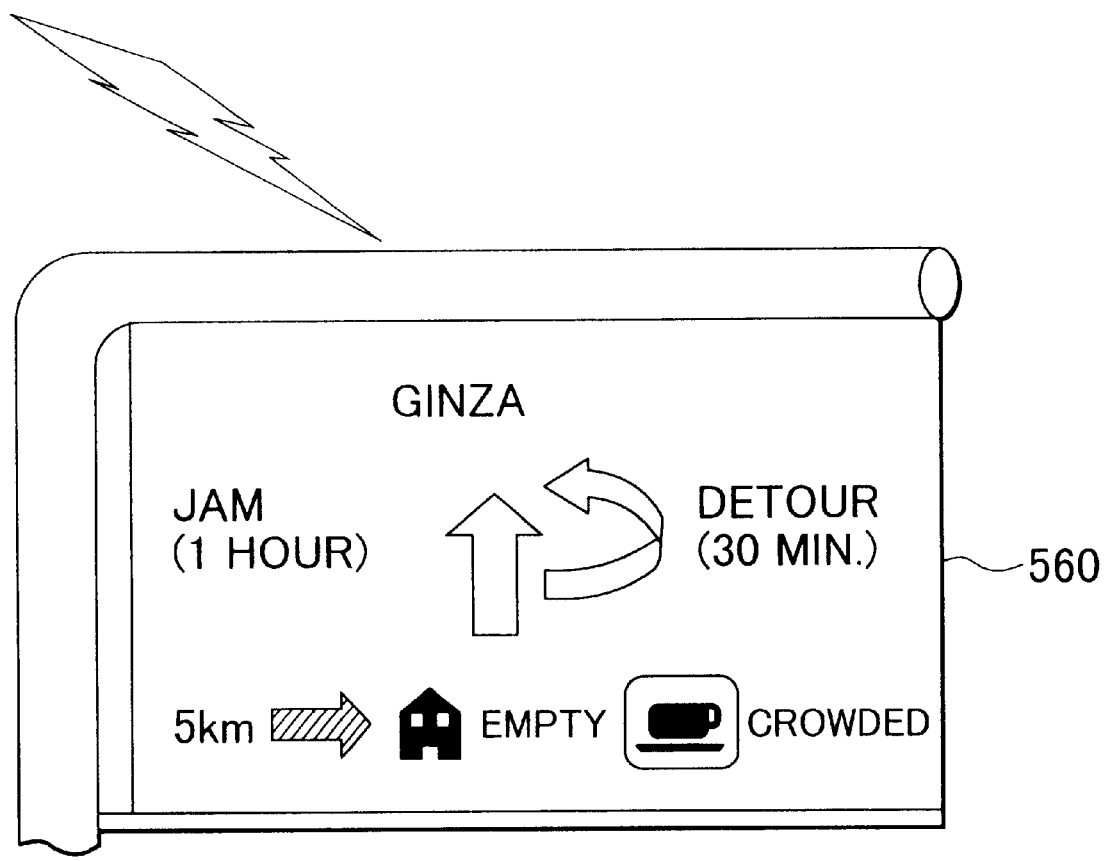
FIG. 35 is a perspective view of an intelligent road sign as an example of a sheet-like display device.

Application example: FIG. 35 shows an example of a road board. Road guide information is displayed and updated in real time over communications, the road guide information including jam information, detour information, crowded state of hotels and restaurants in nearby districts and the like. A display energy is small and energy is not necessary for display data retention. For a traffic board, restriction information can be automatically updated when necessary. A road monitor function may be added to the road board or traffic board to automatically transmit road jam information and the like.

(17) An intelligent electronic ticket (rail ticked or the like) and pass

Shape example: name card size or pass size, sheet having some rigidity.

Function example: reception/transmission, data storage, screen witching, data input, alarm, and time display.

Element example: display unit, driver circuit, power source, communication (reception/transmission) circuit, control circuit, memory, touch keys and the like.

Figure 36A:
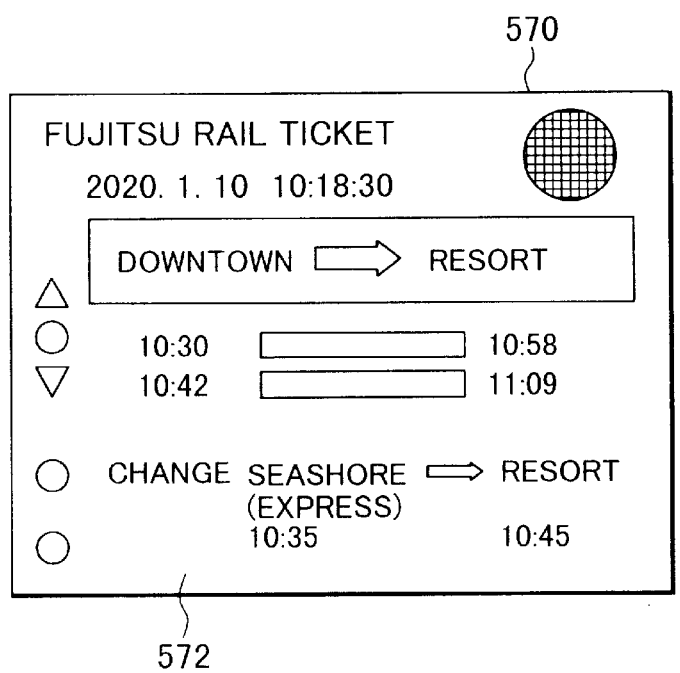
FIGS. 36A and 36B are perspective views of an intelligent electronic vehicle ticket as an example of a sheet-like display device.
Figure 36B:
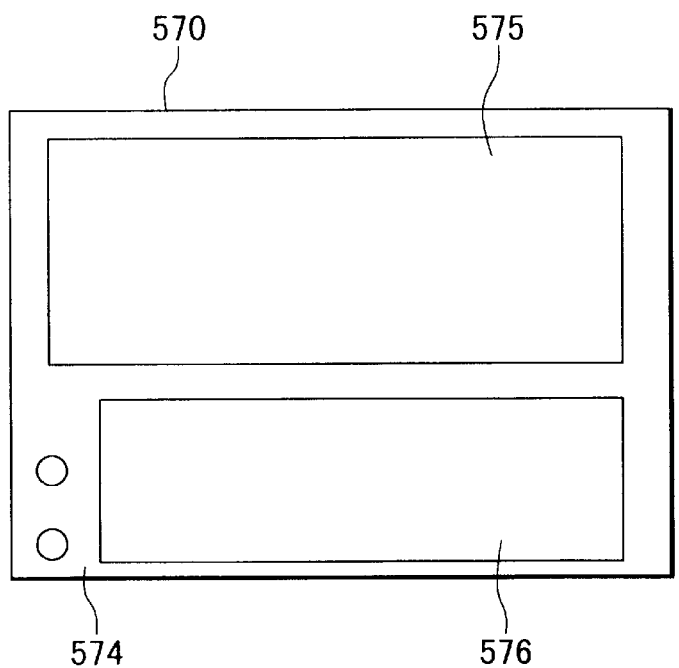

Application example: FIGS. 36A and 36B show an example of an electronic rail ticket 570. A front surface 572 shown in FIG. 36A displays a transit section, a fair and the like which are not necessarily required by a user, and preferentially displays information important for the user, after the user selects the destination to purchase the ticket. The entrance check of the ticket purchased by the user is made by communications between the entrance gate and ticket. A time display function is provided to display a departure time of a train capable of getting after the present time, a home guidance, and a destination arrival time. Running information such as crowded state of each train can also be displayed by using the communication function of the ticket. Such information may be displayed at the same time or selectively displayed by using a switch such as a touch key. When the train reaches the memorized destination, this effect is notified by using an alarm (light, sound, vibration or the like), by detecting a signal substituted for a train broadcast or a signal transmitted from a nearby station. Therefore, the train broadcast is not necessary and comfortable train environment can be maintained. If the type of an alarm is selected, even a handicapped person can be provided with a handy method. Information such as a guide 575 and an advertisement 576 related to the transit section district may be displayed on the back surface 574 shown in FIG. 36B. The type of information to be displayed can be changed with an object of a passenger such as commutation and sight seeing. Information requested by a passenger having a pass may also be stored and displayed. Similar to the entrance check, the exit check is made by communications between he ticket and gate. A ticket may be inserted in the slot of the gate to perform communications and thereafter collect it reliably.

(18) A display device attached to a dashboard or the like. This display device cannot be recognized in an ordinary case, but displays an alarm or countermeasure information when an abnormal state occurs.

Shape example: about A4 size or smaller, thin like paper, detachable.

Function example: communication (reception).

Element example: display unit, driver circuit, power source, communication (reception) circuit, control circuit, memory, and the like.

Application example: A function is provided which is fundamentally similar to that of the seal-like alarm display medium (14). This display device has the color same as that of a dashboard so as not to degrade ornamental appearance. Only when a trouble occurs, in response to a trouble occurrence signal, an optimum countermeasure or alarm corresponding to the trouble is displayed. It is therefore possible to prevent the driver from missing the display image, to improve recognition and understanding of information, and to countermeasure quickly and properly.

(19) An electronic text

Shape example: A4 to A3 size (foldable to A4), thin like paper, capable of binding or rounding a plurality of sheets.

Function example: communication (reception/transmission), data storage, screen switching, display magnification/reduction, data input, data search.

Element example: display unit, driver circuit, power source, communication (reception/transmission) circuit, control circuit, memory, input unit and the like.

Application example: The fundamental structure is similar to that of the electronic catalog (1-3) or communication tools (3). The text is constituted of a plurality of sheet-like display elements having a function of displaying necessary learning information over communications, and searching and displaying detailed information relevant to the learning contents via the Internet or the like only upon operation of a button. In accordance with the use object of the text, there are provided an input unit such as a touch keyboard capable of displaying and deleting data on the display screen, a handwritten character input function for an electronic conference material (6) and a note function for storing input data.

(20) A display device for a global education system capable of providing a display image like paper.

Shape example: A3 size or larger.

Function example: reception/transmission, data storage, screen switching, display magnification/reduction, data input, data search, image input and the like.

Element example: display unit, driver circuit, power source, communication (reception/transmission) circuit, control circuit, memory, input unit, image input unit and the like.

Figure 37:
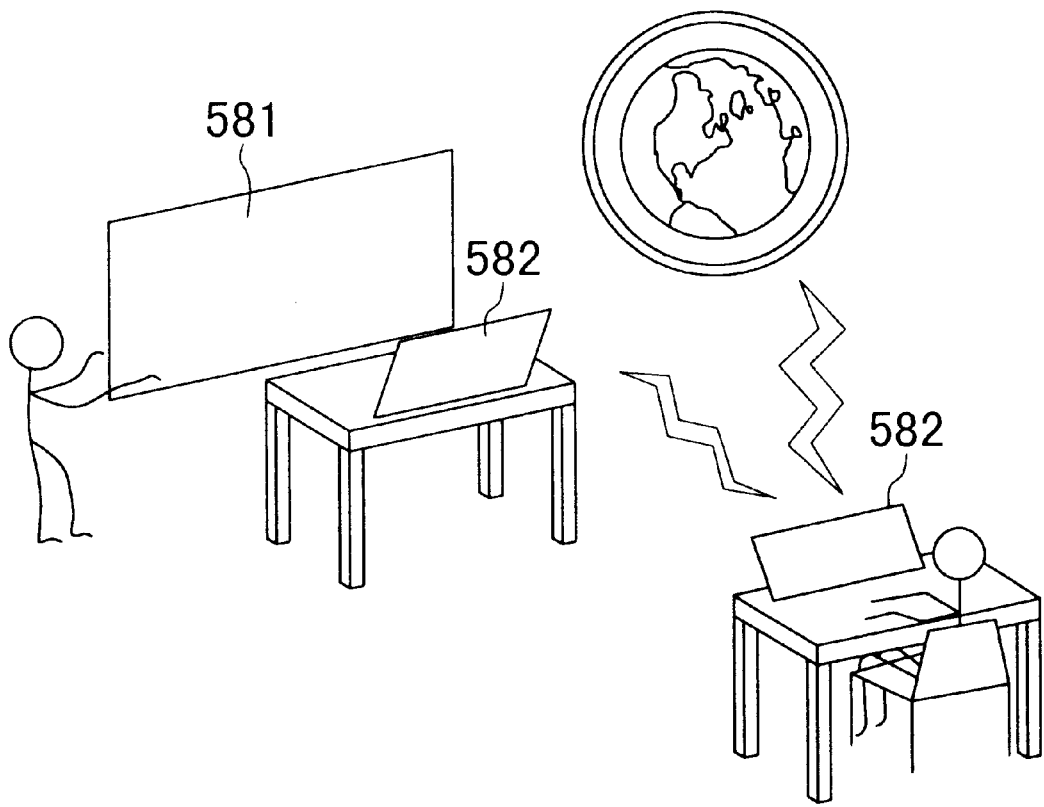
FIG. 37 is a perspective view of a global education system display device as an example of a sheet-like display device.

Application example: FIG. 37 shows an example of display devices for a global education system display device. The global education system includes an electronic blackboard 581 which is made of a display device similar to that of the electronic conference system (7) and a display device 582 similar to the electronic text (19). The contents written on the electronic blackboard 581 by a teacher can be transmitted to and displayed on the display device 582 used by a student and linked to schools in the whole world, and recorded in the display device 582. This system can also support personal guidance between the teacher and student. A voice input/output function and an image input function may be added.

Next, another sheet-like display device will be described. In this display device, an electrode layer on the display surface side made of a conductive resin layer is integrally formed with a display layer and has a surface shape conformal to the surface roughness of the display layer.

The electrode layer integrally formed with the display layer of this sheet-like display device can be formed by directly coating conductive resin material on the display layer. In coating the conductive resin material, a screen printing machine or a coater may be used. If the conductive resin material is soluble to solvent, the electrode layer can be formed easily even at a room temperature by coating solution of resin diluted by solvent. Alternatively, a film may be laminated upon the display layer and conductive resin dust or particle material is melted and solidified on the display layer to form the electrode layer integrated with the display layer. If resin material of the electrode layer formed on the display layer is not electrically conductive, a dopant process is executed to give a conductivity to the electrode layer. The dopant process may be a process of blowing gas which contains dopant suitable for giving a conductivity or a process of immersing the electrode layer in a solution which contains such dopant.

With the integral structure of the display layer and electrode layer, it is possible to form a sheet-like display device having a thickness of 300 $\mu$m or thinner. Since the distance between opposing electrodes becomes narrow, a high electric field can be obtained even at a low application voltage. Further, by using the electrode layer integral with the display layer as a common electrode over the whole display surface, i.e., as a painted-out electrode, a luster variation can be reduced and a high image quality can be obtained. The luster variation increases if the electrode layer on the display surface side is used as patterned electrodes (independent-electrodes).

Consider for example the case wherein microcapsules capable of changing optical reflection or absorption are used in the display layer. In this case, if only the bottoms of microcapsules are fixed to the base having the independent electrode layer with adhesive or the like, the tops (i.e., the display surface side) of the microcapsules have an irregular surface shape conformal to the sizes of the microcapsules. If the display surface side electrode (common electrode) layer of conductive resin material is formed on the display layer having the irregular surface shape, the surface shape of the electrode layer is irregular as conformal to the underlying display layer. A sheet-like display device having such an electrode layer on the display surface side has a reduced luster which degrades the texture like paper, because of the irregular surface shape of the electrode layer.

A sheet-like display device having a conductive resin layer as the common electrode on the display surface side will be described with reference to relevant drawings.

As illustratively shown in FIG. 14C, the sheet-like display device 700 has: the individual electrodes 702 formed on the base 701; the microcapsules 703 containing electrophoretic particles 707, disposed at positions corresponding to the individual electrodes 702 and fixed by the adhesion layer 705 to the base 701; and the common electrode 704 made of conductive resin material and covering the display layer 706 constituted of the microcapsules 703 and adhesion layer 705. The individual electrodes 702 and common electrode 704 constitute a pair of opposing electrodes. The common electrode 704 on the side of the display surface of the display device 700 is generally transparent.

As shown in FIGS. 14A to 14F, the electrode layer 704 on the display surface side is laminated upon the display layer 706 to form an integral structure. The sheet-like display device 700 for displaying an image by changing the optical reflection or absorption of the microcapsules 703 upon application of a potential difference across the opposing electrodes 702 and 704 can therefore provide the thickness and luster like paper. In integrating the common electrode 704 and display layer 706, conductive resin material may be directly coated on the display layer 706, a film (not shown) may be laminated upon the display layer 706, or conductive resin dust or particle material (not shown) may be melted and solidified on the display layer 706.

Conductive resin may be (1) polymer having a conductivity, (2) resin doped with dopant for giving a conductivity, and (3) resin dispersed with dust for giving a conductivity. The polymer (1) having a conductivity may be (a) polyacetylene group polymer such as polyacetylene and poly (1,6-heptadiyne), (b) polyphenylene group polymer such as polyparaphenylene, polymetaphenylene, polyphenylene vinylene, polyphenylene oxide, polyphenylene sulfide, polypyrene, polyazulene, polyorphlene, (c) heterocycl polymer such as polypyrrole, polythiophene, polyselenophene, polytellurophene, and polythinilene vinylene, (d) ionic polymer such as polyannulene, (e) ladder type polymer such as polyacene, poly phenanthrene, and poly perinaphthalene.

Resin (2) doped with dopant for giving a conductivity may be (a) a polyaniline and its derivatives having a repetition unit given by the following chemical formulas (I) and (II) and preferably an average molecular weight of 30 to 70 thousands:

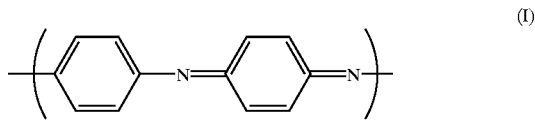

(I)

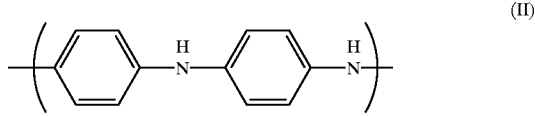

(II)

(b) polypyrrole and its derivatives having a repetition unit (R representing alkyl group) given by the following chemical formula (111) and preferably an average molecular weight of several to several tens thousands:

(III)

and (c) polythiophene and its derivatives having a repetition unit (R representing alkyl group) given by the following chemical formula (IV) and preferably an average molecular weight of several to several tens thousands:

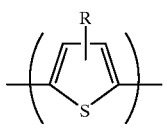

(IV)

These resins are soluble to solvent and are very convenient for forming an electrode by using a coater or a screen printing machine.

Dopants for giving a conductivity to resin may be (a) halogen such as chlorine, bromine and iodine, (b) aromatic sulfonic acid such as benzensulfonic acid, p-toluensulfonic acid, naphthalenesulfonic acid, alkylnaphthalenesulfonic acid, styrenesulfonic acid, styrenesulfonic acid, and n-alkylbenzensulfonic acid, (c) aliphatic sulfonic acid such as vinylsulfonic acid, methallylsulfonic acid, dodecylsulfonic acid, and trifluorosulfonic acid, (d) polymer acid having sulfonic acid group at side chain such as polyvinylsulfonic acid, and polystyrenesulfonic acid, and (e) volatile protonic acid such as hydrochloric acid and nitric acid. Two types of dopants may be used at the same time. When dopant is used, solution of resin dissolved by solvent is coated on the surface of the display layer 706 of the sheet-like display device 700 (FIG. 14C), and dried to form a resin layer. Next, this resin layer is subjected to a dopant process to form the electrode layer 704, or alternatively, solution of resin and dopant dissolved by solvent is coated on the surface of the display layer 706, and dried to form a conductive resin film as the electrode layer 704. For the dopant process for the resin layer, the resin layer is immersed in solution which contains dopant to diffuse dopant from the liquid phase to the resin layer, or the resin layer is exposed in an air phase containing dopant to diffuse dopant from the air phase to the resin layer.

Example of solvent used for forming a resin layer may be N-methylpyrrolidone, dimethylformamide, pyridine, concentrated sulfuric acid and cyclohexane if polyaniline or its derivative is used as resin material, or may be general organic solvent such as ethanol, benzene, tetrahydrofuran, trichloroethylene, and butyl carbitol if polypyrrole derivative or polythiophene derivative is used as resin material. Single solvent may be used or a mixture of two or more solvents may be used. It is desired to use solvent which does not dissolve the display layer on which solvent solution is coated or has a low solubility. Solvent may contain additive so that the wettability and the like of the surface of the display layer is changed.

Examples of resin (3) dispersed with dust for giving a conductivity type may be any well-known resin such as polyester, epoxy, silicone, polyvinyl acetal, polycarbonate, acryl, urethane. They may be used singularly or as a mixture.

Conductive dust to be dispersed in resin may be metal dust such as gold, silver, copper, and iron, or graphite duct. It is desired to use indium tin oxide (ITO) dust because it has high transparency and conductivity. Two or more types of conductive dusts may be used. If resin material is to be coated by using solvent, conductive dust is dispersed in solution of resin material dissolved by solvent, and coated. After coating, the solvent is removed to form the electrode layer made of resin dispersed with conductive dust. If resin material is insoluble, the electrode layer is formed by using resin material directly dispersed with conductive dust, by a method such as using the film described earlier.

Solvent may be any organic solvent such as ethanol, tetrahydrofuran, chloroform, toluene, and dichloromethane. They may be used singularly as a mixture. Also in this case, it is desired to use solvent which does not dissolve the display layer on which solvent solution is coated or has a low solubility. Solvent may contain additive so that the wettability and the like of the surface of the display layer is changed.

A thickness of the conductive resin layer used as the electrode is preferably 0.1 to 20 µm. If the thickness of the resin layer is thinner than 0.1 µm, the continuity of the resin layer is hard to be obtained, particularly when the electrode on the display surface side is the common electrode. If the thickness is greater than 20 µm, the thickness of a sheet-like display device is increased and unfavorable.

It is preferable to form a protective film 709 on the conductive resin electrode layer 704 (FIG. 14C). The protective layer 709 is formed by coating solution of known insulating resin dissolved by solvent and drying it. Such resin may be polyester, epoxy, silicone, polyvinyl acetal, polycarbonate, acryl, urethane or the like. They may be used singularly or as a mixture. A thickness of the protective layer 709 is preferably 0.1 to 20 µm. If the thickness of the protective layer resin layer is thinner than 0.1 µm, the continuity of the protective layer 709 is hard to be obtained, whereas if the thickness is greater than 20 µm, the thickness of a sheet-like display device is increased and unfavorable.

In order to fix microcapsules of display elements to the base 701, hardenable resin, water soluble resin, silicone rubber or the like is coated on the substrate 701 formed with the independent electrodes 702 as illustrated in FIGS. 34A and 34B. The microcapsules 703 are coated by screen printing or blown by ink jetting, heated and dried. In this manner, the display layer 706 with the microcapsules being exposed (or projected) on the display surface side can be formed. The surface roughness of the display surface can be maintained and the luster can be reduced, if a pressure process or the like is not executed for the conductive resin layer coated on the display layer and upper protective layer, such process destructing the surface roughness conformal to that of the underlying display layer.

The surface of the display device (the surface (without the protective layer) of the electrode layer 704 shown in FIG. 14C or the surface of the protective layer 709 on the electrode layer 704) has preferably a 60 degrees specular glossiness smaller than 20 at which light scattering becomes weak and the texture like paper can be obtained. It is known that there is a relation between the glossiness of the resin layer surface and an average surface roughness, as shown in FIG. 14D. It can be understood from this data that the display surface has an average surface roughness of 1.3 µm or larger. A sheet-like display device having the display surface with a proper luster can be formed easily by forming the electrode layer by directly coating conductive resin material on the display layer formed by using microcapsules. If the electrode on the display surface is the common electrode, a luster variation to be generated by the patterned electrode layer such as independent electrodes can be reduced.

In a sheet-like display device having an integrated structure of a display layer and electrode layers, the electrode layer on the display surface side integrally formed with the display layer is preferably the common electrode. However, independent electrodes may also be formed on the display surface side so long as a proper luster is obtained and an image quality is not degraded.

Various bases (supports) may be used. The "base" supports either a display device integrating a display layer and another layer for operating the display layer, or a display element. In the former case, the base may be formed under the power source layer 14 shown in the fundamental structures shown in FIGS. 1A to 1F. In the latter case, the base corresponds to the base 402 shown in FIG. 20B or the base 701 shown in FIG. 14C.

Examples of the base may be a glass plate, a resin film made of a PET film or the like, a plate or sheet made of organic or inorganic material such as paper, or the like. The base may be a plate or sheet made of composite material, such as an organic resin film filled with an inorganic filler. A metal plate or sheet may be used for the road and traffic board described earlier which is required to make the sheet-like display device have sufficient mechanical strength and rigidity.

For the electronic newspaper, books and magazines described earlier which are touched directly with hands, it is effective to use paper as the base material in order to obtain the texture like paper. In this case, in order to improve the mechanical strength, water resistance and anti-solubility, it is effective to coat the surface of the base material with know resin such as polyvinyl alcohol, polystyrene, and polymethyl methacrylate. Another approach is to use material called "synthetic paper". The synthetic paper has synthetic resin as its main composition and can realize the texture and touch like ordinary paper made of wood pulp as its main composition and can realize improved mechanical strength and rigidity.

Synthetic paper is roughly divided into synthetic film paper and synthetic fiber paper. The synthetic film paper is manufactured by forming a film of synthetic resin or by further working the film of synthetic resin. The synthetic fiber paper is manufactured by working raw fiber material such as synthetic pulp. In this invention, synthetic paper is suitable which is one kind of the synthetic film paper, and has the lamination structure of two or more synthetic resin layers. At least one resin layer has mechanical characteristics such as strength and rigidity different from those of the other resin layers. Resin material may be polyolefin such as polyethylene, polypropylene, ethylene-propylene copolymer, and polystyrene. They may be used singularly or as mixture. The mechanical characteristics of each resin layer can be changed by changing a rolling method (uniaxial or biaxial rolling) for a synthetic resin film, the type of resin, the type of filler to be added to resin or a filling ratio, the type of additive and an additive amount, and the like.

The present invention has been described in connection with the preferred embodiments. The invention is not limited only to the above embodiments. It is apparent that various modifications, improvements, combinations, and the like can be made by those skilled in the art.

What we claim are:

1. A sheet-like display devices comprising:
   a flexible sheet-like display layer; and
   at least one flexible electric layer formed integrally with said sheet-like display layer, said electric layer including at least one electric function component for activating said display layer and a pair of electrode layers having a sheet-like electrolytic or dielectric layer between the electrode layers and supplying electrical power necessary to drive said display device.

2. The sheet-like display device according to claim 1, wherein said electric layer includes an input/output element providing signal input/output.

3. The sheet-like display device according to claim 1, wherein said electric function component includes at least one component selected from a group consisting a driver circuit component, a control circuit component, a communication circuit component, and an acoustic signal conversion element component.

4. The sheet-like display device according to claim 1, wherein said sheet-like display layer includes a pair of opposing electrode layers, at least one of the opposing electrode layers being transparent, and a display layer sandwiched between the opposing electrode layers, a display operation being performed by changing optical characteristics of the display layer.

5. The sheet-like display device according to claim 4, wherein said display layer includes microcapsules each containing electrophoretic particles sealed together with dielectric liquid, and a display operation can be performed by changing the optical characteristics by changing a distribution state of the electrophoretic particles in the microcapsule with a control voltage applied between the opposing electrodes.

6. The sheet-like display device according to claim 4, wherein said display layer includes microcapsules each containing a sphere-like body rotatable in accordance with a direction of an applied electric field, and a display operation can be performed by changing the optical characteristics by changing a rotary position of the sphere-like body with a control voltage applied between the opposing electrodes.

7. The sheet-like display device according to claim 4, wherein said display layer includes a liquid crystal display layer having liquid crystal compound sealed in micro holes formed in polymer material.

8. The sheet-like display device according to claim 4, wherein said display layer includes a layer capable of changing optical characteristics and presenting an electroluminescence phenomenon by a current flowing between the opposing electrodes.

9. The sheet-like display device according to claim 4, wherein said display layer includes a layer capable of changing the optical characteristics and presenting an electrochromism phenomenon by a current flowing between the opposing electrodes.

10. The sheet-like display device according to claim 4, wherein said display layer contains particles whose positions change with a magnetic field.

11. The sheet-like display device according to claim 1, wherein said sheet-like display layer includes a display layer and one electrode layer, and can perform a display operation by changing optical characteristics of said display layer with an electric field applied between said electrode layer and a predetermined write electrode or with a current flowing between said electrode layer and a predetermined write electrode.

12. The sheet-like display device according to claim 11, wherein said display layer includes a layer dispersed with electrophoretic particles capable of moving under an electric field applied between said electrode layer and the predetermined write electrode, and a display operation can be performed by changing the optical characteristics by changing a distribution state of the electrophoretic particles in said display layer with a control voltage applied between said electrode layer and the predetermined write electrode.

13. The sheet-like display device according to claim 11, wherein said display layer includes a layer distributed with sphere-like bodies capable of being turned over in accordance with an electric field applied between said electrode layer and the predetermined electrode, and a display operation can be performed by changing the optical characteristics by changing configuration of the sphere-like bodies with control voltages applied across said electrode layer and the predetermined write electrode.

14. The sheet-like display device according to claim 11, wherein said display layer includes a further layer capable of presenting electrochromism phenomenon in accordance with a current flowing between said electrode layer and the predetermined write electrode.

15. A sheet-like display device comprising:
   (a) a flexible sheet-like display layer comprising a pair of electrode layers having a sheet-like electrolytic or dielectric layer between the electrode layers and supplying electrical power necessary to drive said display device;
   (b) a flexible sheet-like power source layer; and
   (c) a circuit layer including at least a portion of at least one of a driver circuit and a control circuit, said layers (a), (b) and (c) being integrally formed.

16. The sheet-like display device according to claim 15, wherein said circuit layer (c) includes a layer including at least a portion of a communication circuit.

17. A sheet-like display device comprising:
   (a) a flexible sheet-like display layer;
   (b) a flexible sheet-like power source layer comprising a pair of electrode layers having a sheet-like electrolytic or dielectric layer between the electrode layers and supplying electrical power necessary to drive said display device; and
   (c) an acoustic signal conversion layer capable of converting an acoustic signal into an electric signal, converting an electric signal into an acoustic signal, or performing both conversions, said layers (a), (b) and (c) being integrally formed.

18. The sheet-like display device according to claim 17, further comprising (d) a layer including at least a portion of at least one of a driver circuit and a control circuit, said layers (a), (b), (c) and (d) being integrally formed.

19. The sheet-like display device according to claim 17, further comprising (e) a layer including at least a portion of at least one of a driver circuit, and a control circuit and at least a portion of a communication circuit, said layers (a), (b), (c) and (e) being integrally formed.

20. The sheet-like display device according to claim 17, wherein said flexible sheet-like display layer (a) includes a display layer dispersed with microcapsules, each microcapsule having a shell made of resin in which together with dielectric liquid, particles capable of moving under an electric field or a magnetic field, or a core including a sphere-like body capable or rotating under an electric field or a magnetic field, the sphere-like body having semispheres of different colors and different electromagnetic characteristics.

21. A method for manufacturing a sheet-like display device, comprising:
   preparing a flexible base; and
   laminating on the flexible base a flexible sheet-like display layer and at least one flexible layer including an element layer for activating the sheet-like display layer and a pair of electrode layers having a sheet-like electrolytic or dielectric layer between the electrode layers and supplying electrical power necessary to drive said display device.

22. The method for manufacturing a sheet-like display device according to claim 21, wherein said step (b) includes a step of forming a display layer dispersed with microcapsules on the base, each microcapsule having a shell made of resin in which together with dielectric liquid, particles capable of moving under an electric field or a magnetic field, or a core including a sphere-like body capable of rotating under an electric field or a magnetic field, the sphere-like body having semisphere of different colors and different electromagnetic characteristics.

23. The method for manufacturing a sheet-like display device according to claim 22, further comprising:
   adding a monomer dispersion liquid to liquid dispersed with the cores, depositing a shell made of polymerized monomers on a surface of each core to form said microcapsule, before said step (b) laminating.

24. The method for manufacturing a sheet-like display device according to claim 22, wherein said laminating includes a step of coating an adhesion layer on the base, dispersing the microcapsule on the adhesion layer and a forming a common electrode layer covering the microcapsules.

25. A microcapsule having a shell made of resin in which together with dielectric liquid, particles capable of moving under an electric field or a magnetic field, or a core including a sphere-like body having semispheres of different colors and different electromagnetic characteristics, capable of rotating under an electric field or a magnetic field, wherein a diameter of the core is in a range from 10 $\mu$m to 200 $\mu$m and a circumferential length L of the microcapsule is in a range of $(4.1 \times T) \leq L \leq (20.1 \times T)$ where T is a Martin diameter of the microcapsule.

* * * * *